United States Patent
Takahashi et al.

(10) Patent No.: US 11,729,366 B2
(45) Date of Patent: Aug. 15, 2023

(54) INFORMATION PROCESSING APPARATUS AND METHOD

(71) Applicant: Sony Group Corporation, Tokyo (JP)

(72) Inventors: Ryohei Takahashi, Kanagawa (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/712,191

(22) Filed: Apr. 4, 2022

(65) Prior Publication Data
US 2022/0224874 A1   Jul. 14, 2022

Related U.S. Application Data

(62) Division of application No. 16/959,687, filed as application No. PCT/JP2018/048424 on Dec. 28, 2018, now abandoned.

(30) Foreign Application Priority Data

Jan. 12, 2018  (JP) .................. 2018-003796
Jul. 4, 2018   (JP) .................. 2018-127665

(51) Int. Cl.
*H04N 13/178*   (2018.01)
*H04N 13/194*   (2018.01)
(Continued)

(52) U.S. Cl.
CPC ......... *H04N 13/178* (2018.05); *H04N 13/161* (2018.05); *H04N 13/194* (2018.05);
(Continued)

(58) Field of Classification Search
CPC .. H04N 13/178; H04N 13/161; H04N 13/194; H04N 21/23418;
(Continued)

(56) References Cited

U.S. PATENT DOCUMENTS

2013/0229548 A1   9/2013   Masuko
2014/0313388 A1   10/2014  Wang
(Continued)

FOREIGN PATENT DOCUMENTS

CN   101584223 A   11/2009
CN   101711483 A   5/2010
(Continued)

OTHER PUBLICATIONS

China Master's Theses Full-text Database; Jul. 15, 2016; Cao Yuming:"The Study and Implementation of Dynamic Streaming MPEG-DASH." Full text.
(Continued)

*Primary Examiner* — John R Schnurr
(74) *Attorney, Agent, or Firm* — Xsensus LLP

(57) ABSTRACT

The present disclosure relates to an information processing apparatus and method that allows a stream of sub-pictures to be more easily selected.
A control file is generated that manages image encoded data for each of a plurality of sub-pictures into which an entire picture is divided and which is then encoded, the control file including region-related information related to a region in the entire picture corresponding to the sub-picture, as information different from arrangement information for each of picture regions, the control file being used for controlling distribution of the image encoded data. The present disclosure can be applied to, for example, an information processing apparatus, an image processing apparatus, an image encoding apparatus, a file generating apparatus, a file transmission apparatus, a distribution apparatus, a file reception apparatus, an image decoding apparatus, or a reproduction apparatus.

18 Claims, 74 Drawing Sheets

(51) Int. Cl.
*H04N 13/161* (2018.01)
*H04N 21/234* (2011.01)
*H04N 21/2343* (2011.01)

(52) U.S. Cl.
CPC ............... *H04N 21/23418* (2013.01); *H04N 21/234345* (2013.01)

(58) Field of Classification Search
CPC ..... H04N 21/234345; H04N 21/23439; H04N 13/359; H04N 19/597; H04N 19/70; H04N 21/236; H04N 21/26258; H04N 21/6125; H04N 21/816; H04N 21/84; H04N 21/8456; H04N 19/119
See application file for complete search history.

(56) References Cited

U.S. PATENT DOCUMENTS

| | | | |
|---|---|---|---|
| 2016/0156949 A1 | 6/2016 | Hattori et al. | |
| 2018/0020248 A1 | 1/2018 | Lai et al. | |
| 2019/0007669 A1* | 1/2019 | Kim | H04N 23/698 |
| 2019/0020880 A1* | 1/2019 | Wang | H04N 21/816 |
| 2019/0199921 A1* | 6/2019 | Oh | H04N 19/597 |
| 2020/0014907 A1* | 1/2020 | Lee | H04N 21/84 |
| 2020/0112710 A1 | 4/2020 | Oh et al. | |
| 2021/0337243 A1* | 10/2021 | Oh | H04N 19/597 |

FOREIGN PATENT DOCUMENTS

| | | | |
|---|---|---|---|
| CN | 101911713 | A | 12/2010 |
| CN | 102474659 | A | 5/2012 |
| CN | 105519131 | A | 4/2016 |
| CN | 106464943 | A | 2/2017 |
| GB | 2550587 | A | 11/2017 |
| JP | 2005050036 | A | 2/2005 |
| JP | 2006107163 | A | 4/2006 |
| TW | 201742464 | A | 12/2017 |
| WO | 2015/008775 | A1 | 1/2015 |
| WO | 2017/188714 | A1 | 11/2017 |

OTHER PUBLICATIONS

International Search Report and Written Opinion dated Feb. 12, 2019 for PCT/JP2018/048424 filed on Dec. 28, 2018, 19 pages including English Translation of the International Search Report.
3GPP, "3rd Generation Partnership Project; Technical Specification Group Services and System Aspects; Virtual Reality (VR) media services over 3GPP," Release 15, 3GPP TR 26.918 V15.0.0, Sep. 2017, pp. 1-94.
Boyce, et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, document: JCTVC-AC1005-V1, Oct. 24, 2017.
"Draft Guidelines," VR Industry Forum, Version 0.0, draft 010, CA, USA, Sep. 12, 2017, pp. 1-68.
Hhi, et al., "FS_VR: Viewport-dependent baseline media profile with tile streaming," 3GPP TSG-SA4 Meeting No. 94, S4-170589, Sophia Antipolis, France, Apr. 26-30, 2017, pp. 1-8.
Skupin, et al., "Standardization Status of 360 degree Video Coding and Delivery," IEEE Visual Communications and Image Processing (VCIP), St Petersburg, USA, Dec. 10-13, 2017, 4 pages.
Extended European Search Report dated Oct. 26, 2020 in European Patent Application No. 18900371.8, 11 pages.
Byeongdoo Choi, et al., "OMAF DIS text with updates based on Berlin OMAF AHG meeting agreements", ISO/IEC JTC1/SC29/WG11 M40849, Jul. 2017, XP030069193, 71 pages.
Extended European search report dated Jan. 15, 2021, in corresponding European patent Application No. 18900362.7, 14 pages.
Polin Lai, "OMAF Pack-VE Report", International Organisation for Standardisation Oganisation Internationale De Normalisation ISO/IEC JTC1/SC29/WG 11 Coding of Moving Pictures and Audio, ISO/IEC JTC1/SC29/WG11 MPEG2017/M39862, Jan. 2017, Geneva, Switzerland, total 49 pages.

* cited by examiner

FIG. 1

| | | | | | | | | | | | | |
|---|---|---|---|---|---|---|---|---|---|---|---|---|
| moov | | | | | | | | | | | | Movie Box |
| | trak | | | | | | | | | | | Track Box |
| | | tkhd | | | | | | | | | | Track Header Box |
| | | trgr | | | | | | | | | | Track Group Box |
| | | | spco | | | | | | | | | Sub Picture Composition Box |
| | | | | sprg | | | | | | | | Sub Picture Region Box USE FOR grouping OF sub picture tracks |
| | | | | | | | | | | | | Sub Picture Region Box sub-picture DIVISION INFORMATION |
| | | | | rwpk | | | | | | | | Region Wise Packing Box REGION-WISE PACKING INFORMATION RELATED TO ENTIRE PICTURE |
| | | | | stvi | | | | | | | | Stereo Video Box STEREOSCOPIC INFORMATION RELATED TO ENTIRE PICTURE |
| | | mdia | | | | | | | | | | Media Box |
| | | | minf | | | | | | | | | Media Information Box |
| | | | | stbl | | | | | | | | Sample Table Box |
| | | | | | stsd | | | | | | | Sample Description Box |
| | | | | | | resv | | | | | | Restricted Sample Entry TYPE OF Sample Entry |
| | | | | | | | rinf | | | | | Restricted Scheme Information Box |
| | | | | | | | | schi | | | | Scheme Information Box |
| | | | | | | | | | povd | | | Projected Omnidirectional Video Box STORE METADATA RELATED TO OMNIDIRECTIONAL VIDEO |
| | | | | | | | | | | stvi | | StereoVideoBox STEREOSCOPIC INFORMATION RELATED TO sub-pictures |
| | | | | | | sbgp | | | | | | Sample to Group Box |
| | | | | | | sgpd | | | | | | Sample Group Description Box |
| trak | | | | | | | | | | | | |

| moov | | | | | | | | | | | | Movie Box |
|---|---|---|---|---|---|---|---|---|---|---|---|---|
| | trak | | | | | | | | | | | Track Box |
| | | tkhd | | | | | | | | | | Track Header Box |
| | | mdia | | | | | | | | | | Media Box |
| | | | minf | | | | | | | | | Media Information Box |
| | | | | stbl | | | | | | | | Sample Table Box |
| | | | | | stsd | | | | | | | Sample Description Box |
| | | | | | | | | | | | | Restricted Sample Entry<br>TYPE OF Sample Entry |
| | | | | | | resv | | | | | | Restricted Scheme Information Box |
| | | | | | | | rinf | | | | | Scheme Information Box |
| | | | | | | | | schi | | | | Projected Omnidirectional Video Box<br>STORE METADATA RELATED TO OMNIDIRECTIONAL VIDEO |
| | | | | | | | | | povd | | | Region Wise Packing Box<br>REGION-WISE PACKING INFORMATION RELATED TO ENTIRE PICTURE |
| | | | | | | | | | | rwpk | | Stereo Video Box<br>STEREOSCOPIC INFORMATION RELATED TO ENTIRE PICTURE |
| | | | | | | | | | | | stvi | |
| | | | | | | sbgp | | | | | | Sample to Group Box |
| | | | | | | sgpd | | | | | | Sample Group Description Box |

```
aligned(8) class SubPictureCompositionBox extends TrackGroupTypeBox('spco') {
    SubPictureRegionBox();
    RegionWisePackingBox();  // optional
    // optional boxes
}
```

FIG. 4

```
aligned(8) class SubPictureRegionBox extends FullBox('sprg', 0, 0) {
    unsigned int(16) track_x;
    unsigned int(16) track_y;
    unsigned int(16) track_width;
    unsigned int(16) track_height;
    unsigned int(16) composition_width;
    unsigned int(16) composition_height;
}
```

| | |
|---|---|
| track_x | HORIZONTAL POSITION, ON ENTIRE PICTURE, OF sub-picture STORED IN track |
| track_y | VERTICAL POSITION, ON ENTIRE PICTURE, OF sub-picture STORED IN track |
| track_width | WIDTH OF sub-picture STORED IN track |
| track_height | HEIGHT OF sub-picture STORED IN track |
| composition_width | WIDTH OF ENTIRE PICTURE |
| composition_height | HEIGHT OF ENTIRE PICTURE |

```
aligned(8) class RegionWisePackingBox extends FullBox('rwpk', 0, 0) {
    RegionWisePackingStruct();
}
```

```
aligned(8) class RegionWisePackingStruct() {
    unsigned int(1) constituent_picture_matching_flag;
    bit(7) reserved = 0;
    unsigned int(8) num_regions;
    unsigned int(32) proj_picture_width;
    unsigned int(32) proj_picture_height;
    unsigned int(16) packed_picture_width;
    unsigned int(16) packed_picture_height;
    for (i = 0; i < num_regions; i++) {
        bit(3) reserved = 0;
        unsigned int(1) guard_band_flag[i];
        unsigned int(4) packing_type[i];
        if (packing_type[i] == 0) {
            RectRegionPacking(i);
            if (guard_band_flag[i])
                GuardBand(i);
        }
    }
}
```

| constituent_picture_matching_flag | FLAG INDICATING WHETHER OR NOT SAME region-wise packing IS APPLIED TO Left view AND Right view IN CASE WHERE PICTURE IS STEREOSCOPIC. <br> 0: MONOSCOPIC OR DIFFERENT packings ARE APPLIED TO Left view AND Right view. <br> 1: SAME packing IS APPLIED TO Left view AND Right view. |
|---|---|
| num_regions | NUMBER OF packed regions |
| proj_picture_width | WIDTH OF projected picture |
| proj_picture_height | HEIGHT OF projected picture |
| packed_picture_width | WIDTH OF packed picture |
| packed_picture_height | HEIGHT OF packed picture |
| guard_band_flag[i] | 0: NO GUARD BAND IS PRESENT IN packed region <br> 1: GUARD BAND IS PRESENT IN packed region |
| packing_type[i] | SHAPE OF paced region. <br> 0: RECTANGLE <br> Others: reserved |
| GuardBand(i) | GUARD BAND INFORMATION RELATED TO PERIPHERY OF REGION |

FIG. 9

```
aligned(8) class RectRegionPacking(i) {
    unsigned int(32) proj_reg_width[i];
    unsigned int(32) proj_reg_height[i];
    unsigned int(32) proj_reg_top[i];
    unsigned int(32) proj_reg_left[i];
    unsigned int(3) transform_type[i];
    bit(5) reserved = 0;
    unsigned int(16) packed_reg_width[i];
    unsigned int(16) packed_reg_height[i];
    unsigned int(16) packed_reg_top[i];
    unsigned int(16) packed_reg_left[i];
}
```

FIG. 10

| 28 | |
|---|---|
| proj_reg_width[i] | WIDTH OF projected region CORRESPONDING TO APPLICATION SOURCE OF region-wise packing |
| proj_reg_height[i] | HEIGHT OF projected region CORRESPONDING TO APPLICATION SOURCE OF region-wise packing |
| proj_reg_top[i] | VERTICAL POSITION OF projected region CORRESPONDING TO APPLICATION SOURCE OF region-wise packing |
| proj_reg_left[i] | HORIZONTAL POSITION OF projected region CORRESPONDING TO APPLICATION SOURCE OF region-wise packing |
| transform_type[i] | INDICATES ROTATION OR MIRRORING OF packed region. |
| packed_reg_width[i] | WIDTH OF packed region REARRANGED BY region-wise packing |
| packed_reg_height[i] | HEIGHT OF packed region REARRANGED BY region-wise packing |
| packed_reg_top[i] | VERTICAL POSITION OF packed region REARRANGED BY region-wise packing |
| packed_reg_left[i] | HORIZONTAL POSITION OF packed region REARRANGED BY region-wise packing |

FIG. 16

```
331
aligned(8) class 2DCoverageInformationBox() extends FullBox('2dco', 0, 0) {
    unsigned int(32) proj_picture_width;
    unsigned int(32) proj_picture_height;
    unsigned int(16) proj_reg_width;
    unsigned int(16) proj_reg_height;
    unsigned int(16) proj_reg_top;
    unsigned int(16) proj_reg_left;
}
```

FIG. 17

| | |
|---|---|
| 332 | |
| proj_picture_width | WIDTH OF projected picture. |
| proj_picture_height | HEIGHT OF projected picture. |
| proj_reg_width | WIDTH OF REGION ON projected picture TO WHICH picture IN track CORRESPONDS. |
| proj_reg_height | HEIGHT OF REGION ON projected picture TO WHICH picture IN track CORRESPONDS. |
| proj_reg_top | VERTICAL COORDINATE OF REGION ON projected picture TO WHICH picture IN track CORRESPONDS. |
| proj_reg_left | REGION HORIZONTAL COORDINATE ON projected picture TO WHICH picture IN track CORRESPONDS. |

FIG. 20

```
aligned(8) class 2DCoverageInformationBox() extends FullBox('2dco', 0, 0) {
    unsigned int(32) proj_picture_width;
    unsigned int(32) proj_picture_height;
    unsigned int(8) num_regions;
    for(i=0; i<num_regions; i++) {
        unsigned int(16) proj_reg_width[i];
        unsigned int(16) proj_reg_height[i];
        unsigned int(16) proj_reg_top[i];
        unsigned int(16) proj_reg_left[i];
    }
}
```

372
num_regions | NUMBER OF REGIONS ON projected picture

FIG. 22

373
```
aligned(8) class RegionWisePackingStruct() {
    unsigned int(1) constituent_picture_matching_flag;
    unsigned int(1) 2D_coverage_flag;
    bit(6) reserved = 0;
    unsigned int(8) num_regions;
    unsigned int(32) proj_picture_width;
    unsigned int(32) proj_picture_height;
    if(2D_coverage_flag == 0) {
        unsigned int(16) packed_picture_width;
        unsigned int(16) packed_picture_height;
    }
    for (i = 0; i < num_regions; i++) {
        if(2D_coverage_flag == 1)
            RectProjectedRegion(i);
        else {
            bit(3) reserved = 0;
            unsigned int(1) guard_band_flag[i];
            unsigned int(4) packing_type[i];
            if (packing_type[i] == 0) {
                RectRegionPacking(i);
                if (guard_band_flag[i])
                    GuardBand(i);
            }
        }
    }
}
```

`2D_coverage_flag` — FLAG INDICATING WHETHER OR NOT TO SIGNAL ONLY DISPLAY REGION ON Projected picture.
0: SIGNALS region-wise packing INFORMATION
1: SIGNALS DISPLAY REGION ON projected picture

FIG. 24

```
aligned(8) class RectProjectedRegion(i) {
    unsigned int(32) proj_reg_width[i];
    unsigned int(32) proj_reg_height[i];
    unsigned int(32) proj_reg_top[i];
    unsigned int(32) proj_reg_left[i];
}
```

| 376 | |
|---|---|
| proj_reg_width | WIDTH OF REGION ON projected picture TO WHICH picture IN track CORRESPONDS. |
| proj_reg_height | HEIGHT OF REGION ON projected picture TO WHICH picture IN track CORRESPONDS. |
| proj_reg_top | VERTICAL COORDINATE OF REGION ON projected picture TO WHICH picture IN track CORRESPONDS. |
| proj_reg_left | REGION HORIZONTAL COORDINATE ON projected picture TO WHICH picture IN track CORRESPONDS. |

FIG. 26

```
377~aligned(8) class RegionWisePackingStruct() {
        unsigned int(1) constituent_picture_matching_flag;
        unsigned int(1) 2D_coverage_flag;
        bit(6) reserved = 0;
        unsigned int(8) num_regions;
        unsigned int(32) proj_picture_width;
        unsigned int(32) proj_picture_height;
        if(2D_coverage_flag == 0) {
            unsigned int(16) packed_picture_width;
            unsigned int(16) packed_picture_height;
        }
        for (i = 0; i < num_regions; i++) {
            bit(3) reserved = 0;
            unsigned int(1) guard_band_flag[i];
            unsigned int(4) packing_type[i];
            if (packing_type[i] == 0) {
                RectRegionPacking(i, 2D_coverage_flag);
                if (guard_band_flag[i])
                    GuardBand(i);
            }
        }
    }
```

FIG. 27

```
aligned(8) class RectRegionPacking(i, proj_region_flag) {
    unsigned int(32) proj_reg_width[i];
    unsigned int(32) proj_reg_height[i];
    unsigned int(32) proj_reg_top[i];
    unsigned int(32) proj_reg_left[i];
    if (proj_region_flag == 0) {
        unsigned int(3)  transform_type[i];
        bit(5) reserved = 0;
        unsigned int(16) packed_reg_width[i];
        unsigned int(16) packed_reg_height[i];
        unsigned int(16) packed_reg_top[i];
        unsigned int(16) packed_reg_left[i];
    }
}
```

```
aligned(8) class CoverageInformationBox extends FullBox('covi', 0, 0) {
    unsigned int(1) 2D_coverage_flag;
    bit(7) reserved = 0;
    if(2D_coverage_flag==0)
        ContentCoverageStruct();
    else
        2DContentCoverageStruct();
}
```

| 2D_coverage_flag | SIGNAL TYPE OF DISPLAY REGION INFORMATION.<br>0: SIGNAL SPHERICAL-SURFACE DISPLAY REGION INFORMATION<br>1: SIGNAL DISPLAY REGION ON projected picture |
| --- | --- |
| ContentCoverageStruct () | SIGNAL SPHERICAL-SURFACE DISPLAY REGION IN track |
| 2DContentCoverageStruct () | SIGNAL DISPLAY REGION ON projected picture IN track.<br>FIELDS IN 2D Content Coverage Strcut ARE SIMILAR TO<br>FIELDS IN 2D Coverage Information Box IN FIG. 8. |

FIG. 30

```
2D_coverage_information(payloadSize) {
  2D_coverage_information_cancel_flag
  if(!2D_coverage_information_cancel_flag) {
    2D_coverage_information_persistence_flag;
    2D_coverage_information
    reserved_zero_6bits;
    unsigned int(32) proj_picture_width;
    unsigned int(32) proj_picture_height;
    unsigned int(8)  num_regions;
    for(i=0; i<num_regions; i++) {
      unsigned int(16) proj_reg_width[i];
      unsigned int(16) proj_reg_height[i];
      unsigned int(16) proj_reg_top[i];
      unsigned int(16) proj_reg_left[i];
    }
  }
}
```

| | Descriptor |
|---|---|
| | u(1) |
| | u(1) |
| | u(6) |
| | u(32) |
| | u(32) |
| | u(8) |
| | u(16) |
| | u(16) |
| | u(16) |
| | u(16) |

| | |
|---|---|
| 382 — 2D_coverage_information_cancel_flag | FOR FLAG = 1, PERSISTENT APPLICATION OF SEI PRECEDING IN ORDER OF OUTPUT IS CANCELLED. FOR FLAG = 0, 2D coverage INFORMATION IS SIGNALED. |
| 2D_coverage_information_persitence_flag | FOR FLAG = 0, SEI INFORMATION IS APPLIED ONLY TO PICTURE INCLUDING SEI. FOR FLAG = 1, APPLICATION OF SEI IS PERSISTENT UNTIL NEW coded video sequence IS STARTED OR END OF STREAM IS REACHED. |
| 2D_coverage_information_reserved_zero_6bits | FILLED WITH 0. |
| proj_picture_width | WIDTH OF projected picture. |
| proj_picture_height | HEIGHT OF projected picture. |
| num_regions | NUMBER OF REGIONS ON projected picture. |
| proj_reg_width | WIDTH OF REGION ON projected picture TO WHICH STREAM CORRESPONDS. |
| proj_reg_height | HEIGHT OF REGION ON projected picture TO WHICH STREAM CORRESPONDS. |
| proj_reg_top | VERTICAL COORDINATE OF REGION ON projected picture TO WHICH STREAM CORRESPONDS. |
| proj_reg_left | REGION HORIZONTAL COORDINATE ON projected picture TO WHICH STREAM CORRESPONDS. |

FIG. 32

```
class 2DCoverageInformationSampleEntry() extends
MetaDataSampleEntry(2dco) {
  unsigned int(32) proj_picture_width;
  unsigned int(32) proj_picture_height;
  Box[] other_boxes; // optional
}
```

```
aligned(8) 2DCoverageInformationSample() {
    unsigned int(8) num_regions;
    for(i=0; i<num_regions; i++) {
        unsigned int(16) proj_reg_width[i];
        unsigned int(16) proj_reg_height[i];
        unsigned int(16) proj_reg_top[i];
        unsigned int(16) proj_reg_left[i];
    }
}
```

```
class 2DCoverageInformationSampleGroupEntry extends VisualSampleGroupEntry ('2cgp') {
    unsigned int(32) proj_picture_width;
    unsigned int(32) proj_picture_height;
    unsigned int(8) num_regions;
    for(i=0; i<num_regions; i++) {
        unsigned int(16) proj_reg_width[i];
        unsigned int(16) proj_reg_height[i];
        unsigned int(16) proj_reg_top[i];
        unsigned int(16) proj_reg_left[i];
    }
}
```

| ATTRIBUTE VALUE | DATA TYPE | DESCRIPTION |
|---|---|---|
| omaf:@proj_picture_width | xs:unsignedInt | WIDTH OF projected picture |
| omaf:@proj_picture_height | xs:unsignedInt | HEIGHT OF projected picture |
| omaf:@proj_reg_width | xs:unsignedInt | WIDTH OF REGION ON projected picture TO WHICH picture REFERENCED BY Adaptation Set CORRESPONDS. |
| omaf:@proj_reg_height | xs:unsignedInt | HEIGHT OF REGION ON projected picture TO WHICH PICTURE REFERENCED BY Adaptation Set CORRESPONDS. |
| omaf:@proj_reg_top | xs:unsignedInt | VERTICAL COORDINATE OF REGION ON projected picture TO WHICH picture REFERENCED BY Adaptation Set CORRESPONDS. |
| omaf:@proj_reg_left | xs:unsignedInt | REGION HORIZONTAL COORDINATE ON projected picture TO WHICH picture REFERENCED BY Adaptation Set CORRESPONDS. |

| ELEMENT AND ATTRIBUTE VALUE | DATA TYPE | DESCRIPTION |
|---|---|---|
| twoDCoverage | omaf:twoDCoverageType | CONTAINER ELEMENT |
| twoDCoverage@proj_picture_width | xs:unsignedInt | WIDTH OF projected picture |
| twoDCoverage@proj_picture_height | xs:unsignedInt | HEIGHT OF projected picture |
| twoDCoverage.twoDCoverageInfo | omaf:twoDCoverageInfoType | ELEMENT INDICATING REGION INFORMATION RELATED TO REGION ON projected picture PLURALITY OF SIGNALS CAN BE PROVIDED |
| twoDCoverage.twoDCoverageInfo@proj_reg_width | xs:unsignedInt | WIDTH OF REGION ON projected picture TO WHICH picture REFERENCED BY Adaptation Set CORRESPONDS |
| twoDCoverage.twoDCoverageInfo@proj_reg_height | xs:unsignedInt | HEIGHT OF REGION ON projected picture TO WHICH picture REFERENCED BY Adaptation Set CORRESPONDS |
| twoDCoverage.twoDCoverageInfo@proj_reg_top | xs:unsignedInt | VERTICAL COORDINATE OF REGION ON projected picture TO WHICH picture REFERENCED BY Adaptation Set CORRESPONDS |
| twoDCoverage.twoDCoverageInfo@proj_reg_left | xs:unsignedInt | REGION HORIZONTAL COORDINATE ON projected picture TO WHICH picture REFERENCED BY Adaptation Set CORRESPONDS |

FIG. 40

```xml
<?xml version="1.0" encoding="UTF-8"?>
<xs:schema xmlns:xs="http://www.w3.org/2001/XMLSchema"
targetNamespace="urn:mpeg:mpegI:omaf:2017"
xmlns:omaf="urn:mpeg:mpegI:omaf:2017"
elementFormDefault="qualified">
  <xs:element name="twoDCoverage" type="omaf:twoDCoverageType"/>
  <xs:complexType name="twoDCoverageType">
    <xs:sequence>
      <xs:element name="twoDCoverageInfo" type="omaf:twoDCoverageInfoType" minOccurs="1" maxOccurs="255"/>
      <xs:any namespace="##other" processContents="lax" minOccurs="0" maxOccurs="unbounded"/>
    </xs:sequence>
    <xs:anyAttribute namespace="##other" processContents="lax"/>
  </xs:complexType>
  <xs:complexType name="twoDCoverageInfoType">
    <xs:attribute name="proj_picture_width" type="xs:unsignedInt" use="required"/>
    <xs:attribute name="proj_picture_height" type="xs:unsignedInt" use="required"/>
    <xs:attribute name="proj_reg_width" type="xs:unsignedInt" use="required"/>
    <xs:attribute name="proj_reg_height" type="xs:unsignedInt" use="required"/>
    <xs:attribute name="proj_reg_top" type="xs:unsignedInt" use="required"/>
    <xs:attribute name="proj_reg_left" type="xs:unsignedInt" use="required"/>
    <xs:anyAttribute namespace="##other" processContents="lax"/>
  </xs:complexType>
</xs:schema>
```

| ATTRIBUTE VALUE | DATA TYPE | DESCRIPTION |
|---|---|---|
| omaf:@packing_type | omaf:OptionallistofUnsignedByte | INDICATES PACKING TYPE OF region-wise packing<br>0: PACKING OF RECTANGULAR REGION<br>Others: reserved |
| omaf:@proj_picture_width | xs:unsignedInt | WIDTH OF projected picture |
| omaf:@proj_picture_height | xs:unsignedInt | HEIGHT OF projected picture |
| omaf:@proj_reg_width | xs:unsignedInt | WIDTH OF REGION ON projected picture TO WHICH picture REFERENCED BY Adaptation Set CORRESPONDS |
| omaf:@proj_reg_height | xs:unsignedInt | HEIGHT OF REGION ON Projected picture TO WHICH picture REFERENCED BY Adaptation Set CORRESPONDS |
| omaf:@proj_reg_top | xs:unsignedInt | VERTICAL COORDINATE OF REGION ON projected picture TO WHICH picture REFERENCED BY Adaptation Set CORRESPONDS |
| omaf:@proj_reg_left | xs:unsignedInt | REGION HORIZONTAL COORDINATE ON projected picture TO WHICH picture REFERENCED BY Adaptation Set CORRESPONDS |

| ATTRIBUTE VALUE | DATA TYPE | DESCRIPTION |
|---|---|---|
| omaf:@packing_type | omaf:OptionallistofUnsignedByte | INDICATES PACKING TYPE OF region-wise packing 0: PACKING OF RECTANGULAR REGION Others: reserved |
| twoDCoverage | omaf:twoDCoverageType | CONTAINER ELEMENT |
| twoDCoverage@proj_picture_width | xs:unsignedInt | WIDTH OF projected picture |
| twoDCoverage@proj_picture_height | xs:unsignedInt | HEIGHT OF projected picture |
| twoDCoverage.twoDCoverageInfo | omaf:twoDCoverageInfoType | ELEMENT INDICATING REGION INFORMATION RELATED TO REGION ON projected picture |
| twoDCoverage.twoDCoverageInfo@proj_reg_width | xs:unsignedInt | WIDTH OF REGION ON projected picture TO WHICH picture REFERENCED BY Adaptation Set CORRESPONDS |
| twoDCoverage.twoDCoverageInfo@proj_reg_height | xs:unsignedInt | HEIGHT OF REGION ON Projected picture TO WHICH picture REFERENCED BY Adaptation Set CORRESPONDS |
| twoDCoverage.twoDCoverageInfo@proj_reg_top | xs:unsignedInt | VERTICAL COORDINATE OF REGION ON projected picture TO WHICH picture REFERENCED BY Adaptation Set CORRESPONDS |
| twoDCoverage.twoDCoverageInfo@proj_reg_left | xs:unsignedInt | REGION HORIZONTAL COORDINATE ON projected picture TO WHICH picture REFERENCED BY Adaptation Set CORRESPONDS |

| ATTRIBUTE VALUE | DATA TYPE | DESCRIPTION |
|---|---|---|
| | | CONTAINER ELEMENT |
| cc@2D_coverage_flag | xs:boolean | INDICATES WHETHER DISPLAY REGION IS DEFINED ON SPHERICAL SURFACE OR ON projected picture<br>0: ON SPHERICAL SURFACE<br>1: ON projected picture |
| cc.sphericalCoverage | omaf:sphericalCoverageType | CONTAINER ELEMENT IN SPHERICAL-SURFACE DISPLAY REGION INFORMATION PRESENT ONLY WHEN cc@2D_coverage_flag = 0 |
| cc.sphericalCoverage@shape_type | omaf:shapeType | INDICATES SHAPE OF SPHERICAL-SURFACE REGION<br>0: REGION ENCLOSED BY 4 great circles<br>1: REGION ENCLOSED BY TWO azimuth circles AND TWO elevation angles<br>others: reserved |
| cc.sphericalCoverage@view_idc_presence_flag | xs:boolean | FLAG INDICATING WHETHER OR NOT view_idc ATTRIBUTE IS PRESENT<br>0: view_idc ATTRIBUTE IS NOT PRESENT<br>1: view_idc ATTRIBUTE IS PRESENT |
| cc.sphericalCoverage@default_view_idc | omaf:ViewType | INDICATES view COMMON TO ALL REGIONS<br>0: monoscopic view<br>1: left view<br>2: right view<br>3: stereoscopic view<br>THIS ATTRIBUTE IS INEVITABLY PRESENT WHEN cc@view_idc_presence_flag = 0<br>THIS ATTRIBUTE IS INHIBITED FROM BEING PRESENT WHEN cc@view_idc_presence_flag = 1 |
| cc.sphericalCoverage.coverageInfo | omaf:coverageInfoType | ELEMENT INDICATING SPHERICAL-SURFACE REGION INFORMATION PLURALITY OF SIGNALS CAN BE PROVIDED |
| cc.sphericalCoverage.coverageInfo@view_idc | omaf:ViewType | INDICATES DIFFERENT views FOR RESPECTIVE REGIONS<br>0: monoscopic view<br>1: left view<br>2: right view<br>3: stereoscopic view<br>THIS ATTRIBUTE IS INHIBITED FROM BEING PRESENT WHEN cc@view_idc_presence_flag = 0<br>THIS ATTRIBUTE IS INEVITABLY PRESENT WHEN cc@view_idc_presence_flag = 1 |

FIG. 44

| | | |
|---|---|---|
| cc.sphericalCoverage.coverageInfo@center_azimuth | omaf:Range1 | AZIMUTH ANGLE OF SPHERICAL-SURFACE DISPLAY REGION CENTER |
| cc.sphericalCoverage.coverageInfo@center_elevation | omaf:Range2 | ELEVATION ANGLE OF SPHERICAL-SURFACE DISPLAY REGION CENTER |
| cc.sphericalCoverage.coverageInfo@center_tilt | omaf:Range2 | TILT ANGLE OF SPHERICAL-SURFACE DISPLAY REGION CENTER |
| cc.sphericalCoverage.coverageInfo@hor_range | omaf:Range3 | AZIMUTH RANGE OF SPHERICAL-SURFACE DISPLAY REGION |
| cc.sphericalCoverage.coverageInfo@ver_range | omaf:Range4 | ELEVATION RANGE OF SPHERICAL-SURFACE DISPLAY REGION |
| cc.two2Dcoverage | omaf:two2DcoverageType | CONTAINER ELEMENT IN DISPLAY REGION INFORMATION ON projected picture PRESENT ONLY WHEN cc@2D_coverage_flag = 1 |
| cc.two2Dcoverage.two2DcoverageInfo@proj_picture_width | xs:unsignedInt | WIDTH OF projected picture |
| cc.two2Dcoverage.two2DcoverageInfo@proj_picture_height | xs:unsignedInt | HEIGHT OF projected picture |
| cc.two2Dcoverage.two2DcoverageInfo | omaf:two2DcoverageInfoType | ELEMENT INDICATING REGION INFORMATION RELATED TO REGION ON projected picture PLURALITY OF SIGNALS CAN BE PROVIDED |
| cc.two2Dcoverage.two2DcoverageInfo@proj_reg_width | xs:unsignedInt | WIDTH OF REGION ON projected picture TO WHICH picture REFERENCED BY Adaptation Set CORRESPONDS |
| cc.two2Dcoverage.two2DcoverageInfo@proj_reg_height | xs:unsignedInt | HEIGHT OF REGION ON projected picture TO WHICH picture REFERENCED BY Adaptation Set CORRESPONDS |
| cc.two2Dcoverage.two2DcoverageInfo@proj_reg_top | xs:unsignedInt | VERTICAL COORDINATE OF REGION ON projected picture TO WHICH picture REFERENCED BY Adaptation Set CORRESPONDS |
| cc.two2Dcoverage.two2DcoverageInfo@proj_reg_left | xs:unsignedInt | HORIZONTAL COORDINATE OF REGION ON projected picture TO WHICH picture REFERENCED BY Adaptation Set CORRESPONDS |

```xml
<?xml version="1.0" encoding="UTF-8"?>
<xs:schema xmlns:xs="http://www.w3.org/2001/XMLSchema"
targetNamespace="urn:mpeg:mpegI:omaf:2017"
xmlns:omaf="urn:mpeg:mpegI:omaf:2017"
elementFormDefault="qualified">
  <xs:element name="cc" type="omaf:CCType"/>
  <xs:complexType name="CCType">
    <xs:sequence>
      <xs:element name="sphericalCoverage" type="omaf:sphericalCoverageType" minOccurs="0" maxOccurs="1"/>
      <xs:element name="twoDCoverage" type="omaf:twoDCoverageType" minOccurs="0" maxOccurs="1"/>
    </xs:sequence>
    <xs:attribute name="2D_coverage_flag" type="xs:boolean" use="optional" default="0"/>
    <xs:anyAttribute namespace="##other" processContents="lax"/>
  </xs:complexType>
  <xs:complexType name="omaf:sphericalCoverageType">
    <xs:sequence>
      <xs:element name="coverageInfo" type="omaf:coverageInfoType" minOccurs="1" maxOccurs="255"/>
      <xs:any namespace="##other" processContents="lax" minOccurs="0" maxOccurs="unbounded"/>
    </xs:sequence>
    <xs:attribute name="shape_type" type="xs:unsignedByte" use="optional" default="0"/>
    <xs:attribute name="view_idc_presence_flag" type="xs:boolean" use="optional"/>
    <xs:attribute name="default_view_idc" type="omaf:ViewType" use="optional"/>
    <xs:anyAttribute namespace="##other" processContents="lax"/>
  </xs:complexType>
```

```
419
<xs:complexType name="coverageInfoType">
    <xs:attribute name="view_idc" type="omaf:ViewType" use="optional" default="0"/>
    <xs:attribute name="center_azimuth" type="omaf:Range1" use="optional" default="0"/>
    <xs:attribute name="center_elevation" type="omaf:Range2" use="optional" default="0"/>
    <xs:attribute name="center_tilt" type="omaf:Range1" use="optional" default="0"/>
    <xs:attribute name="azimuth_range" type="omaf:HRange" use="optional" default="23592960"/>
    <xs:attribute name="elevation_range" type="omaf:VRange" use="optional" default="11796480"/>
    <xs:anyAttribute namespace="##other" processContents="lax"/>
</xs:complexType>
<xs:complexType name="twoDCoverageType">
    <xs:sequence>
        <xs:element name="twoDCoverageInfo" type="omaf:twoDCoverageInfoType" minOccurs="1" maxOccurs="255"/>
        <xs:any namespace="##other" processContents="lax" minOccurs="0" maxOccurs="unbounded"/>
    </xs:sequence>
    <xs:attribute name="proj_picture_width" type="xs:unsignedInt" use="required"/>
    <xs:attribute name="proj_picture_height" type="xs:unsignedInt" use="required"/>
    <xs:anyAttribute namespace="##other" processContents="lax"/>
</xs:complexType>
<xs:complexType name="twoDCoverageInfoType">
    <xs:attribute name="proj_reg_width" type="xs:unsignedInt" use="required"/>
    <xs:attribute name="proj_reg_height" type="xs:unsignedInt" use="required"/>
    <xs:attribute name="proj_reg_top" type="xs:unsignedInt" use="required"/>
    <xs:attribute name="proj_reg_left" type="xs:unsignedInt" use="required"/>
    <xs:anyAttribute namespace="##other" processContents="lax"/>
</xs:complexType>
```

FIG. 47

```
420
<xs:simpleType name="Range1">
    <xs:restriction base="xs:int">
        <xs:minInclusive value="-11796480"/>
        <xs:maxInclusive value="11796479"/>
    </xs:restriction>
</xs:simpleType>
<xs:simpleType name="Range2">
    <xs:restriction base="xs:int">
        <xs:minInclusive value="-5898240"/>
        <xs:maxInclusive value="5898240"/>
    </xs:restriction>
</xs:simpleType>
<xs:simpleType name="HRange">
    <xs:restriction base="xs:unsignedInt">
        <xs:minInclusive value="0"/>
        <xs:maxInclusive value="23592960"/>
    </xs:restriction>
</xs:simpleType>
<xs:simpleType name="VRange">
    <xs:restriction base="xs:unsignedInt">
        <xs:minInclusive value="0"/>
        <xs:maxInclusive value="11796480"/>
    </xs:restriction>
</xs:simpleType>
<xs:simpleType name="ViewType">
    <xs:restriction base="xs:unsignedByte">
        <xs:minInclusive value="0"/>
        <xs:maxInclusive value="3"/>
    </xs:restriction>
</xs:simpleType>
</xs:schema>
```

FIG. 53

```
461
aligned(8) class OriginalStereoVideoBox extends extends FullBox(ostv, version = 0, 0)
{
    template unsigned int(30) reserved = 0;
    unsigned int(2) single_view_allowed;
    unsigned int(32) stereo_scheme;
    unsigned int(32) length;
    unsigned int(8)[length] stereo_indication_type;
    Box[] any_box; // optional
}
```

FIG. 54

| | 462 | | |
|---|---|---|---|
| single_view_allowed | 0: CONTENT IS INTENDED TO BE DISPLAYED ONLY BY STEREOSCOPIC DISPLAY (single_view_allowed&1) = 1: CONTENT IS ALLOWED TO BE DISPLAYED IN right view ON MONOSCOPIC DISPLAY (single_view_allowed&2) = 2: CONTENT IS ALLOWED TO BE DISPLAYED IN left view ON MONOSCOPIC DISPLAY | | |
| stereo_scheme | 1: FRAME PACKING METHOD COMPLIES WITH Frame packing arrangement SEI OF ISO/IEC 14496-10<br>2: FRAME PACKING METHOD COMPLIES WITH Annex. L OF ISO/IEC 13818-2<br>3: FRAME PACKING METHOD COMPLIES WITH frame/service compatible AND 2D/3D Mixed service OF ISO/IEC 23000-11 | | |
| length | BYTE LENGTH OF stereo_indication_type | | |
| stereo_indication_type | FRAME PACKING METHOD IN ACCORDANCE WITH streo_scheme | | |

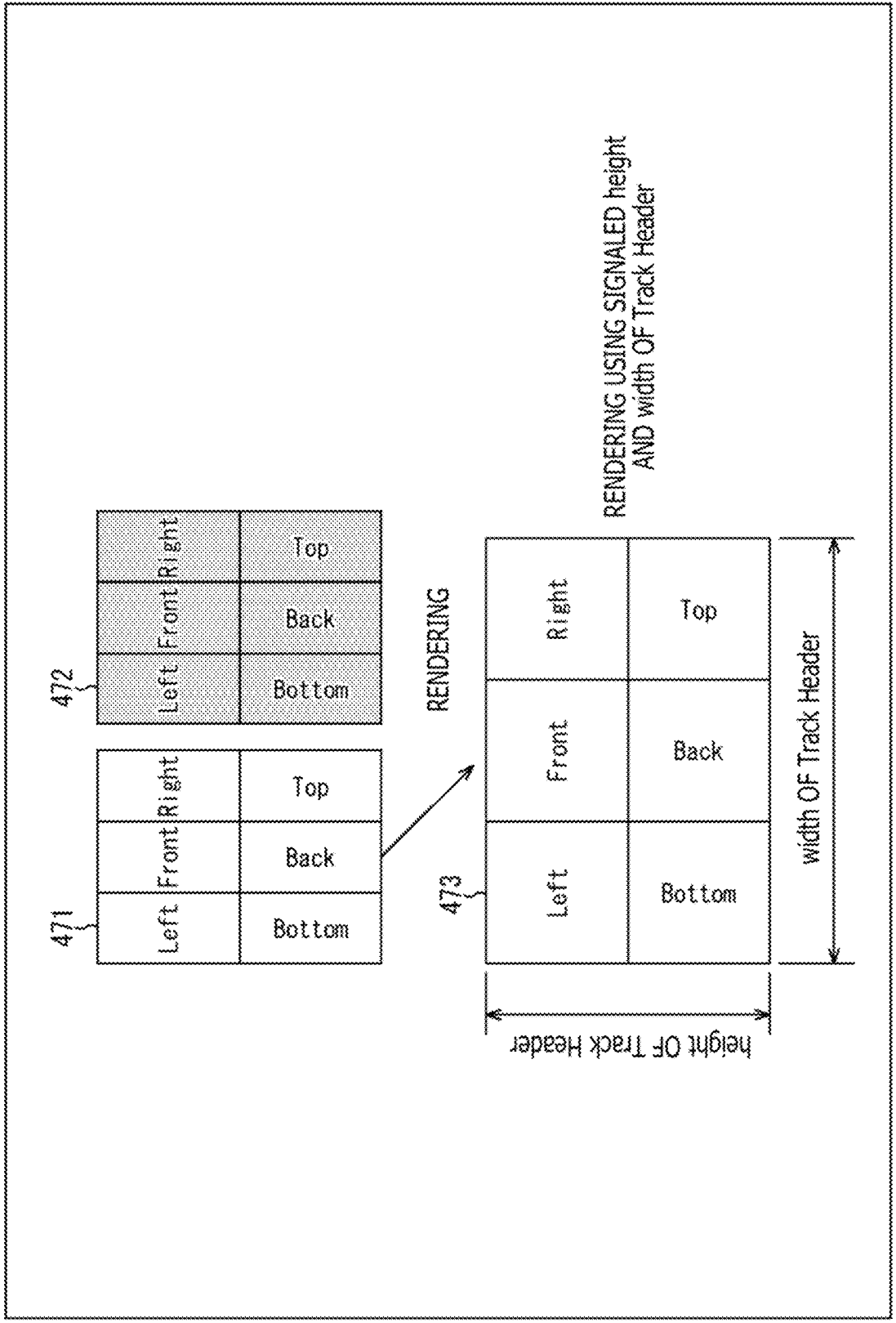

FIG.56

```
481
class PixelAspectRatioBox extends Box('pasp') {
    unsigned int(32) hSpacing;
    unsigned int(32) vSpacing;
}
```

FIG. 59

```
aligned(8) class OriginalSchemeInformationBox extends Box('osch') {
  Box scheme_specific_data[];
}
```

```
aligned(8) class 2DCoverageInformationBox() extends FullBox('2dco', 0, 0) {
    bit(6) reserved = 0;
    unsigned int(2) stereo_presentation_suitable;
    unsigned int(32) proj_picture_width;
    unsigned int(32) proj_picture_height;
    unsigned int(8) num_regions;
    for(i=0; i<num_regions; i++) {
        unsigned int(16) proj_reg_width[i];
        unsigned int(16) proj_reg_height[i];
        unsigned int(16) proj_reg_top[i];
        unsigned int(16) proj_reg_left[i];
    }
}
```

503: stereo_presentation_suitable

0: PICTURE IN track IS MONOSCOPIC OR INCLUDES L view AND R view BUT IS NOT STEREOSCOPICALLY DISPLAYABLE
1: PICTURE IN track CAN BE STEREOSCOPICALLY DISPLAYED IN PARTIAL REGION
2: PICTURE IN track CAN BE STEREOSCOPICALLY DISPLAYED OVER ENTIRE REGION
Others: reserved

FIG. 63

```
531
aligned(8) class TrackStereoVideoBox() extends FullBox('tstv', 0, 0) {
    bit(7) reserved = 0;
    unsigned int(1) stereo_presentation_suitable;
}
```

```
aligned(8) class 2DCoverageInformationBox() extends FullBox('2dco', 0, 0) {
    bit(7) reserved = 0;
    unsigned int(1) view_idc_presence_flag;
    if (view_idc_presence_flag == 0) {
        unsigned int(2) default_view_idc;
        bit(6) reserved = 0;
    }
    unsigned int(32) proj_picture_width;
    unsigned int(32) proj_picture_height;
    unsigned int(8) num_regions;
    for (i=0; i<num_regions; i++) {
        if (view_idc_presence_flag == 1) {
            unsigned int(2) view_idc;
            bit(6) reserved = 0;
        }
        unsigned int(16) proj_reg_width[i];
        unsigned int(16) proj_reg_height[i];
        unsigned int(16) proj_reg_top[i];
        unsigned int(16) proj_reg_left[i];
    }
}
```

| view_idc_presense_flag | INDICATES WHETHER OR NOT SEPARATE view_idc IS PRESENT IN EACH REGION.<br>0: SEPARATE view_idc IS NOT PRESENT IN EACH REGION.<br>1: SEPARATE view_idc IS PRESENT IN EACH REGION. |
|---|---|
| default_view_idc | INDICATES view COMMON TO ALL REGIONS.<br>0: monoscopic view<br>1: left view<br>2: right view<br>3: stereoscopic view |
| view_idc | INDICATES DIFFERENT views FOR RESPECTIVE REGIONS.<br>0: monoscopic view<br>1: left view<br>2: right view<br>3: stereoscopic view<br>IN CASE WHERE THIS FIELD IS NOT PRESENT, default_view_idc INDICATES DIFFERENT view FOR EACH REGION. |

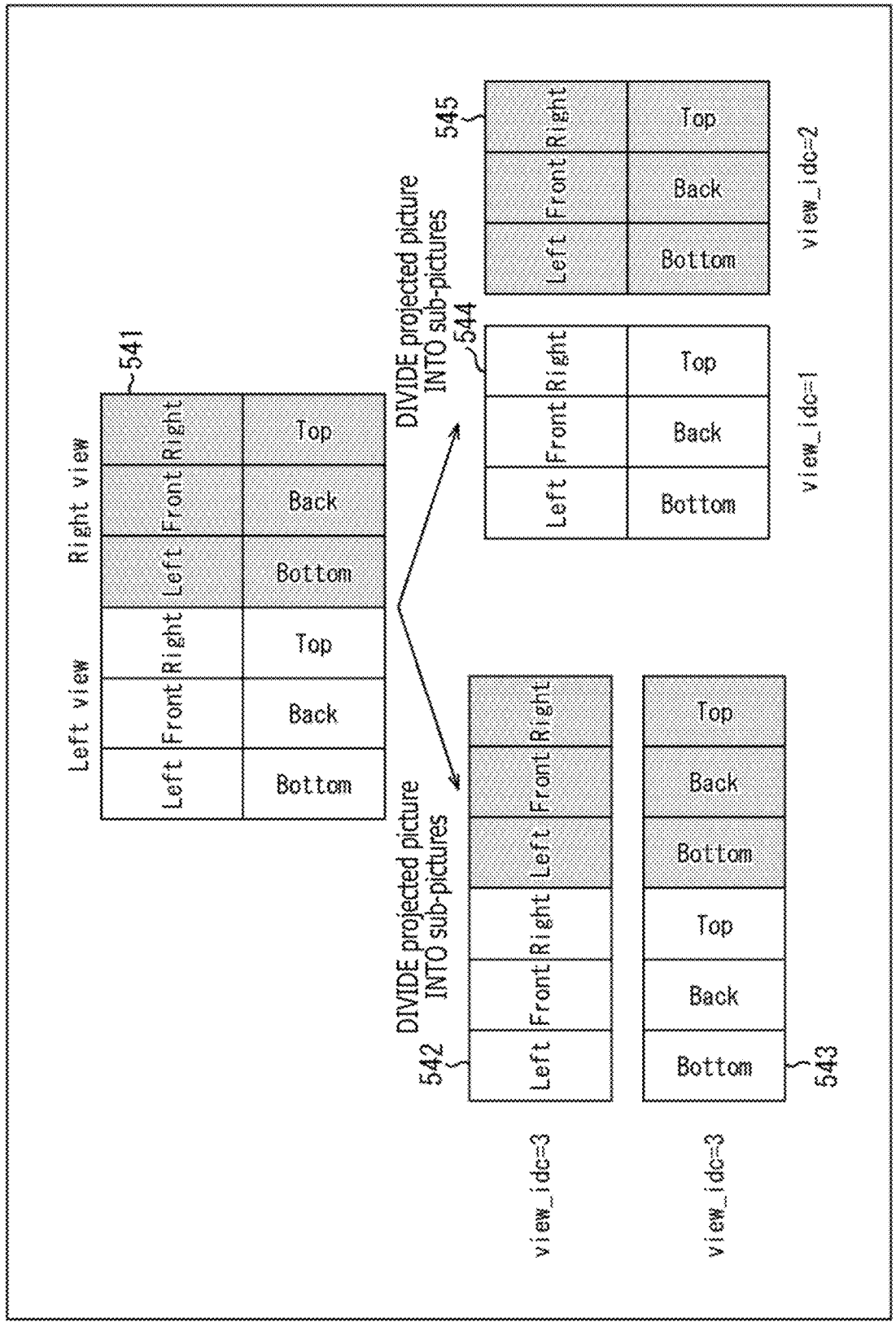
F I G . 6 6

| ATTRIBUTE VALUE | DATA TYPE | DESCRIPTION |
|---|---|---|
| twoDCoverage | omaf:twoDCoverageType | CONTAINER ELEMENT |
| twoDCoverage@stereo_presentation_suitable | omaf:StereoPresentationType | INDICATES WHETHER Adaptation Sets IS STEREOSCOPICALLY DISPLAYABLE<br>0: PICTURE REFERENCED BY Adaptation Sets IS MONOSCOPICALLY OR STEREOSCOPICALLY DISPLAYABLE<br>1: PICTURE REFERENCED BY Adaptation Sets IS STEREOSCOPICALLY DISPLAYABLE IN PARTIAL REGION<br>2: PICTURE REFERENCED BY Adaptation Sets IS STEREOSCOPICALLY DISPLAYABLE OVER ENTIRE REGION |
| twoDCoverage@view_idc_presence_flag | xs:boolean | INDICATES WHETHER OR NOT SEPARATE view_idc IS PRESENT IN EACH REGION<br>0: SEPARATE view_idc IS NOT PRESENT IN EACH REGION<br>1: SEPARATE view_idc IS PRESENT IN EACH REGION |
| twoDCoverage@default_view_idc | omaf:ViewType | INDICATES VIEW COMMON TO ALL REGIONS<br>0: monoscopic view<br>1: left view<br>2: right view<br>3: stereoscopic view<br>THIS ATTRIBUTE IS INEVITABLY PRESENT WHEN twoDCoverage@view_idc_presence_flag = 0<br>THIS ATTRIBUTE IS INHIBITED FROM BEING PRESENT WHEN twoDCoverage@view_idc_presence_flag = 1 |
| twoDCoverage@proj_picture_width | xs:unsignedint | WIDTH OF projected picture |
| twoDCoverage@proj_picture_height | xs:unsignedint | HEIGHT OF projected picture |
| twoDCoverage.twoDCoverageInfo | omaf:twoDCoverageInfoType | ELEMENT INDICATING REGION INFORMATION RELATED TO REGION ON projected picture PLURALITY OF SIGNALS CAN BE PROVIDED |

| twoDCoverage.twoDCoverageInfo@view_idc | omaf:ViewType | INDICATES DIFFERENT views FOR RESPECTIVE REGIONS<br>0: monoscopic view<br>1: left view<br>2: right view<br>3: stereoscopic view<br>THIS ATTRIBUTE IS INHIBITED FROM BEING PRESENT WHEN twoDCoverage@view_idc_presence_flag = 0<br>THIS ATTRIBUTE IS INEVITABLY PRESENT WHEN twoDCoverage@view_idc_presence_flag = 1 |
|---|---|---|
| twoDCoverage.twoDCoverageInfo@proj_reg_width | xs:unsignedInt | WIDTH OF REGION ON projected picture TO WHICH picture REFERENCED BY Adaptation Set CORRESPONDS |
| twoDCoverage.twoDCoverageInfo@proj_reg_height | xs:unsignedInt | HEIGHT OF REGION ON projected picture TO WHICH picture REFERENCED BY Adaptation Set CORRESPONDS |
| twoDCoverage.twoDCoverageInfo@proj_reg_top | xs:unsignedInt | VERTICAL COORDINATE OF REGION ON projected picture TO WHICH picture REFERENCED BY Adaptation Set CORRESPONDS |
| twoDCoverage.twoDCoverageInfo@proj_reg_left | xs:unsignedInt | REGION HORIZONTAL COORDINATE ON projected picture TO WHICH picture REFERENCED BY Adaptation Set CORRESPONDS |

```
aligned(8) class SubPictureCompositionBox extends TrackGroupTypeBox('spco') {
    unsigned int(1) identical_to_proj_pic_flag;
    unsigned int(7) reserved = 0;
    SubPictureRegionBox();
    RegionWisePackingBox();   // optional
    // optional boxes
}
```

```
<SupplementalProperty schemeIdUri="urn:mpeg:mpegI:omaf:2017:prid">
```

INFORMATION PROCESSING APPARATUS AND METHOD

CROSS-REFERENCE TO RELATED APPLICATIONS

The present application is a Divisional of U.S. application Ser. No. 16/959,687, filed Jul. 2, 2020, which is based on PCT filing PCT/JP2018/048424, filed Dec. 28, 2018, which claims priority to JP 2018-003796, filed Jan. 12, 2018, and JP 2018-127665, filed Jul. 4, 2018, the entire contents of each are incorporated herein by reference.

TECHNICAL FIELD

The present disclosure relates to an information processing apparatus and method, and in particular, to an information processing apparatus and method enabled to more easily select a stream of sub-pictures.

BACKGROUND ART

In the past, there have been known standards for adaptive content distribution techniques based on HTTP (Hypertext Transfer Protocol) including MPEG-DASH (Moving Picture Experts Group-Dynamic Adaptive Streaming over HTTP) (see, for example, NPL 1 and NPL 2).

Additionally, file formats for the MPEG-DASH include ISOBMFF (International Organization for Standardization Base Media File Format) including file container specifications for the international standardization technique for moving image compression "MPEG-4 (Moving Picture Experts Group-4)" (see, for example, NPL 3).

Incidentally, the use of MPEG-DASH for distribution of an omnidirectional image (also referred to as a projected plane image) including a three-dimensional structure image mapped to a plane image has been contrived; the three-dimensional structure image includes an image extending over 360 degrees around in the horizontal direction and over 180 degrees around in the vertical direction and projected on a three-dimensional structure, as in the case of what is called an omnidirectional video. MPEG-DASH can be applied by, for example, mapping the three-dimensional structure image to a single plane and distributing a projected plane image including the three-dimensional structure image mapped to the plane. There has also been a proposal that, in the above-described case, the projected plane image (also referred to as an entire picture) of the omnidirectional video be divided into a plurality of sub-pictures, which is then stored in a plurality of tracks. Note that identification of display regions of sub-pictures requires processing including, first, constructing the entire picture from the sub-pictures on the basis of sub-picture division information, and then rearranging, on the basis of region-wise packing information, the entire picture subjected to region-wise packing (see, for example, NPL 4).

CITATION LIST

Non Patent Literature

[NPL 1]
"Information technology. Dynamic adaptive streaming over HTTP (DASH). Part 1: Media presentation description and segment formats," ISO/IEC23009-1, 2014/05

[NPL 2]
"Information technology. Dynamic adaptive streaming over HTTP (DASH). Part 1: Media presentation description and segment formats AMENDMENT 2: Spatial relationship description, generalized URL parameters and other extensions," ISO/IEC 23009-1:2014/Amd 2:2015, 2015/07

[NPL 3]
"Information technology-Coding of audio-visual objects-Part 12: ISO base media file format," ISO/IEC 14496-12, 2005-10-01

[NPL 4]
Ye-Kui Wang, Youngkwon Lim, "MPEG #120 OMAF meeting agenda and minutes," ISO/IEC JTC1/SC29/WG11 MPEG2017/M41823, October 2017, Macau, China

SUMMARY

Technical Problems

However, in the currently proposed method, in a case where an image is divided into sub-pictures, arrangement information (region-wise packing information regarding the undivided entire picture) indicating that the size and position of each picture region has been changed is signaled in Region Wise Packing Box below Sub Picture Composition Box. Thus, in a case where a sub-picture track is selected and reproduced, Sub Picture Composition Box needs to be parsed to distinguish the region-wise packing information from sub-picture division information in order to identify the display region of the sub-picture track on the projected picture. This selection and reproduction, compared to selection and reproduction of tracks that are not sub-picture tracks, may increase loads on the processing.

In view of these circumstances, an object of the present disclosure is to allow a stream of sub-pictures to be more easily selected.

Solution to Problems

An information processing apparatus according to one aspect of the present technique is an information processing apparatus including a file generating section configured to generate a control file managing image encoded data for each of a plurality of sub-pictures into which an entire picture is divided and which is then encoded and including region-related information related to a region in the entire picture corresponding to the sub-picture, as information different from arrangement information for each of picture regions, the control file being used for controlling distribution of the image encoded data.

An information processing method according to one aspect of the present technique is an information processing method including generating a control file managing image encoded data for each of a plurality of sub-pictures into which an entire picture is divided and which is then encoded and including region-related information related to a region in the entire picture corresponding to the sub-picture, as information different from arrangement information for each of picture regions, the control file being used for controlling distribution of the image encoded data.

An information processing apparatus according to another aspect of the present technique is an information processing apparatus including a file acquiring section configured to acquire a control file managing image encoded data for each of a plurality of sub-pictures into which an entire picture is divided and which is then encoded and including region-related information related to a region in the entire picture corresponding to the sub-picture, as information different from arrangement information for each of picture regions, the control file being used for controlling distribution of the image encoded data, and an image processing section configured to select a stream of the image encoded data on the basis of the region-related information included in the control file acquired by the file acquiring section.

An information processing method according to another aspect of the present technique is an information processing method including acquiring a control file managing image encoded data for each of a plurality of sub-pictures into which an entire picture is divided and which is then encoded and including region-related information related to a region in the entire picture corresponding to the sub-picture, as information different from arrangement information for each of picture regions, the control file being used for controlling distribution of the image encoded data, and selecting a stream of the image encoded data on the basis of the region-related information included in the control file acquired.

In the information processing apparatus and method according to the one aspect of the present technique, the control file is generated that manages the image encoded data for each of the plurality of sub-pictures into which the entire picture is divided and which is then encoded, the control file including the region-related information related to the region in the entire picture corresponding to the sub-picture, as information different from the arrangement information for each of the picture regions, the control file being used for controlling distribution of the image encoded data.

In the information processing apparatus and method according to the another aspect of the present technique, the control file is acquired that manages the image encoded data for each of the plurality of sub-pictures into which the entire picture is divided and which is then encoded, the control file including the region-related information related to the region in the entire picture corresponding to the sub-picture, as information different from the arrangement information for each of the picture regions, the control file being used for controlling distribution of the image encoded data, and the stream of the image encoded data is selected on the basis of the region-related information included in the control file acquired.

Advantageous Effect of Invention

According to the present disclosure, information can be processed. In particular, a stream of sub-pictures can be more easily selected.

BRIEF DESCRIPTION OF DRAWINGS

FIG. 1 is a diagram illustrating an example of a Box hierarchical structure of ISOBMFF sub-picture tracks.

FIG. 2 is a diagram illustrating an example of a Box hierarchical structure of tracks that are not ISOBMFF sub-picture tracks.

FIG. 3 is a diagram illustrating an example of syntax of Sub Picture Composition Box.

FIG. 4 is a diagram illustrating an example of syntax of Sub Picture Region Box.

FIG. 5 is a diagram illustrating an example of semantics of fields defined in Sub Picture Region Box.

FIG. 6 is a diagram illustrating an example of syntax of Region Wise Packing Box.

FIG. 7 is a diagram illustrating an example of syntax of Region Wise Packing Struct.

FIG. 8 is a diagram illustrating an example of semantics of fields defined in Region Wise Packing Struct.

FIG. 9 is a diagram illustrating an example of syntax of RectRegionPacking.

FIG. 10 is a diagram illustrating an example of semantics of fields defined in RectRegionPacking.

FIG. 16 is a diagram illustrating an example of syntax of 2D Coverage Information Box.

FIG. 17 is a diagram illustrating an example of semantics of fields defined in 2D Coverage Information Box.

FIG. 20 is a diagram illustrating an example of syntax of 2D Coverage Information Box.

FIG. 21 is a diagram illustrating an example of semantics of fields added in this case.

FIG. 22 is a diagram illustrating an example of syntax of Region Wise Packing Struct.

FIG. 23 is a diagram illustrating an example of semantics of fields added in this case.

FIG. 24 is a diagram illustrating an example of syntax of RectProjectedRegion.

FIG. 25 is a diagram illustrating an example of semantics of fields defined in RectProjectedRegion.

FIG. 26 is a diagram illustrating an example of syntax of Region Wise Packing Struct.

FIG. 27 is a diagram illustrating an example of syntax of RectRegionPacking.

FIG. 28 is a diagram illustrating an example of syntax of Coverage Information Box.

FIG. 29 is a diagram illustrating an example of semantics of fields defined in Coverage Information Box.

FIG. 30 is a diagram illustrating an example of syntax of Spherical offset projection SEI message.

FIG. 31 is a diagram illustrating an example of semantics of fields defined in Spherical offset projection SEI message.

FIG. 32 is a diagram illustrating an example of syntax of 2D Coverage Information Sample Entry.

FIG. 33 is a diagram illustrating an example of syntax of 2D Coverage Information Sample.

FIG. 35 is a diagram illustrating an example of syntax of 2D Coverage Information Sample Group Entry.

FIG. 38 is a diagram illustrating examples of attribute values of 2D coverage information descriptors.

FIG. 39 is a diagram illustrating examples of attribute values of 2D coverage information descriptors.

FIG. 40 is a diagram illustrating examples of data types.

FIG. 41 is a diagram illustrating examples of attribute values of Region Wise Packing descriptors.

FIG. 42 is a diagram illustrating examples of attribute values of Region Wise Packing descriptors.

FIG. 43 is a diagram illustrating examples of attribute values of Content coverage descriptors.

FIG. 44 is a diagram illustrating examples of attribute values of Content coverage descriptors and continued from FIG. 43.

FIG. 45 is a diagram illustrating examples of data types.

FIG. 46 is a diagram illustrating examples of data types and continued from FIG. 45.

FIG. 47 is a diagram illustrating examples of data types and continued from FIG. 46.

FIG. 53 is a diagram illustrating an example of syntax of Original Stereo Video Box.

FIG. 54 is a diagram illustrating an example of semantics of fields defined in Original Stereo Video Box.

FIG. 55 is a diagram illustrating an example of a signal for a display size.

FIG. 56 is a diagram illustrating an example of syntax of Pixel Aspect Ratio Box.

FIG. 59 is a diagram illustrating an example of syntax of Original Scheme Information Box.

FIG. 60 is a diagram illustrating an example of syntax of 2D Coverage Information Box.

FIG. 61 is a diagram illustrating an example of semantics of fields defined in 2D Coverage Information Box.

FIG. 63 is a diagram illustrating an example of syntax of Track Stereo Video Box.

FIG. 64 is a diagram illustrating an example of syntax of 2D Coverage Information Box.

FIG. 65 is a diagram illustrating an example of semantics of fields defined in 2D Coverage Information Box.

FIG. 66 is a diagram illustrating an example of signaling of view_idc.

FIG. 69 is a diagram illustrating examples of attribute values of 2D coverage information descriptors.

FIG. 70 is a diagram illustrating examples of attribute values of 2D coverage information descriptors and continued from FIG. 69.

FIG. 71 is a diagram illustrating examples of data types.

FIG. 73 is a diagram illustrating an example of syntax of Sub Picture Composition Box.

FIG. 74 is a diagram illustrating an example of syntax of Supplemental Property.

DESCRIPTION OF EMBODIMENTS

Figure 11:
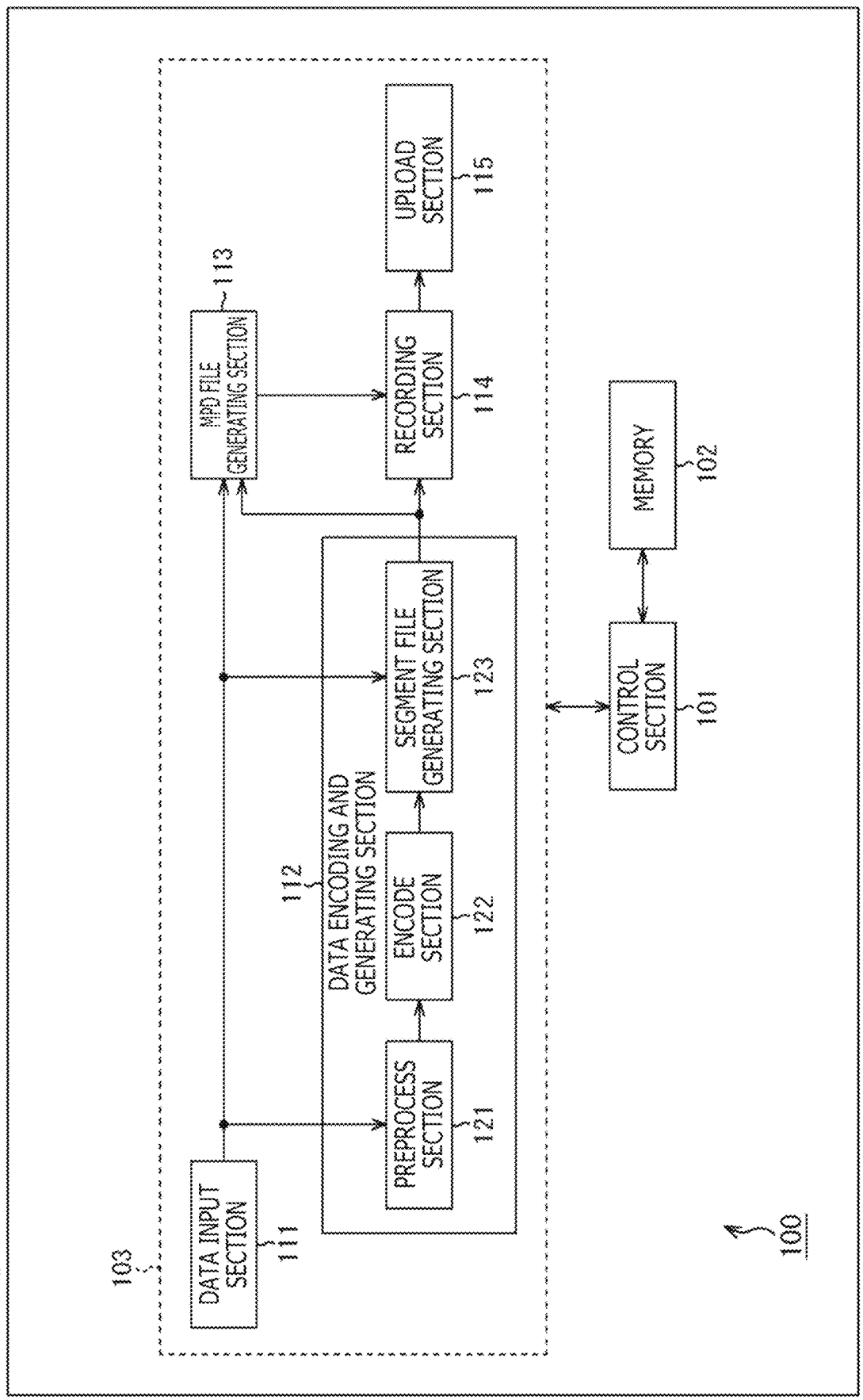
FIG. 11 is a block diagram illustrating a main configuration example of a file generating apparatus.

Embodiments of the present disclosure (hereinafter referred to as embodiments) will be described. The description is in the following order.

1. Signaling of Information Related to sub-picture
2. First embodiment (Signaling of Display Region of sub-picture and Extension of ISOBMFF)
3. Second embodiment (Signaling of Display Region of sub-picture and Extension of MPD)
4. Third Embodiment (Signaling of Stereo Information regarding Entire Picture and Extension of ISOBMFF)
5. Fourth Embodiment (Signaling of Stereo Information regarding Entire Picture and Extension of MPD)
6. Supplementary Features 1. Signaling of Information Related to Sub-Picture <Documents Supporting Technical Contents and Terms, and the Like>

The scope disclosed in the present technique includes not only contents described in the embodiments but also contents described in Non Patent Literature below, which were well known at the time of filing of the application.

NPL 1: (described above)
NPL 2: (described above)
NPL 3: (described above)
NPL 4: (described above)

In other words, the contents described in Non Patent Literature described above are grounds for determination of support requirements. For example, technical terms such as parsing, syntax, and semantics are within the scope of disclosure of the present technique and meets the support requirements for claims even in a case where the embodiments include no direct description of the terms.

<MPEG-DASH>

In the past, there have been known standards for adaptive content distribution techniques based on HTTP (Hypertext Transfer Protocol) including MPEG-DASH (Moving Picture Experts Group-Dynamic Adaptive Streaming over HTTP) as described in, for example, NPL 1 and NPL 2.

The MPEG-DASH allows, for example, videos to be reproduced at an optimum bit rate depending on a variation in network band, using HTTP, corresponding to a communication protocol similar to that used to download an Internet web page from a web site.

The standards allow infrastructures for moving-image distribution services and techniques for moving-image reproduction clients to be more easily developed. In particular, for operators engaged in distribution services, the standards are advantageous for improving compatibility between moving-image distribution services and moving-image reproduction clients, and further facilitating utilization of exiting content resources, and are expected to be effective for promoting growth of markets.

The MPEG-DASH mainly includes two technical designs including a standard for manifest file specifications referred to as MPD (Media Presentation Description) describing metadata used to manage moving images and audio files and an operational standard for a file format referred to as a segment format for actual communication of moving-image content.

For example, as described in NPL 3, file formats for the MPEG-DASH include ISOBMFF (International Organization for Standardization Base Media File Format) including file container specifications for the international standard technique for moving image compression "MPEG-4 (Moving Picture Experts Group-4)." ISOBMFF includes an additional extension for meeting the requirements for the MPEG-DASH, as extended specifications for ISO/IEC (International Organization for Standardization/International Electrotechnical Commission) 14496-12.

<Distribution of Omnidirectional Video Using MPEG-DASH>

Incidentally, a projected plane image includes a three-dimensional structure image mapped to a plane image; three-dimensional structure image includes an image extending over 360 degrees around in the horizontal direction and over 180 degrees around in the vertical direction and projected on a three-dimensional structure, as in the case of what is called an omnidirectional video. For example, by rendering a peripheral image viewed from a viewpoint (omnidirectional video) on a three-dimensional structure around the viewpoint to provide a three-dimensional structure image, an image around the viewpoint can naturally be expressed or an image in a desired line-of-sight direction can easily be generated from the three-dimensional structure image.

In recent years, the use of the MPEG-DASH for distribution of the projected plane image (omnidirectional video or the like) has been contrived. For example, as described in NPL 4, the MPEG-DASH can be applied by mapping a three-dimensional structure image to a single plane, and distributing a projected plane image with the three-dimensional structure image mapped to the plane.

Methods for projection on a three-dimensional structure and mapping to a plane (the methods are also referred to as projection formats) include, for example, ERP (Equirectangular projection) and CMP (Cubemap projection). For example, in ERP, an image extending over 360 degrees around in the horizontal direction and over 180 degrees around in the vertical direction and projected on a three-dimensional structure is mapped to a single plane such that a latitudinal direction and a longitudinal direction of a spherical three-dimensional structure are orthogonal to each other. Additionally, in CMP, for example, an image extending over 360 degrees around in the horizontal direction and over 180 degrees around in the vertical direction is projected on surfaces of a three-dimensional structure, and the surfaces of the three-dimensional structure are developed and mapped to a single plane such that the surfaces are arranged in a predetermined order.

A projected plane image onto which an omnidirectional video is projected and mapped is also referred to as a projected picture. In other words, the projected picture refers to a two-dimensional image (two-dimensional picture) determined for each projection format and expressing an omnidirectional video.

For MPEG-I Part2 Omnidirectional Media Format (ISO/IEC 23090-2) FDIS (Final Draft International Standards) (hereinafter referred to as OMAF) described in NPL 4, a technique has been discussed in which a projected plane image (also referred to as an entire picture) of one omnidirectional video is divided into a plurality of sub-pictures, which is stored in a plurality of tracks.

For example, there is a use case where sub-picture tracks corresponding to the field of view are configured for respective particular field-of-view regions and where a client selects and reproduces any of the sub-picture tracks according to the field-of-view region of the client.

<Box Hierarchical Structure of ISOBMFF File>

A Box hierarchical structure 11 in FIG. 1 represents an example of a Box hierarchical structure for an ISOBMFF file used to form an omnidirectional video into sub-picture tracks.

As illustrated in the Box hierarchical structure 11, in this case, information regarding the entire picture is stored below Track Group Box. For example, Sub Picture Composition Box (spco) stores information used for grouping of sub-picture tracks and indicating, for example, whether the picture has been divided into sub-pictures. Additionally, below the Sub Picture Composition Box, Boxes such as Sub Picture Region Box (sprg), Region Wise Packing Box (rwpk), and Stereo Video Box (stvi) are formed.

Sub Picture Region Box stores sub-picture division information indicating, for example, a manner of division into sub-pictures. Additionally, Region Wise Packing Box stores region-wise packing information regarding the undivided entire picture. In addition, Stereo Video Box stores information (stereo information) regarding stereoscopic display (stereoscopic display) of the entire picture. The stereo information includes information indicating, for example, the type of a stereoscopic display image, for example, side by side or top and bottom.

Additionally, below Scheme Information Box (schi) below Restricted Scheme Information Box (rinf) below Restricted Sample Entry (resv) (type of Sample Entry) below Sample Description Box (stsd) below Sample Table Box (stbl) below Media Information Box (minf) below Media Box (mdia), Boxes such as Projected Omnidirectional Video Box (povd) and StereoVideoBox (stvi) are formed.

Projected Omnidirectional Video Box stores metadata associated with the omnidirectional video. StereoVideoBox stores stereo information regarding the sub-picture to which the Box corresponds.

A Box hierarchical structure 12 in FIG. 2 represents an example of a Box hierarchical structure of an ISOBMFF file where the omnidirectional video is not formed into sub-picture tracks.

As illustrated in the Box hierarchical structure 12, in this case, Track Group Box is not formed, and Region Wise Packing Box is formed below Projected Omnidirectional Video Box.

In other words, in a case where the omnidirectional video is formed into sub-pictures, Region Wise Packing Box indicating arrangement information indicating that the size and position of each picture region has been changed is signaled only for Sub Picture Composition Box, and includes region-wise packing information regarding the undivided entire picture. In contrast, in a case where the omnidirectional video is not formed into sub-pictures, Region Wise Packing Box is signaled in Projected Omnidirectional Video Box and includes region-wise packing information regarding the picture stored in the track. A track including Sub Picture Composition Box is hereinafter referred to as a sub-picture track.

<Selection of Sub-Picture Track>

Thus, depending on whether the track is a sub-picture track or a normal track not subjected to division into sub-pictures, processing required for a client to identify a display region, on a projected plane image (projected picture), of an image in the track varies. For example, in a case where a sub-picture track is selected and reproduced, Sub Picture Composition Box needs to be parsed to identify region-wise packing information and sub-picture division information in order to identify the display region of the sub-picture track on the projected picture. In contrast, in a case where a track that is not a sub-picture track is selected and reproduced, this processing is unnecessary.

Syntax 21 in FIG. 3 represents an example of syntax of Sub Picture Composition Box. As illustrated in the syntax 21, Sub Picture Region Box and Region Wise Packing Box are set in Sub Picture Composition Box.

Syntax 22 in FIG. 4 represents an example of syntax of Sub Picture Region Box. As illustrated in the syntax 22, fields such as track_x, track_y, track_width, track_height, composition_width, and composition_height are defined in Sub Picture Region Box.

Semantics 23 in FIG. 5 represents an example of semantics of fields in the Sub Picture Region Box. As illustrated in the semantics 23, track_x indicates the horizontal position, on the entire picture, of a sub-picture stored in the track. track_y indicates the vertical position, on the entire picture, of the sub-picture stored in the track. track_width indicates the width of the sub-picture stored in the track. track_height indicates the height of the sub-picture stored in the track. composition_width indicates the width of the entire picture. composition_height indicates the height of the entire picture.

Syntax 24 in FIG. 6 indicates an example of syntax of Region Wise Packing Box. As illustrated in the syntax 24, Region Wise Packing Struct is set in Region Wise Packing Box.

Syntax 25 in FIG. 7 represents an example of syntax of Region Wise Packing Struct. As illustrated in the syntax 25, fields such as constituent_picture_matching_flag, num_regions, proj_picture_width, proj_picture_height, packed_picture_width, packed_picture_height, guard_band_flag[i], packing_type[i], and GuardBand(i) are set in Region Wise Packing Struct.

Semantics 26 in FIG. 8 represents an example of semantics of fields defined in Region Wise Packing Struct. As illustrated in the semantics 26, constituent_picture_matching_flag is flag information indicating whether or not the same region-wise packing is applied to a view for the left eye (Left view) and a view for the right eye (Right view) in a case where the picture is stereoscopic. For example, this field having a value of 0 indicates that the picture is mono (single-viewpoint view) or that different packings are applied to the Left view and the Right view. This field having a value of 1 indicates that the same packing is applied to the Left view and the Right view.

Additionally, num_regions indicates the number of packed regions. proj_picture_width indicates the width of the projected picture. proj_picture_height indicates the height of the projected picture. packed_picture_width indicates the width of a packed picture (picture subjected to region-wise packing). packed_picture_height indicates the height of the packed picture.

Additionally, guard_band_flag[i] is flag information indicating whether or not a guard band is present. For example, this field having a value of 0 indicates that no guard band is present in a packed region, and this field having a value of 1 indicates that a guard band is present in the packed region. packing_type[i] indicates the shape of the packed region. For example, this field having a value of 0 indicates that the packed region is rectangular. GuardBand(i) is guard band information regarding the periphery of the region.

Additionally, as illustrated in the syntax 25, RectRegionPacking is further set in Region Wise Packing Struct. Syntax 27 in FIG. 9 represents an example of syntax in RectRegionPacking. As illustrated in the syntax 27, fields such as proj_reg_width[i], proj_reg_height[i], proj_reg_top[i], proj_reg_left{i}, transform_type[i], packed_reg_width[i], packed_reg_height[i], packed_reg_top[i], and packed_reg_left[i] are set in RectRegionPacking.

Semantics 28 in FIG. 10 represents an example of semantics of fields defined in RectRegionPacking. As illustrated in the semantics 28, proj_reg_width[i] indicates the width of a projected region corresponding to an application source of region-wise packing. proj_reg_height[i] indicates the height of the projected region corresponding to the application source of region-wise packing. proj_reg_top[i] indicates the vertical position of the projected region corresponding to the application source of region-wise packing. proj_reg_left[i] indicates the horizontal position of the projected region corresponding to the application source of region-wise packing. transform_type[i] indicates rotation or mirroring of the packed region. packed_reg_width[i] indicates the width of the packed region rearranged by region-wise packing. packed_reg_height[i] indicates the height of the packed region rearranged by region-wise packing. packed_reg_top[i] indicates the vertical position of the packed region rearranged by region-wise packing. packed_reg_left[i] indicates the horizontal position of the packed region rearranged by region-wise packing.

In other words, for example, in a case where the client selects a sub-picture track according to the field of view of the user, these pieces of information need to be parsed, and thus this selection, compared to selection and reproduction of a track that is not a sub-picture track, may increase loads on the corresponding processing.

<Identification of Stereo Information>

Additionally, in a case where the entire picture of the stereoscopic omnidirectional video is divided into sub-pictures, Stereo Video Box indicating stereo information regarding the entire picture (what type of stereoscopic display image the entire picture is, and the like) is signaled in Sub Picture Composition Box, and Stereo Video Box indicating stereo information regarding a sub-picture (what type of stereoscopic display image the sub-picture is, and the like) is signaled below Scheme Information Box of Sample Entry in the track. In contrast, in a case where the entire picture is not divided into sub-pictures, Stereo Video Box is signaled only below Scheme Information Box and includes stereo information regarding the picture stored in the track.

Thus, depending on whether the track is a sub-picture track or a normal track not subjected to division into sub-pictures, processing required for the client to identify the stereo information regarding the track varies. For example, in a case where the entire picture is a stereo image (stereoscopic image), sub-picture tracks resulting from division include the L view and the R view, but in some cases, frame packing arrangement is not top & bottom or side by side.

Accordingly, in a case where whether or not such a sub-picture is stereo-displayable is identified, processing is needed that involves parsing Sub Picture Composition Box and identifying region-wise packing information and sub-picture division information and also identifying stereo information. In contrast, in a case where a track that is not a sub-picture track is selected and reproduced, this processing is unnecessary.

In other words, for example, in a case where the client selects a sub-picture track according to the stereo display capability of the client, this selection, compared to selection and reproduction of a track that is not a sub-picture track, may increase loads on the corresponding processing.

Selection of the sub-picture track in the ISOBMFF file has been described. However, in the MPD file, the sub-picture is managed as an Adaptation Set. Selection of an Adaptation Set referencing the sub-picture in the MPD file may increase processing loads for reasons similar to the reasons described above. In other words, loads on selection of a stream may increase regardless of whether the ISOBMFF file or the MPD file is used.

<Signaling of Display Region of Sub-Picture>

Thus, in a case where the entire picture is divided into sub-pictures, information regarding the sub-picture display region is signaled (provided to a content reproduction side). The display region represents a region in the entire picture. Specifically, information related to the sub-picture display region is region-related information related to a region in the entire picture corresponding to the sub-picture, in other words, which partial image of the entire picture corresponds to the sub-picture. This information indicates, for example, the position, size, shape, and the like of the region corresponding to the sub-picture. A method for expressing the region is optional, and for example, the range of the region may be indicated by coordinates or the like.

This allows the client reproducing the content to learn where in the omnidirectional video the sub-picture is to be displayed on the basis of the above-described information.

At this time, the information related to the sub-picture display region is signaled as information for each sub-picture. This allows the client to easily obtain this information. Accordingly, the client can easily select a stream of desired sub-pictures. For example, in a case where the stream is selected according to the field of view of the user, the client can easily select the appropriate stream corresponding to the direction or range of the field of view.

<Signaling of Stereo Information Regarding Entire Picture Divided into Sub-Pictures>

Additionally, the stereo information is signaled that includes information related to stereoscopic display of the entire picture divided into sub-pictures. This allows the client reproducing the content to easily learn whether or not the entire picture is a stereo image (stereoscopic image), and in a case where the entire picture is a stereo image, the type of the stereo image. Thus, the client can easily learn what image is included in the sub-picture (for example, which part of what type of stereo image (or mono image (single viewpoint image) the image included in the sub-picture corresponds)).

Accordingly, the client can easily select the desired stream. For example, in a case of selecting the stream according to the capability of the client, the client can easily select the appropriate stream according to the capability of the client.

<File Generating Apparatus>

Now, a configuration of an apparatus providing signaling related to a sub-picture will be described. FIG. 11 is a block diagram illustrating an example of a configuration of a file generating apparatus according to an aspect of an information processing apparatus to which the present technique is applied. A file generating apparatus 100 illustrated in FIG. 11 is an apparatus generating an ISOBMFF file (segment file) or an MPD file. For example, the file generating apparatus 100 implements the techniques described in NPL 1 to NPL 4, and uses a method complying with the MPEG-DASH to generate an ISOBMFF file including a stream or an MPD file corresponding to a control file used for controlling distribution of a stream and to upload (transmit) the file via a network to a server distributing the file.

Note that FIG. 11 illustrate main components such as processing sections and a data flow and does not illustrate all the components of the file generating apparatus. In other words, in the file generating apparatus 100, processing sections not illustrated as blocks in FIG. 11 may be present or processing or a data flow not illustrated as an arrow in FIG. 11 may be present.

As illustrated in FIG. 11, the file generating apparatus 100 includes a control section 101, a memory 102, and a file generating section 103.

The control section 101 controls operation of the file generating apparatus 100 as a whole. For example, the control section 101 controls and causes the file generating section 103 to generate an ISOBMFF file or an MPD file and to upload the generated ISOBMFF file or MPD file. The control section 101 executes processing related to such control, utilizing the memory 102. For example, the control section 101 loads desired programs or the like into the memory 102 and executes the programs to perform processing related to the control as described above.

The file generating section 103 executes processing related to generation and uploading (transmission) of an ISOBMFF file or an MPD file in accordance with the control of the control section 101. As illustrated in FIG. 11, the file generating section 103 includes a data input section 111, a data encoding and generating section 112, an MPD file generating section 113, a recording section 114, and an upload section 115.

The data input section 111 executes processing related to reception of data input. For example, the data input section 111 receives, for example, data such as images needed to generate textures and meshes and metadata needed to generate an MPD file. Additionally, the data input section 111 feeds the received data to the data encoding and generating section 112 and the MPD file generating section 113.

The data encoding and generating section 112 executes processing related to encoding of data and generation of a file. For example, the data encoding and generating section 112 generates a stream of textures, meshes, or the like on the basis of data such as images fed from the data input section 111. Additionally, the data encoding and generating section 112 generates an ISOBMFF file storing a generated stream. In addition, the data encoding and generating section 112 feeds to the recording section 114 with the ISOBMFF file generated.

As illustrated in FIG. 11, the data encoding and generating section 112 includes a preprocess section 121, an encode section 122, and a segment file generating section 123.

The preprocess section 121 executes processing on data such as non-encoded images. For example, the preprocess section 121 generates a stream of textures or meshes on the basis of data such as images fed from the data input section 111. Additionally, for example, the preprocess section 121 feeds to the encode section 122 with the stream generated.

The encode section 122 executes processing related to encoding of a stream. For example, the encode section 122 encodes a stream fed from the preprocess section 121. Additionally, for example, the encode section 122 feeds the segment file generating section 123 with encoded data resulting from encoding by the encode section 122.

The segment file generating section 123 executes processing related to generation of a segment file. For example, on the basis of metadata fed from the data input section 111 and the like, the segment file generating section 123 forms encoded data fed from the encode section 122 into a file in units of segments (generates a segment file). Additionally, for example, the segment file generating section 123 feeds the recording section 114 with the ISOBMFF file generated as described above, as processing related to generation of a segment file. For example, the segment file generating section 123 generates an ISOBMFF file as a segment file and feeds the recording section 114 with the ISOBMFF file generated.

The MPD file generating section 113 executes processing related to generation of an MPD file. For example, the MPD file generating section 113 generates an MPD file on the basis of metadata and the like fed from the data input section 111. Additionally, for example, the MPD file generating section 113 feeds the recording section 114 with the MPD file generated. Note that the MPD file generating section 113 may acquire, from the segment file generating section 123, metadata and the like needed to generate an MPD file.

The recording section 114 includes any recording medium, for example, a hard disk or a semiconductor memory and executes processing related to, for example, recording of data. For example, the recording section 114 records an MPD file fed from the MPD file generating section 113. Additionally, for example, the recording section 114 records a segment file (for example, an ISOBMFF file) fed from the segment file generating section 123.

The upload section 115 executes processing related to uploading (transmission) of a file. For example, the upload section 115 reads the MPD file recorded in the recording section 114. Additionally, for example, the upload section 115 uploads (transmits) the read MPD file via a network or the like to a server (not illustrated) that distributes the MPD file to the client and the like.

Additionally, for example, the upload section 115 reads the segment file (for example, an ISOBMFF file) recorded in the recording section 114. Additionally, for example, the upload section 115 uploads (transmits) the read segment file via the network or the like to the server (not illustrated) that distributes the segment file to the client and the like.

In other words, the upload section 115 functions as a communication section transmitting an MPD file or a segment file (for example, an ISOBMFF file) to the server. Note that a destination of the MPD file from the upload section 115 may be the same as or different from a destination of the segment file (for example, an ISOBMFF file) from the upload section 115. Additionally, in the example described here, the file generating apparatus 100 functions as an apparatus uploading an MPD file or a segment file (for example, an ISOBMFF file) to the server distributing the file to the client. However, the file generating apparatus 100 may function as the server. In that case, the upload section 115 of the file generating apparatus 100 is only required to distribute the MPD file or the segment file (for example, an ISOBMFF file) to the client via the network.

<Client Apparatus>

Figure 12:
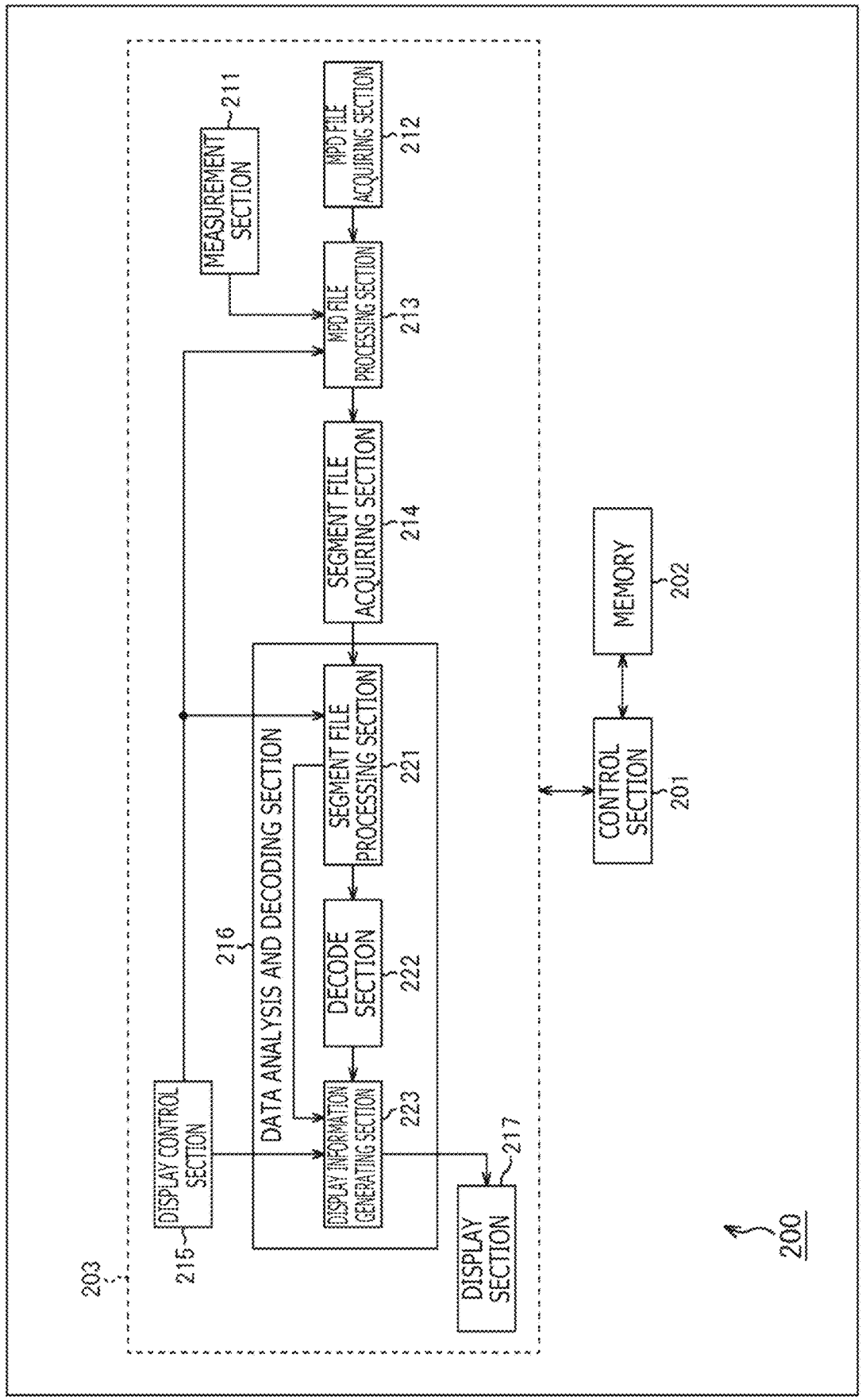
FIG. 12 is a block diagram illustrating a main configuration example of a client apparatus.

FIG. 12 is a block diagram illustrating an example of a configuration of a client apparatus according to an aspect of the information processing apparatus to which the present technique is applied. A client apparatus 200 illustrated in FIG. 12 is an apparatus acquiring an MPD file or a segment file (for example, an ISOBMFF file) and reproducing a content on the basis of the file. For example, the client apparatus 200 implements the techniques described in NPL 1 to NPL 4 to acquire a segment file from the server (or the file generating apparatus 100 described above) and reproduce the stream (content) included in the segment file, using a method complying with the MPEG-DASH. At this time, the client apparatus 200 may acquire an MPD file from the server (or the file generating apparatus 100 described above), select a desired segment file utilizing the MPD file, and acquire the segment file from the server.

Note that FIG. 12 illustrate main components such as processing sections and a data flow and does not illustrate all the components of the client apparatus. In other words, in the client apparatus 200, processing sections not illustrated as blocks in FIG. 12 may be present or processing or a data flow not illustrated as an arrow in FIG. 12 may be present.

As illustrated in FIG. 12, the client apparatus 200 includes a control section 201, a memory 202, and a reproduction processing section 203.

The control section 201 controls operation of the client apparatus 200 as a whole. For example, the control section 201 controls and causes the reproduction processing section 203 to acquire an MPD file or a segment file (for example, an ISOBMFF file) from the server or to reproduce the stream (content) included in the segment file. The control section 201 executes processing related to such control, utilizing the memory 202. For example, the control section 201 loads desired programs or the like into the memory 202 and executes the programs to perform processing related to the control as described above.

The reproduction processing section 203 executes processing related to reproduction of the stream (content) included in the segment file in accordance with the control of the control section 201. As illustrated in FIG. 12, the reproduction processing section 203 includes a measurement section 211, an MPD file acquiring section 212, an MPD file processing section 213, a segment file acquiring section 214, a display control section 215, a data analysis and decoding section 216, and a display section 217.

The measurement section 211 executes processing related to measurement. For example, the measurement section 211 measures the transmission band of the network between the client apparatus 200 and the server. Additionally, for example, the measurement section 211 feeds a corresponding measurement result to the MPD file processing section 213.

The MPD file acquiring section 212 executes processing related to acquisition of an MPD file. For example, the MPD file acquiring section 212 acquires the MPD file corresponding to a desired content (content to be reproduced), from the server via the network. Additionally, for example, the MPD file acquiring section 212 feeds the MPD file acquired to the MPD file processing section 213.

The MPD file processing section 213 executes processing based on the MPD file. For example, the MPD file processing section 213 selects a stream to be acquired on the basis of the MPD file fed from the MPD file acquiring section 212. Additionally, for example, the MPD file processing section 213 feeds a corresponding selection result to the segment file acquiring section 214. Note that the selection of the stream to be acquired involves appropriate utilization of the measurement result from the measurement section 211 and information related to the viewpoint position and line-of-sight direction of the user fed from the display control section 215.

The segment file acquiring section 214 executes processing related to acquisition of a segment file (for example, an ISOBMFF file). For example, the segment file acquiring section 214 acquires a segment file storing a stream needed to reproduce the desired content, from the server via the network. Additionally, for example, the segment file acquiring section 214 feeds the segment file acquired to the data analysis and decoding section 216.

Note that the server from which the segment file acquiring section 214 acquires a segment file (for example, an ISOBMFF file) may be the same or different from the server from which the MPD file acquiring section 212 acquires an MPD file. Additionally, the segment file acquiring section 214 may acquire a segment file on the basis of the selection result for a stream fed from the MPD file processing section 213. In other words, the segment file acquiring section 214 may acquire, from the server, a segment file storing the stream selected on the basis of the MPD file or the like.

The display control section 215 executes processing related to control of reproduction (display) of a content. For example, the display control section 215 acquires a detection result for the viewpoint position and line-of-sight direction of the user viewing and listening to the content. For example, the display control section 215 feeds the detection result acquired (information regarding the viewpoint position and line-of-sight direction of the user) to the MPD file processing section 213 and the data analysis and decoding section 216.

The data analysis and decoding section 216 executes processing related to, for example, analysis or decoding of data. For example, the data analysis and decoding section 216 processes the ISOBMFF file fed from the segment file acquiring section 214 to generate a display image of the content. Additionally, the data analysis and decoding section 216 feeds the display section 217 with the data regarding the display image.

As illustrated in FIG. 12, the data analysis and decoding section 216 includes a segment file processing section 221, a decode section 222, and a display information generating section 223.

The segment file processing section 221 executes processing on a segment file (for example, an ISOBMFF file). For example, the segment file processing section 221 extracts encoded data of the desired stream from the ISOBMFF file fed from the segment file acquiring section 214. Additionally, for example, the segment file processing section 221 feeds the extracted encoded data to the decode section 222.

Note that the segment file processing section 221 may select a stream on the basis of the information related to the viewpoint position and line-of-sight direction of the user fed from the display control section 215 or the transmission band measured by the measurement section 211, and extract the encoded data of the stream from the segment file.

The decode section 222 executes processing related to decoding. For example, the decode section 222 decodes the encoded data fed from the segment file processing section 221. Additionally, for example, the decode section 222 feeds the display information generating section 223 with a stream resulting from decoding by the decode section 222.

The display information generating section 223 executes processing related to generation of data of the display image. For example, the display information generating section 223 generates data of the display image corresponding to the viewpoint position and line-of-sight direction of the user on the basis of the information related to the viewpoint position and line-of-sight direction of the user fed from the display control section 215 and the stream fed from the decode section 222. Additionally, for example, the display information generating section 223 feeds the generated data of the display image to the display section 217.

The display section 217 includes any display device, for example, a display or a projector including a liquid crystal display panel or the like, and executes processing related to image display using the display device. For example, the display section 217 performs content reproduction such as image display on the basis of data fed from the display information generating section 223.

2. First Embodiment

<Signaling, in ISOBMFF, of Display Region Information Regarding Sub-Picture>

The above-described information related to the sub-picture display region may be signaled in the ISOBMFF file corresponding to a segment file.

In other words, a file may be generated that includes region-related information related to a region in the entire picture corresponding to the stored sub-picture, as information different from the arrangement information for each picture region, and that further includes image encoded data resulting from encoding of the sub-picture.

For example, in the file generating apparatus 100, used as an information processing apparatus, the segment file generating section 123 functions as a file generating section generating a file including region-related information related to a region in the entire picture corresponding to the stored sub-picture, as information different from the arrangement information for each picture region, and further including image encoded data resulting from encoding of the sub-picture. In other words, the information processing apparatus (for example, the file generating apparatus 100) may include a file generating section (for example, the segment file generating section 123).

Thus, as described above, the client can easily select a stream on the basis of the above-described information.

Note that, in the ISOBMFF file, the stream is managed as a track. In other words, with the ISOBMFF file, selection of a track leads to selection of a stream.

Additionally, the above-described picture may be all or a part of the omnidirectional video (projected plane image resulting from projection and mapping of an image extending over 360 degrees around in the horizontal direction and over 180 degrees around in the vertical direction). The omnidirectional video is an image of all directions around the viewpoint (that is, a peripheral image viewed from the viewpoint). By rendering into a three-dimensional structure, the omnidirectional video can be formed into an image extending over 360 degrees around in the horizontal direction and over 180 degrees around in the vertical direction. As described above, by mapping a three-dimensional structure image to a single plane to form a projected plane image, stream distribution control is enabled to which MPEG-DASH is applied. In other words, even in a case where the file generating apparatus 100 uses all or a part of such a projected plane image as an entire picture and divides the entire picture into sub-pictures, the present technique can be applied as described above. Note that, even in a case where a part of the projected plane image is used as an entire picture, the information related to the display regions of the sub-pictures in the entire projected plane image is signaled.

Figure 13:
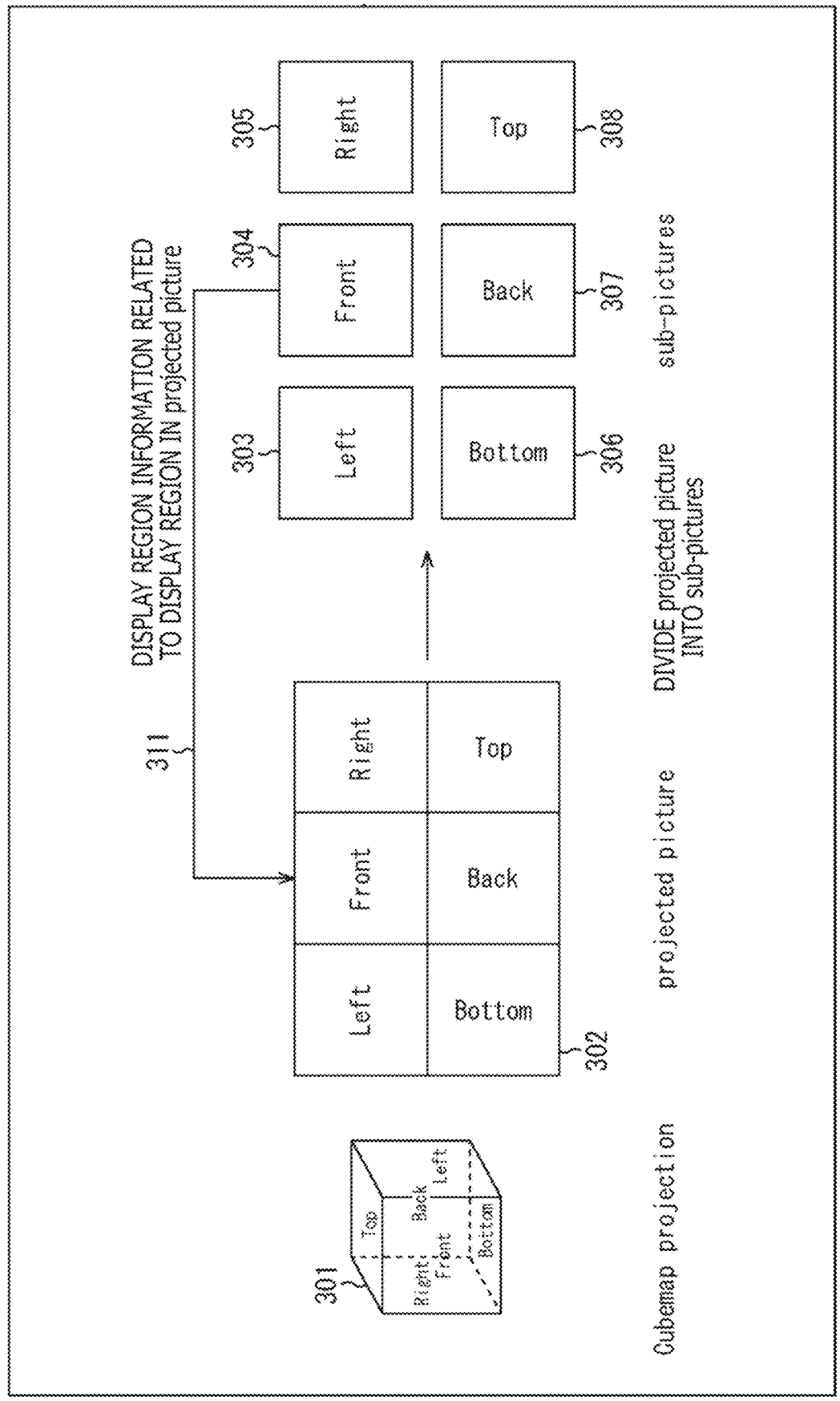
FIG. 13 is a diagram illustrating an example of display region information.

For example, as illustrated in FIG. 13, an image extending over 360 degrees around in the horizontal direction and over 180 degrees around in the vertical direction is projected on a three-dimensional structure (cube) by Cubemap projection to generate a three-dimensional structure image 301. Additionally, the three-dimensional structure image 301 is mapped to a single plane by a predetermined method to generate a projected plane image (projected picture) 302. The file generating apparatus 100 divides the projected plane image 302 into sub-pictures (sub-pictures 303 to 308) and generates an ISOBMFF file in which the sub-pictures are stored in different tracks.

At that time, as illustrated in an arrow 311, the file generating apparatus 100 signals, in the ISOBMFF file, information (display region information) indicating which of the sub-pictures corresponds to which part of the entire picture (projected plane image 302).

Thus, even in a case where an omnidirectional video is distributed, the client can easily select a stream on the basis of the information as described above.

Note that the region-related information (display region information) may be included in the ISOBMFF file as information for each sub-picture. This allows the client to easily learn which part of the entire picture corresponds to the sub-picture simply by referencing the information in the sub-picture track.

<Procedure of Upload Processing>

Figure 14:
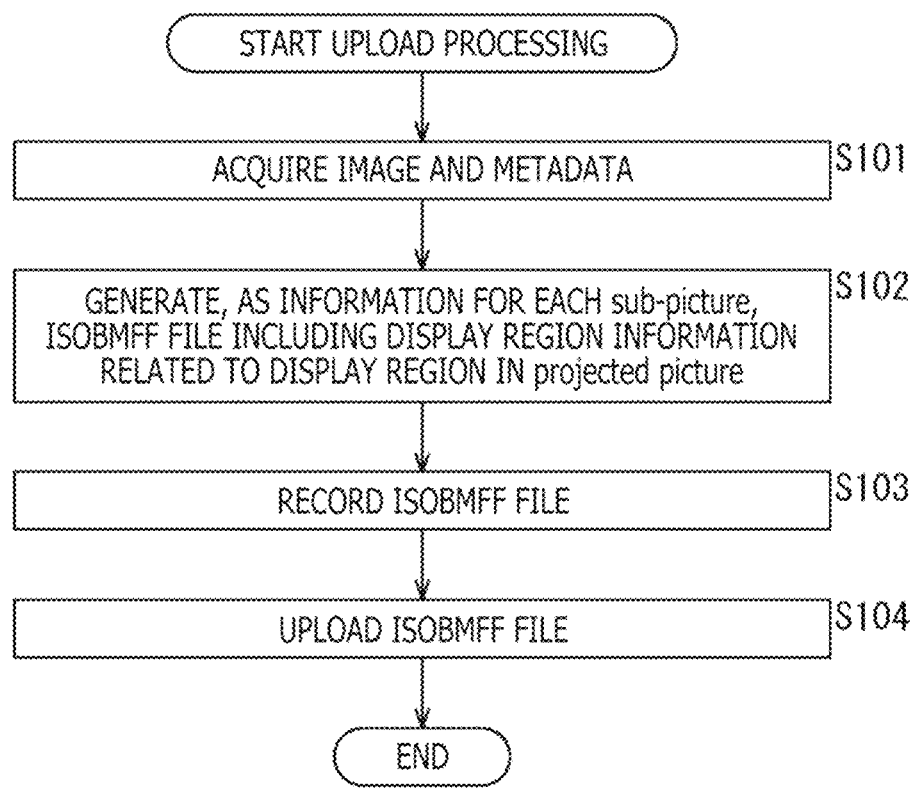
FIG. 14 is a flowchart illustrating an example of procedure of upload processing.

An example of procedure of upload processing executed by the file generating apparatus 100 in FIG. 11 in the above-described case will be described with reference to a flowchart in FIG. 14.

When the upload processing is started, the data input section 111 of the file generating apparatus 100 acquires an image and metadata in step S101.

In step S102, the segment file generating section 123 generates an ISOBMFF file including, as information for each sub-picture, display region information regarding the display regions in the projected picture.

In step S103, the ISOBMFF file generated by the processing in step S102 is recorded in the recording section 114.

In step S104, the upload section 115 reads, from the recording section 114, the ISOBMFF file recorded in step S103, and uploads the ISOBMFF file to the server.

When the processing in step S104 ends, the upload processing ends.

The upload processing executed as described above, the file generating apparatus 100 can generate an ISOBMFF file including, as information for each sub-picture, the display region information regarding the display regions in the projected picture.

Accordingly, the client can easily select and reproduce, on the basis of the above-described information, the appropriate stream corresponding to the field of view of the user or the like.

<Utilization of Sub-Picture Display Region Information Signaled in ISOBMFF>

Additionally, selection and reproduction of a stream may be performed by utilizing information related to the sub-picture display region signaled in the ISOBMFF file.

In other words, a file may be acquired that includes region-related information related to a region in the entire picture corresponding to the stored sub-picture, as information different from the arrangement information for each picture region, and that further includes image encoded data resulting from encoding of the sub-picture, and a stream of image encoded data may be selected on the basis of the region-related information included in the file acquired.

For example, in the client apparatus 200, used as an information processing apparatus, the segment file acquiring section 214 functions as a file acquiring section acquiring a file including region-related information related to a region in the entire picture corresponding to the stored sub-picture, as information different from the arrangement information for each picture region, and further including image encoded data resulting from encoding of the sub-picture, and the data analysis and decoding section 216 may function as an image processing section selecting a stream of image encoded data on the basis of the region-related information included in the file acquired by the file acquiring section. In other words, the information processing apparatus (for example, the client apparatus 200) may include a file acquiring section (for example, the segment file acquiring section 214) and an image processing section (for example, the data analysis and decoding section 216).

This allows the client apparatus 200 to more easily select a stream.

Note that the above-described picture (entire picture) may be all or a part of an omnidirectional video (projected plane image resulting from projection and mapping of an image extending over 360 degrees around in the horizontal direction and over 180 degrees around in the vertical direction). In other words, even in a case where the client apparatus 200 uses all or a part of the projected plane image as an entire picture, divides the entire picture into sub-pictures forming a stream, and reproduces the image, the present technique can be applied as described above.

Additionally, the region-related information (display region information) may be included in the ISOBMFF file as information for each sub-picture. This allows the client apparatus 200 to easily learn which part of the entire picture corresponds to the sub-picture simply by referencing the information in the sub-picture track.

<Procedure of Content Reproduction Processing>

Figure 15:
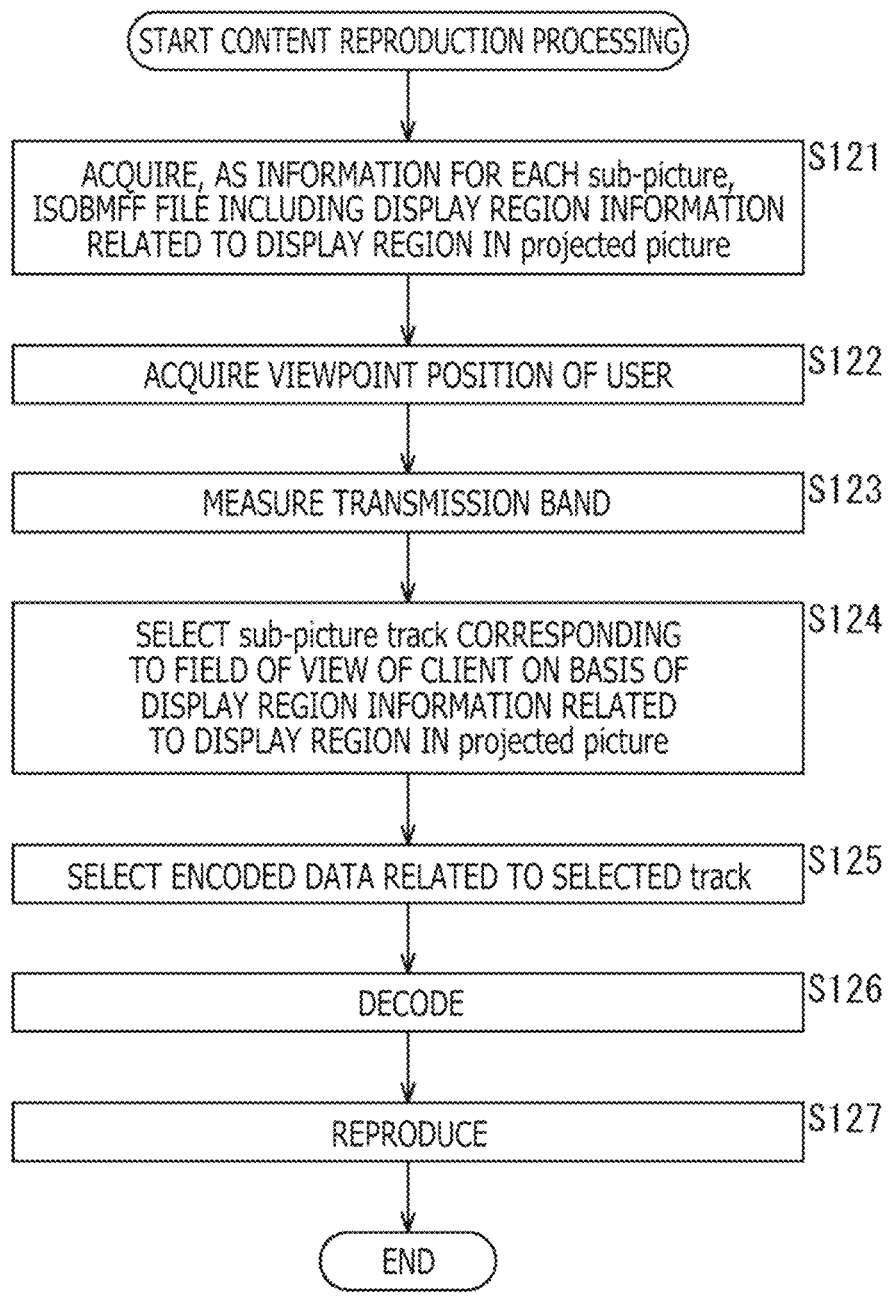
FIG. 15 is a flowchart illustrating an example of procedure of content reproduction processing.

An example of procedure of content reproduction processing executed by the client apparatus 200 in the above-described case will be described with reference to a flowchart in FIG. 15.

When the content reproduction processing is started, the segment file acquiring section 214 of the client apparatus 200 acquires, in step S121, an ISOBMFF file including, as information for each sub-picture, the display region information regarding the display regions in the projected picture.

In step S122, the display control section 215 acquires a measurement result for the viewpoint position (and line-of-sight direction) of the user.

In step S123, the measurement section 211 measures the transmission bandwidth of the network between the server and the client apparatus 200.

In step S124, the segment file processing section 221 selects a sub-picture track corresponding to the field of view of the user of the client apparatus 200, on the basis of the display region information regarding the display region of the sub-picture in the projected picture.

In step S125, the segment file processing section 221 extracts the encoded data of the stream in the track selected in step S124, from the ISOBMFF file acquired in step S121.

In step S126, the decode section 222 decodes the encoded data of the stream extracted in step S125.

In step S127, the display information generating section 223 reproduces the stream (content) resulting from decoding in step S126. More specifically, the display information generating section 223 generates data of a display image from the stream and feeds the data to the display section 217 for display.

When the processing in step S127 ends, the content reproduction processing ends.

The content reproduction processing executed as described above allows the client apparatus 200 to more easily select a stream utilizing the information regarding the sub-picture display region included in the ISOBMFF file. For example, on the basis of the information, the client apparatus 200 can easily select the appropriate stream corresponding to the field of view of the user.

<Definition in 2D Coverage Information Box>

As described above, the segment file generating section 123 of the file generating apparatus 100 newly defines display region information regarding the sub-picture indicating which part of the displayed projected picture corresponds to each sub-picture, and signals the display region information in tracks. In other words, the segment file generating section 123 defines the display region information regarding the sub-picture as information for each sub-picture.

For example, the segment file generating section 123 defines 2D Coverage Information Box as display region information regarding the sub-picture, and signals 2D Coverage Information Box as a Box different from Region Wise Packing Box. For example, the segment file generating section 123 defines 2D Coverage Information Box for the 2D Coverage Information Box in Scheme Information Box. For example, the segment file generating section 123 defines 2D Coverage Information Box for the 2D Coverage Information Box in Projected Omnidirectional Video Box below Scheme Information Box. Additionally, the segment file generating section 123 may define 2D Coverage Information Box for the segment file generating section 123 in other Boxes.

In other words, the display region information regarding the sub-picture (region-related information related to a region in the entire picture corresponding to the sub-picture stored in the track) may be stored in Scheme Information Box in the ISOBMFF file that is different from Region Wise Packing Box or in Box that is different from Region Wise Packing Box and that is located in a layer below the Scheme Information Box.

This allows the client apparatus 200 to easily select and reproduce a sub-picture track without parsing Sub Picture Composition Box.

Note that the 2D Coverage Information Box can be used for signaling the display region information even in a case where the picture stored in each track is not a sub-picture or where Region Wise Packing Box is not present (the picture is not subjected to Region Wise Packing).

Syntax 331 in FIG. 16 represents an example of syntax of 2D Coverage Information Box. As illustrated in syntax 331, fields such as proj_picture_width, proj_picture_height, proj_reg_width, proj_reg_height, proj_reg_top, and proj_reg_left are set in 2D Coverage Information Box.

Syntax 332 in FIG. 17 represents an example of semantics of the fields defined in the 2D Coverage Information Box. As illustrated in the semantics 332, proj_picture_width indicates the width of the projected picture, and proj_picture_height indicates the height of the projected picture. proj_reg_width indicates the width of a region on the projected picture corresponding to the picture in the track. proj_reg_height indicates the height of the region on the projected picture corresponding to the picture in the track. proj_reg_top indicates the vertical coordinate of the region on the projected picture corresponding to the picture in the track. proj_reg_left indicates the region horizontal coordinate on the projected picture corresponding to the picture in the track.

Figure 18:
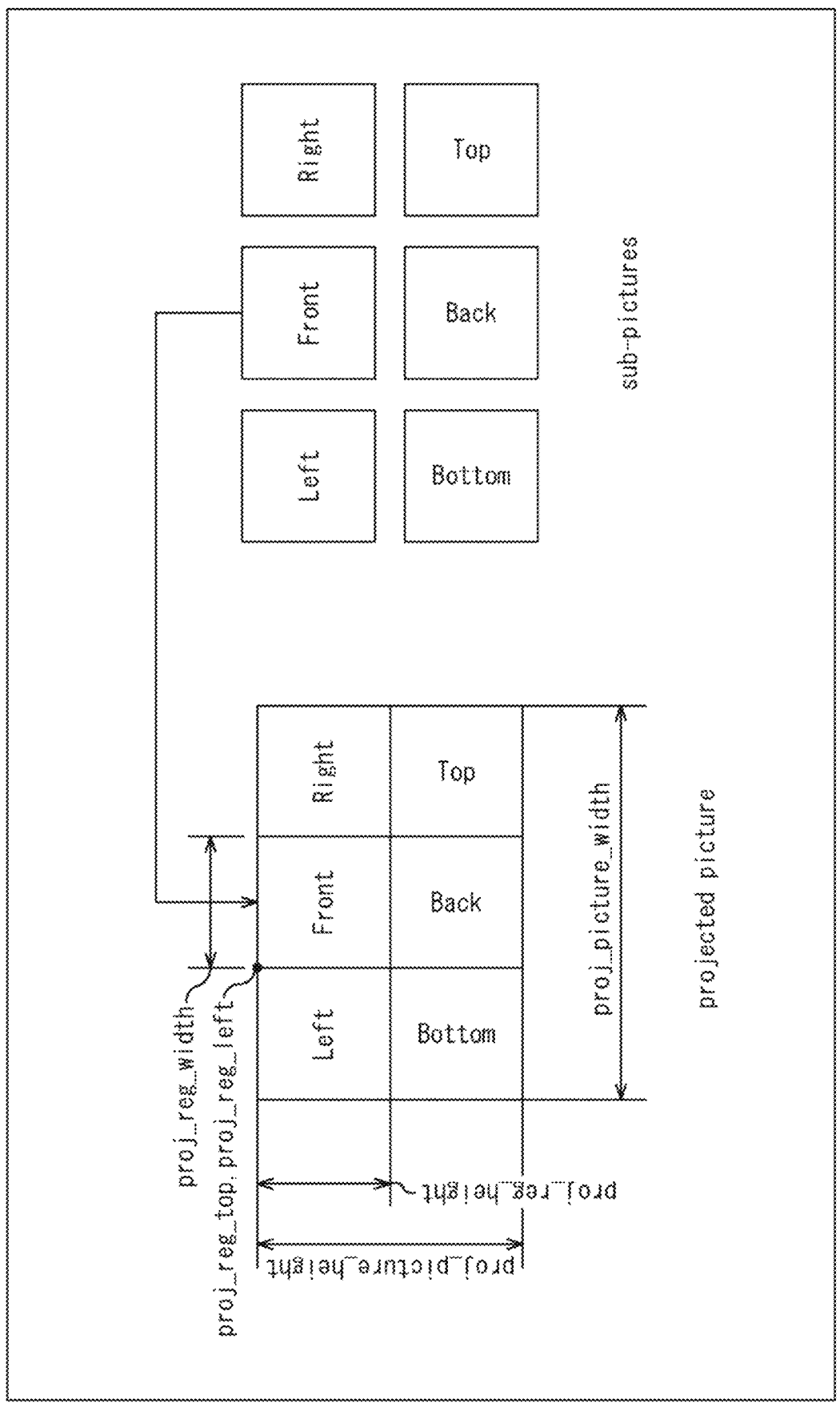
FIG. 18 is a diagram illustrating an example of display region information.

In other words, various pieces of information as illustrated in FIG. 18 are defined in 2D Coverage Information Box.

Note that the fields may be represented as the actual number of pixels or that proj_reg_width, proj_reg_height, proj_reg_top, and proj_reg_left may be represented as relative values with respect to proj_picture_width and proj_picture_height. Representation of each field as the actual number of pixels is useful in selecting a track according to the resolution of display of the client.

By referencing 2D Coverage Information Box for sub-picture tracks configured as described above, the client apparatus 200 can easily identify the display regions of sub-picture tracks without parsing Sub Picture Composition Box. Thus, the client apparatus 200 can, for example, easily select a sub-picture track according to the field of view of the user. Note that the client apparatus 200 can select, by similar processing, a track that is not a sub-picture track.

Alternatively, in Sub Picture Composition Box illustrated in the syntax 21 in FIG. 3, an identical_to_proj_pic_flag field may be additionally defined as illustrated in syntax 1001 in FIG. 73 to indicate whether or not the entire picture is identical to the projected picture, and Sub Picture Composition Box illustrated in the syntax 22 in FIG. 4 may indicate the display region information regarding the sub-picture track in a case where the entire picture is identical to the projected picture. For the value of the identical_to_proj_pic_flag field, a value of 0 indicates that the entire picture is different from the projected picture, and a value of 1 indicates that the entire picture is identical to the projected picture.

At this time, in a case where the identical_to_proj_pic_flag field is 1, the entire picture has not been subjected to region-wise packing processing, and the semantics of the track_x, track_y, track_width, track_height, composition_width, and composition_height fields illustrated in the semantics 23 in FIG. 5 are respectively identical to the proj_reg_left, proj_reg_top, proj_reg_width, proj_reg_height, proj_picture_width, and proj_picture_height fields in 2D Coverage Information Box illustrated in the semantics 332 in FIG. 17.

Note that the identical_to_proj_pic_flag field may be additionally defined in Sub Picture Region Box or in any other Box. Alternatively, the presence or absence of a particular Box may indicate whether or not the entire picture is identical to the projected picture.

Additionally, 1 bit in 24-bit flags common to Sub Picture Composition Box and other Boxes corresponding to extension of FullBox may be used to indicate whether or not the entire picture is identical to the projected picture.

<In Case where Sub-Pictures Include Nonconsecutive Regions>

Figure 19:
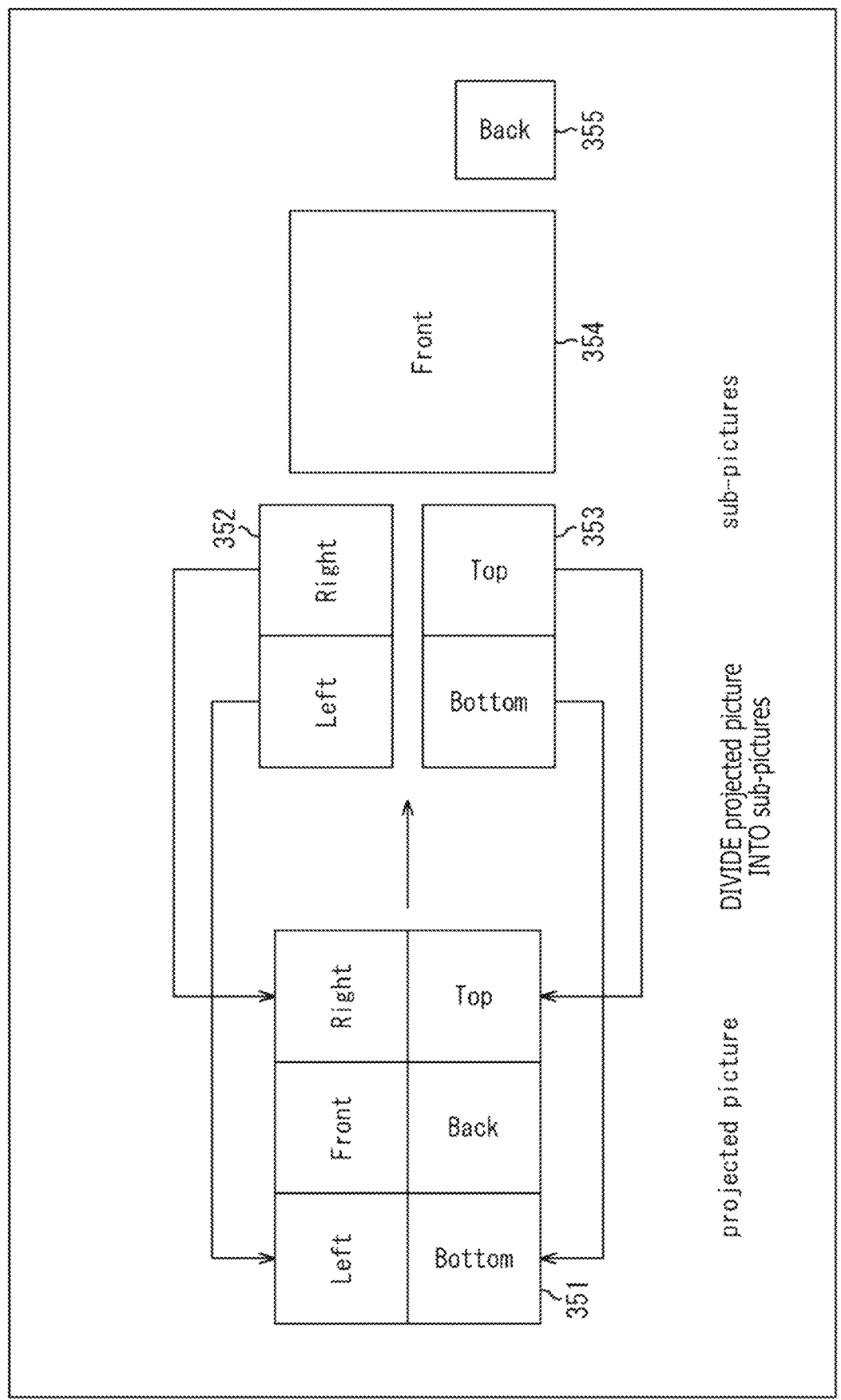
FIG. 19 is a diagram illustrating an example of sub-pictures including nonconsecutive regions.

Note that, as illustrated in FIG. 19, the syntax 331 in FIG. 16 fails to deal with a case where the sub-pictures include nonconsecutive regions. In an example in FIG. 19, a projected picture 351 is divided into sub-pictures 352 to 355. In this case, the sub-picture 352 includes a Left plane and a Right plane in the three-dimensional structure image (the Left plane and the Right plane are adjacent to each other). The Left plane and the Right plane are not consecutive to each other in the projected picture 351. Additionally, the sub-picture 353 includes a Top plane and a Bottom plane in the three-dimensional structure image (the Top plane and the Bottom plane are adjacent to each other). The Top plane and the Bottom plane are not consecutive to each other in the projected picture 351.

The syntax 331 in FIG. 16 can specify only one sizable region in the projected picture and thus fails to specify a plurality of nonconsecutive regions as described above.

Thus, a plurality of regions may be allowed to be specified in 2D Coverage Information Box, and a plurality of nonconsecutive regions may be allowed to be specified in the projected picture.

Syntax 371 in FIG. 20 represents an example of syntax of 2D Coverage Information Box in this case. As illustrated in the syntax 371, in this case, a num_regions field is added to the defined fields. Semantics 372 in FIG. 21 represents an example of semantics of the added field in 2D Coverage Information Box in this case. As illustrated in the semantics 372, num_regions indicates the number of regions on the projected picture included in the sub-picture.

In other words, in this case, the num_regions field is used to (independently) define the fields in 2D Coverage Information Box illustrated in FIG. 17, for each region of the projected picture. Accordingly, a plurality of regions of the projected picture can be specified. This enables signaling of nonconsecutive display regions of the projected picture.

Note that, in a case where 2D Coverage Information Box is signaled in Sub Picture Composition Box, the display regions in the entire picture (projected picture) may be signaled.

Additionally, in a case where 2D Coverage Information Box is not present in Projected Omnidirectional Video Box in the track, this may indicate that the track stores a 360-degree omnidirectional video. Similarly, in a case where 2D Coverage Information Box is not present in Sub Picture Composition Box, this may indicate that the entire picture including the sub-picture tracks is a 360-degree omnidirectional video.

<Extension of Region Wise Packing Box>

Region Wise Packing Struct in Region Wise Packing Box defined in OMAF may be extended to signal which display region of the projected picture corresponds to the sub-picture in the track. A signaling location of Region Wise Packing Box is below Projected Omnidirectional Video Box in Sample Entry in the sub-picture track. Note that the Region Wise Packing Box may be signaled to any other location.

For example, a flag is newly defined that signals display region information regarding the sub-picture, a Rect Projected Region structure is also newly defined that signals the display region information regarding the sub-picture, and the display region information is signaled in Region Wise Packing Struct. Note that the Region Wise Packing Struct can be used for signaling of the display region information even in a case where the picture stored in the track is not a sub-picture.

Syntax 373 in FIG. 22 represents an example of syntax of Region Wise Packing Struct in the above-described case. As illustrated in the syntax 373, in this case, a 2D_coverage_flag field is added to the fields defined in Region Wise Packing Struct. Semantics 374 in FIG. 23 represents an example of semantics of fields additionally defined in Region Wise Packing Struct in this case. As illustrated in the semantics 374, 2D_coverage_flag is flag information indicating whether or not to signal only the display regions on the projected picture. For example, the field having a value of 0 indicates that the region-wise packing information is to be signaled. Additionally, the field having a value of 1 indicates that the display regions on the projected picture are to be signaled.

Note that RectProjetedRegion is further defined for Region Wise Packing Struct in this case. Syntax 375 in FIG. 24 indicates an example of syntax of the RectProjetedRegion. As illustrated in the syntax 375, fields such as proj_reg_width[i], proj_reg_height[i], proj_reg_top[i], and proj_reg_left [i] are defined in the RectProjetedRegion.

Semantics 376 in FIG. 25 represents an example of syntax of fields defined in the RectProjetedRegion. As illustrated in the semantics 376, proj_reg_width indicates the width of a region on the projected picture to which the picture in the track corresponds. proj_reg_height indicates the height of the region on the projected picture to which the picture in the track corresponds. proj_reg_top indicates the vertical coordinate of the region on the projected picture to which the picture in the track corresponds. proj_reg_left indicates the region horizontal coordinate on the projected picture to which the picture in the track corresponds.

Note that the above-described fields may be indicated by the actual number of pixels or that proj_reg_width, proj_reg_height, proj_reg_top, and proj_reg_left may be indicated by relative values with respect to proj_picture_width and proj_picture_height signaled in Region Wise Packing Struct.

Additionally, Rect Wise Packing Struct may be extended such that when 2D_coverage_flag==1, only the display region information in the projected picture is signaled.

Syntax 377 in FIG. 26 represents an example of syntax of Rect Wise Packing Struct in the above-described case. Syntax 378 in FIG. 27 is a diagram illustrating an example of syntax of RectRegionPacking set in Rect Wise Packing Struct in this case.

<Extension of Coverage Information Box>

Coverage Information Box indicating the display region of the track on a spherical surface defined in OMAF may be extended to enable the display region on the projected picture to be signaled by 2D Content Coverage Struct newly defined.

In other words, the display region information regarding the sub-picture (region-related information related to a region in the entire picture corresponding to the sub-picture stored in the track) may be stored in Coverage Information Box indicating the display region of the track on the spherical surface.

Syntax 379 in FIG. 28 represents an example of syntax of Coverage Information Box extended. As illustrated in the syntax 379, in this case, 2D_coverage_flag, ContentCoverageStruct( ), and 2DContentCoverageStruct( ) are defined in Coverage Information Box.

Semantics 380 in FIG. 29 represents an example of semantics of the above-described fields. As illustrated in the semantics 380, 2D_coverage_flag is flag information signaling the type of the display region information. This value being 0 indicates that the spherical-surface display region information is signaled, and this value being 1 indicates that the display region on the projected picture is signaled. ContentCoverageStruct( ) signals the display region of the track on the projected picture. 2DContentCoverageStruct( ) signals the display region of the track on the spherical surface. The fields in 2D Content Coverage Struct are similar to the fields in 2D Coverage Information Box in the case of FIG. 20.

Note that Content Coverage Struct may be extended to signal the display region on the projected picture in addition to the spherical-surface display region.

<Signaling in Case where Sub-Picture Division Method Varies Dynamically>

Signaling in a case where the sub-picture division method does not vary dynamically has been described. In contrast, in a case where the division method varies dynamically, the display region information regarding the display region of the sub-picture in the projected picture varies dynamically. The above-described example fails to deal with this case.

Thus, an example of additional signaling will be described below that is used for signaling dynamically varying display region information regarding the display region of the sub-picture. Note that the signaled information is the same as the information signaled in 2D Coverage Information Box as described above (for example, FIG. 16).

<Supplemental Enhancement Information (SEI) Message>

For HEVC or AVC, a 2D Coverage Information SEI message may be newly defined, and display region information regarding the sub-picture varying dynamically in the stream may be signaled in units of access units.

In other words, the display region information regarding the sub-picture (region-related information related to a region in the entire picture corresponding to the sub-picture stored in the track) may be stored in a Supplemental Enhancement information message in the ISOBMFF file.

Syntax 381 in FIG. 30 represents an example of syntax of the 2D Coverage Information SEI message in the above-described case. As illustrated in the syntax 381, the following are set in the 2D Coverage Information SEI message: 2D_coverage_information_cancel_flag, 2D_coverage_information_persistence_flag, 2D_coverage_information_reserved_zero_6bits, proj_picture_width, proj_picture_height, num_regions, proj_reg_width[i], proj_reg_height[i], proj_reg_top[i], proj_reg_left[i], and the like.

Semantics 382 in FIG. 31 represents an example of semantics of fields defined in the 2D Coverage Information SEI message. As illustrated in the semantics 382, 2D_coverage_information_cancel_flag is flag information related to cancellation of 2D_coverage_information. This value being 1 cancels the persistent application of SEI preceding in the order of output. Additionally, this value being 0 signals the 2D coverage information.

2D_coverage_information_persitence_flag is flag information related to the scope of application of SEI. This value being 0 applies the SEI information only to pictures including SEI. Additionally, this value being 1 continues application of SEI until a new coded video sequence is started or the end of the stream is reached.

2D_coverage_information_reserved_zero_6bits is filled with 0. proj_picture_width indicates the width of the projected picture. proj_picture_height indicates the height of the projected picture. num_regions indicates the number of regions on the projected picture. proj_reg_width indicates the width of a region on the projected picture to which the stream corresponds. proj_reg_height indicates the height of the region on the projected picture to which the stream corresponds. proj_reg_top indicates the vertical coordinate of the region on the projected picture to which the stream corresponds. proj_reg_left indicates the region horizontal coordinate on the projected picture to which the stream corresponds.

Note that each of the above-described fields may be indicated by the actual number of pixels or that proj_reg_width, proj_reg_height, proj_reg_top, and proj_reg_left may be indicated by relative values with respect to proj_picture_width and proj_picture_height.

<Timed Metadata>

Additionally, the mechanism of timed metadata corresponding to a stream storing metadata varying chronologically may be utilized to newly define 2D Coverage Information timed metadata, and the display region information regarding the sub-picture may be signaled that varies dynamically within a referenced stream. As a track reference type for the track with which the 2D Coverage Information timed metadata is associated, for example, '2dco' is used.

In other words, the display region information regarding the sub-picture (region-related information related to a region in the entire picture corresponding to the sub-picture stored in the track) may be stored in the timed metadata in the ISOBMFF file.

The use of the timed metadata allows the client to identify a dynamically varying display region without decoding the sub-picture stream and to use the display region as a reference for selection from among the streams.

Syntax 383 in FIG. 32 represents an example of syntax of 2D Coverage Information Sample Entry. Syntax 384 in FIG. 33 represents an example of syntax of 2D Coverage Information Sample.

In 2D Coverage Information Sample Entry, proj_picture_width and proj_picture_height are signaled that are typically invariable within the stream. Note that, in a case of varying within the stream, proj_picture_width and proj_picture_height may be signaled in 2DCoverageInformationSample.

Note that semantics of the fields in 2D Coverage Information Sample Entry and 2D Coverage Information Sample is similar to the semantics in FIG. 17 and FIG. 21.

<Sample Group>

By using a tool referred to as Sample Group and corresponding to a mechanism associating meta-information in units of samples, the display region information regarding the sub-picture varying dynamically within the stream may be signaled in units of samples.

Figure 34:
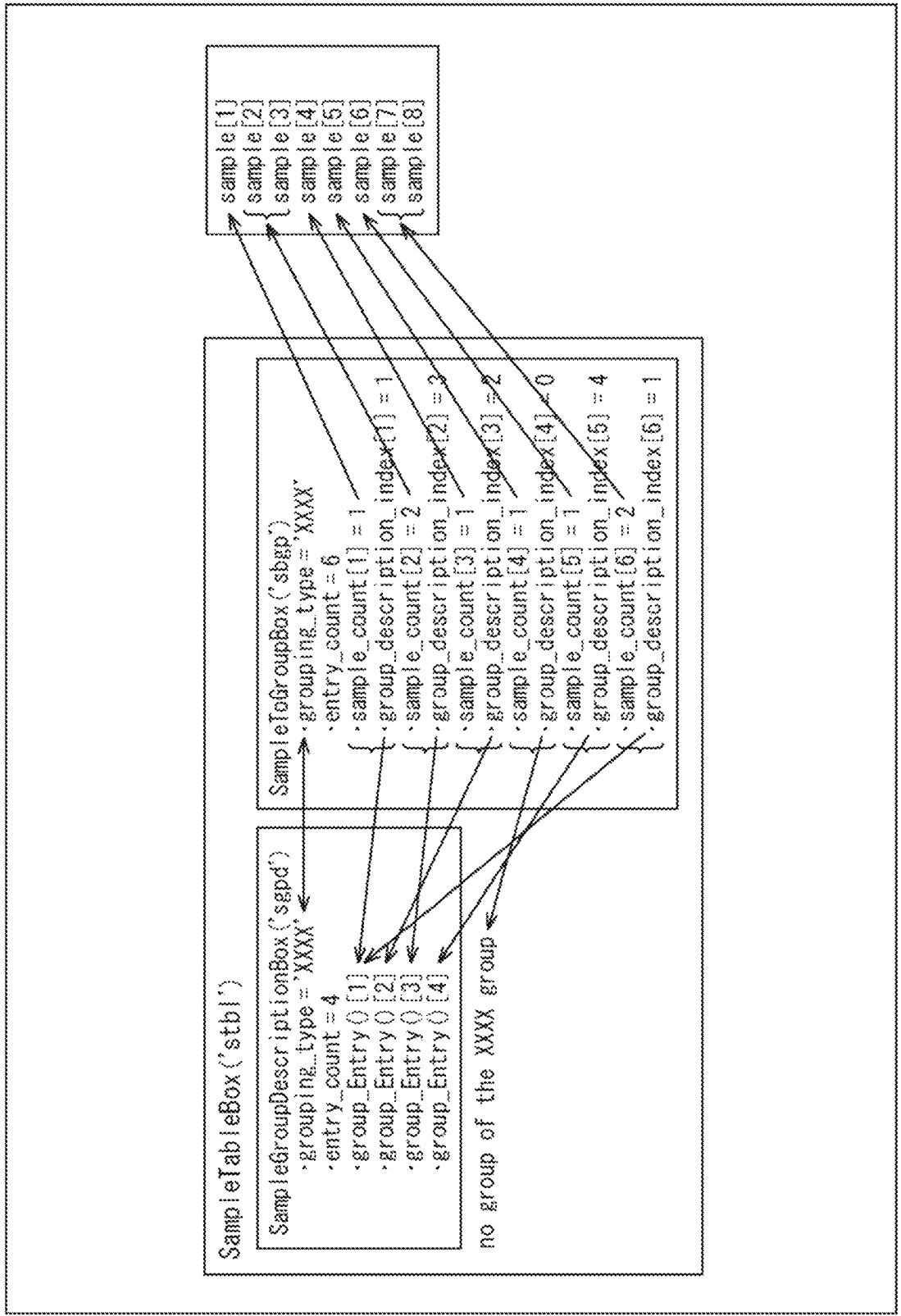
FIG. 34 is a diagram illustrating an example of Sample Table Box.

As illustrated in FIG. 34, Sample Group in which the meta-information is described is signaled in Sample Group Description Box of Sample Table Box as Group Entry, and is associated with a sample via Sample To Group Box.

As illustrated in FIG. 34, a grouping_type of Sample To Group Box indicates the grouping_type of Sample Group Description Box to be associated. For 1 entry, sample_count and group_description_index are signaled, group_description_index indicates an index of Group Entry to be associated, and sample_count indicates the number of samples belonging to Group Entry.

For example, 2D Coverage Information Sample Group Entry may be newly defined, and the display region information regarding the sub-picture varying dynamically within the stream may be stored in 2D Coverage Information Sample Entry.

In other words, the display region information regarding the sub-picture (region-related information related to a region in the entire picture corresponding to the sub-picture stored in the track) may be stored in Sample Group Entry in the ISOBMFF file.

Syntax 391 in FIG. 35 represents an example of syntax of 2D Coverage Information Sample Group Entry. The Sample Group Entry is signaled in Sample Group Description Box as described above, and Sample To Group Box associates a sample with Sample Group Entry. grouping_type is '2cgp.'

Note that the semantics of the fields in the 2D Coverage Information Sample Group Entry are similar to the semantics in FIG. 16 and FIG. 21.

Note that the above-described three examples (Supplemental Enhancement Information (SEI) message, Timed metadata, Sample Group) can be used as a signal for dynamically varying display region information even in a case where the picture stored in the track is not a sub-picture.

Additionally, in a case where the display region of the sub-picture on the projected picture varies dynamically as described above, the information of 2D Coverage Information Box signaled in Projected Omnidirectional Video Box may include an initial value for the display region of the stream.

Additionally, a flag indicating that the display region of the sub-picture in the projected picture varies dynamically within the stream may be signaled in 2D Coverage Information Box or any other Box. This information allows the client to easily identify the stream to include a dynamically varying display region.

3. Second Embodiment

<Signaling, in MPD File, of Information Related to Display Region of Sub-Picture>

The information related to the display region of the sub-picture may be signaled using an MPD file. In other words, to enable the client to select and reproduce, according to the field of view of the user, Adaptation Set referencing the sub-picture, display region information regarding the display region of the sub-picture on the projected picture may be newly defined in the MPD file and signaled in Adaptation Set.

In other words, a control file may be generated that manages image encoded data for each of a plurality of sub-pictures into which the entire picture is divided and which is then encoded and that includes region-related information related to a region in the entire picture corresponding to the sub-picture, as information different from arrangement information for each picture region, the control file being used for controlling distribution of the image encoded data.

For example, in the file generating apparatus 100, used as an information processing apparatus, the MPD file generating section 113 may function as a file generating section generating a control file that manages image encoded data for each of a plurality of sub-pictures into which the entire picture is divided and which is then encoded and that includes region-related information related to a region in the entire picture corresponding to the sub-picture, as information different from arrangement information for each picture region, the control file being used for controlling distribution of the image encoded data. In other words, the information processing apparatus (for example, the file generating apparatus 100) may include a file generating section (for example, the MPD file generating section 113).

This allows the client to more easily select a stream on the basis of this information as described above.

Note that, in the MPD file, metadata for each stream is managed as Adaptation Set or Representation. In other words, in a case where the MPD file is used, a stream is selected by selecting Adaptation Set or Representation.

Additionally, the above-described picture (entire picture) may be all or a part of an omnidirectional video (projected plane image resulting from projection and mapping of an image extending over 360 degrees around in the horizontal direction and over 180 degrees around in the vertical direction). In other words, in a case where the file generating apparatus 100 uses all or a part of such a projected plane image as an entire picture and divides the entire picture into sub-pictures, the present technique can be applied as described above.

Thus, even in a case where an omnidirectional video is distributed, the client can more easily select a stream on the basis of this information as described above.

Note that this region-related information (display region information) may be included in the MPD file as information for each sub-picture. This allows the client to easily learn which part of the entire picture corresponds to the sub-picture, by referencing the information regarding the sub-picture referenced by Adaptation Set.

<Procedure of Upload Processing>

Figure 36:
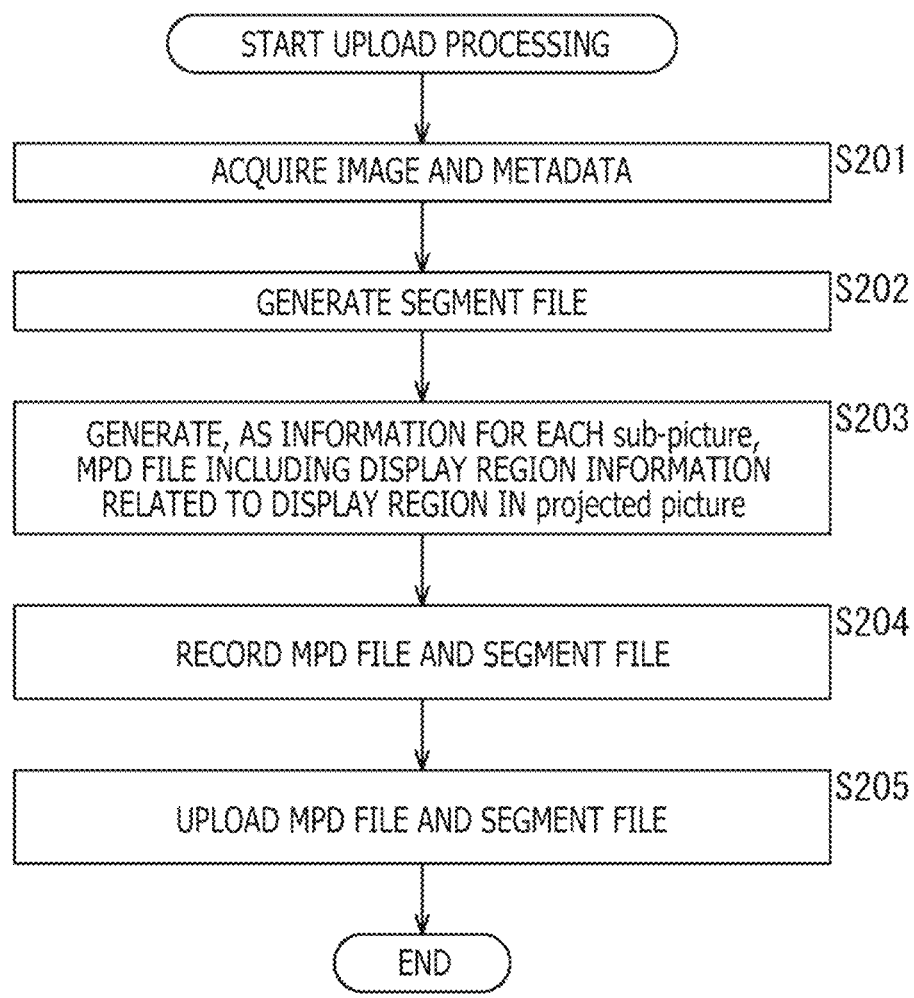
FIG. 36 is a flowchart illustrating an example of procedure of upload processing.

An example of procedure of upload processing executed by the file generating apparatus 100 in FIG. 11 in the above-described case will be described with reference to a flowchart in FIG. 36.

When the upload processing is started, the data input section 111 of the file generating apparatus 100 acquires an image and metadata in step S201.

In step S202, the segment file generating section 123 generates a segment file for the image.

In step S203, the MPD file generating section 113 generates an MPD file including, as information for each sub-picture, display region information regarding the display region in the projected picture.

In step S204, the recording section 114 records the segment file generated by the processing in step S202.

Additionally, the MPD file generated by the processing in step S203 is recorded in the recording section 114.

In step S205, the upload section 115 reads, from the recording section 114, the segment file recorded in step S204 and uploads the segment file to the server. Additionally, the upload section 115 reads, from the recording section 114, the MPD file recorded in step S204 and uploads the MPD file to the server.

When the processing in step S204 ends, the upload processing ends.

The upload processing executed as described above allows the file generating apparatus 100 to generate an MPD file including, as information for each sub-picture, display region information regarding the display region in the projected picture.

Thus, the client can more easily select and reproduce, on the basis of the display region information, for example, an appropriate stream corresponding to the field of view of the user.

<Utilization of Information Related to Display Region of Sub-Picture and Signaled in MPD File>

Additionally, the information related to the display region of the sub-picture and signaled in the MPD file may be utilized to select a stream.

In other words, a control file may be acquired that manages image encoded data for each of a plurality of sub-pictures into which the entire picture is divided and which is then encoded and that includes region-related information related to a region in the entire picture corresponding to the sub-picture, as information different from arrangement information for each picture region, the control file being used for controlling distribution of the image encoded data, and a stream of image encoded data may be selected on the basis of the region-related information included in the control file acquired.

For example, in the client apparatus 200 used as an information processing apparatus, the MPD file acquiring section 212 may function as a control file acquiring section acquiring a control file that manages image encoded data for each of a plurality of sub-pictures into which the entire picture is divided and which is then encoded, the control file including region-related information related to a region in the entire picture corresponding to the sub-picture, as information different from arrangement information for each picture region, the control file being used for controlling distribution of the image encoded data, and the MPD file processing section 213 may function as an image processing section selecting a stream of image encoded data on the basis of the region-related information included in the control file acquired by the file acquiring section. In other words, the information processing apparatus (for example, the client apparatus 200) may include a file acquiring section (for example, the MPD file acquiring section 212) and the image processing section (for example, the MPD file processing section 213).

This allows the client apparatus 200 to easily select a stream.

Note that the above-described picture (entire picture) may be all or a part of an omnidirectional video (projected plane image resulting from projection and mapping of an image extending over 360 degrees around in the horizontal direction and over 180 degrees around in the vertical direction). In other words, even in a case where the client apparatus 200 uses all or a part of the projected plane image as an entire picture, divides the entire picture into sub-pictures forming a stream, and reproduces the image, the present technique can be applied as described above.

Additionally, the region-related information (display region information) may be included in the MPD file as information for each sub-picture. This allows the client apparatus 200 to easily learn which part of the entire picture corresponds to the sub-picture simply by referencing the information regarding the sub-picture referenced by Adaptation Set.

<Procedure of Content Reproduction Processing>

Figure 37:
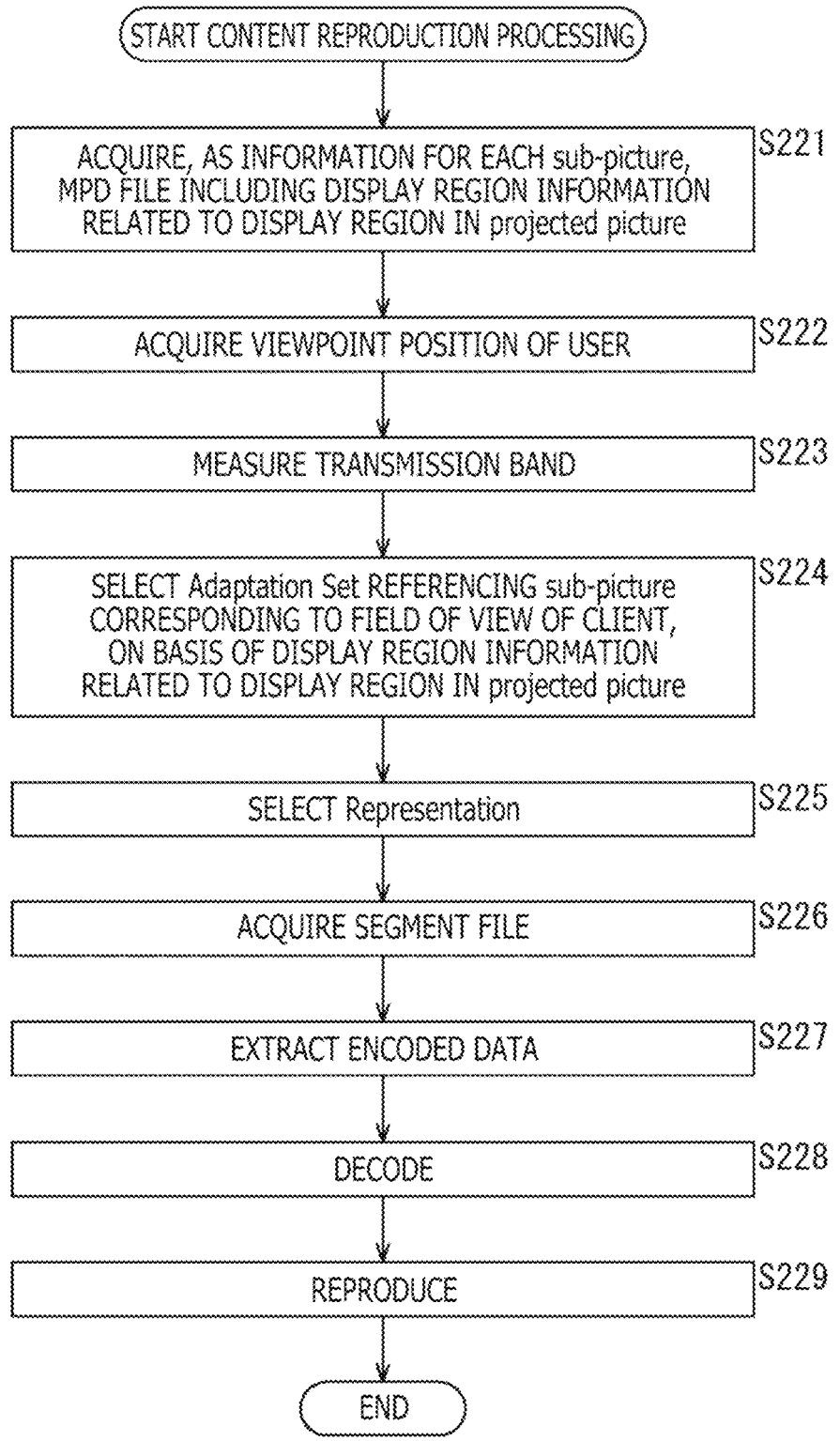
FIG. 37 is a flowchart illustrating an example of procedure of content reproduction processing.

An example of procedure of content reproduction processing executed by the client apparatus 200 in the above-described case will be described with reference to a flowchart in FIG. 37.

When the content reproduction processing is started, the MPD file acquiring section 212 of the client apparatus 200 acquires, in step S221, an MPD file including, as information for each sub-picture, the display region information regarding the display region in the projected picture.

In step S222, the display control section 215 acquires a measurement result for the viewpoint position (and line-of-sight direction) of the user.

In step S223, the measurement section 211 measures the transmission bandwidth of the network between the server and the client apparatus 200.

In step S224, the MPD file processing section 213 selects Adaptation Set referencing the sub-picture corresponding to the field of view of the user of the client apparatus 200, on the basis of the display region information regarding the display region of the sub-picture in the projected picture.

In step S225, the MPD file processing section 213 selects, from Adaptation Set selected in step S224, Representation corresponding to the viewpoint position and line-of-sight direction of the user, the transmission bandwidth of the network between the client and the server, or the like.

In step S226, the segment file acquiring section 214 acquires a segment file corresponding to Representation selected in step S225.

In step S227, the segment file processing section 221 extracts encoded data from the segment file acquired in step S226.

In step S228, the decode section 222 decodes the encoded data of a stream extracted in step S227.

In step S229, the display information generating section 223 reproduces the stream (content) resulting from the decoding in step S228. More specifically, the display information generating section 223 generates data of a display image from the stream and feeds the data of the display image to the display section 217 to cause the display section 217 to display the display image.

When the processing in step S229 ends, the content reproduction processing ends.

The content production processing executed as described above allows the client apparatus 200 to more easily select a stream utilizing the information regarding the sub-picture display region included in the MPD file. For example, on the basis of the information, the client apparatus 200 can easily select an appropriate stream corresponding to the field of view of the user.

<Definition by 2D Coverage Information Descriptor>

As described above, the MPD file generating section 113 of the file generating apparatus 100 newly defines and signals the display region information regarding the sub-picture indicating which part of the displayed projected picture corresponds to the sub-picture referenced by Adaptation Set. In other words, the MPD file generating section 113 defines the display region information regarding the sub-picture as information for each sub-picture.

For example, the MPD file generating section 113 defines 2D Coverage Information descriptor as display region information regarding the sub-picture and signals the 2D Coverage Information descriptor as a descriptor different from the Region wise packing descriptor. For example, the MPD file generating section 113 defines Supplementary Property at @schemeIdUri="urn:mpeg:mpegI:omaf:2017:2dco" as 2D coverage information descriptor. Note that the MPD file generating section 113 may use Essential Property of the same schemeIdUri to define the 2D coverage information descriptor.

In other words, the image encoded data for each sub-picture may be managed for each adaptation set, the arrangement information for each picture region may be stored in the Region-wise packing descriptor, and the display region information regarding the sub-picture (region-related information related to a region in the entire picture corresponding to the sub-picture referenced by the adaptation set) may be defined in Supplemental Property or Essential Property in the MPD file.

Note that a DASH client not supporting schemeIdUri of Essential Property needs to neglect Adaptation Set (which may alternatively be Representation or the like) in which the Property is written. Additionally, a DASH client not supporting schemeIdUri of Supplemental Property may neglect this Property value and utilize Adaptation Set (which may alternatively be Representation or the like).

Note that the 2D Coverage Information descriptor may be present not only in Adaptation Set but also in MPD or Representation. Additionally, the 2D Coverage Information descriptor is applicable even in a case where the picture referenced by Adaptation Set is not a sub-picture or where the picture referenced by Adaptation Set is not subjected to region-wise packing processing.

Attribute values 411 in FIG. 38 represent examples of attribute values of 2D coverage information descriptors. As illustrated in the attribute value 411, omaf:@proj_picture_width has a data type xs:unsignedInt and indicates the width of the projected picture. omaf:@proj_picture_height has the data type xs:unsignedInt and indicates the height of the projected picture. omaf:@proj_reg_width has the data type xs:unsignedInt and indicates the width of a region on the projected picture to which the picture referenced by Adaptation Set corresponds. omaf:@proj_reg_height has the data type xs:unsignedInt and indicates the height of the region on the projected picture to which the picture referenced by Adaptation Set corresponds. omaf:@proj_reg_top has the data type xs:unsignedInt and indicates the vertical coordinate of the region on the projected picture to which the picture referenced by Adaptation Set corresponds. omaf:@proj_reg_left has the data type xs:unsignedInt and indicates the region horizontal coordinate on the projected picture to which the picture referenced by Adaptation Set corresponds.

Each of the above-described attribute values may be indicated by the actual number of pixels or omaf:@proj_reg_width, omaf:@proj_reg_height, omaf:@proj_reg_top, and omaf:@proj_reg_left may be indicated by relative values with respect to omaf:@proj_picture_width and omaf:@proj_picture_height.

Additionally, information indicating that the entire picture is identical to the projected picture may be defined in Supplemental Property or Essential Property in the MPD file. For example, the MPD file generating section 113 defines Supplemental Property at @schemeIdUri="urn:mpegI:omaf:2017:prid" illustrated in FIG. 74 as a Projected picture identical descriptor. For example, the presence of this descriptor in Adaptation Set indicates that the entire picture including the sub-picture referenced by Adaptation Set is not subjected to region-wise packing processing and is identical to the projected picture.

At this time, the display region of the sub-picture referenced by Adaptation Set in which the Projected picture identical descriptor is present may be represented, for example, by MPEG-DASH SRD (Spatial Relationship Description) indicating the display region of each of two or more regions resulting from division of the entire picture, the regions being independently encoded. Although not illustrated, SRD indicates sub-picture division information indicating, for example, the manner of dividing the sub-picture as is the case with Sub Picture Region Box illustrated in the syntax 22 in FIG. 4.

At this time, in Adaptation Set in which the Projected picture identical descriptor is present, although not illustrated, the semantics of object_x, object_y, object_width, object_height, total_width, and total_height corresponding to attribute values of SRD is identical to the semantics of omaf:@proj_reg_left, omaf:@proj_reg_top, omaf:@proj_reg_width, omaf:@proj_reg_height, omaf:@proj_picture_width, and omaf:@proj_picture_height corresponding to the attribute values of the 2D coverage information descriptor illustrated in an attribute value 441 in FIG. 38.

Note that the Projected picture identical descriptor may be present not only in Adaptation Set but also in MPD or Representation and that the information indicating that the entire picture is identical to the projected picture may be defined by any other descriptor, element, or attribute.

<In Case where Sub-Picture Includes Nonconsecutive Regions>

Note that, in the above-described example, the display region information fails to be signaled in a case where the sub-picture includes nonconsecutive regions on the projected picture. Thus, the 2D Coverage Information descriptors may be enabled to deal with the case where sub-picture includes nonconsecutive regions on the projected picture.

Attribute values 412 in FIG. 39 represents examples of attribute values of 2D Coverage Information descriptors in the above-described case. As illustrated in the attribute value 412, twoDCoverage is a container element having a data type omaf:twoDCoverageType. twoDCoverage@proj_picture_width has the data type xs:unsignedInt and indicates the width of the projected picture. twoDCoverage@proj_picture_height has the data type xs:unsignedInt and indicates the height of the projected picture.

twoDCoverage.twoDCoverageInfo has a data type omaf:twoDCoverageInfoType and indicates an element indicating region information regarding the regions on the projected picture. A plurality of the attribute values can be signaled. twoDCoverage.twoDCoverageInfo@proj_reg_width has the data type xs:unsignedInt and indicates the width of a region on the projected picture to which the picture referenced by Adaptation Set corresponds. twoDCoverage.twoDCoverageInfo@proj_reg_height has the data type xs:unsignedInt and indicates the height of the region on the projected picture to which the picture referenced by Adaptation Set corresponds. twoDCoverage.twoDCoverageInfo@proj_reg_top has the data type xs:unsignedInt and indicates the vertical coordinate of the region on the projected picture to which the picture referenced by Adaptation Set corresponds. twoDCoverage.twoDCoverageInfo@proj_reg_left has the data type xs:unsignedInt and indicates the region horizontal coordinate on the projected picture to which the picture referenced by Adaptation Set corresponds.

Data types 413 in FIG. 40 represent examples of definitions of data types of 2D Coverage Information descriptors.

As described above, enabling signaling of a plurality of regions on the projected picture allows nonconsecutive display regions on the projected picture to be signaled.

<Extension of Region-Wise Packing Descriptor>

The Region-wise packing descriptor defined in OMAF may be extended to signal display region information regarding the display region, on the projected picture, of the sub-picture referenced by Adaptation Set.

Attribute values 414 in FIG. 41 represent examples of attribute values of Region-wise packing descriptors extended on the basis of the signaling of for the attribute values 411 in FIG. 38. The data types are similar to the data types in FIG. 40.

As illustrated in the attribute values 414, omaf:@packing_type has a data type omaf:OptionallistofUnsignedByte and indicates the packing type of region-wise packing. This attribute value being 0 indicates packing of a rectangular region.

omaf:@proj_picture_width has the data type xs:unsignedInt and indicates the width of the projected picture. omaf:@proj_picture_height has the data type xs:unsignedInt and indicates the height of the projected picture. omaf:@proj_reg_width has the data type xs:unsignedInt and indicates the width of a region on the projected picture to which the picture referenced by Adaptation Set corresponds. omaf:@proj_reg_height has the data type xs:unsignedInt and indicates the height of the region on the projected picture to which the picture referenced by Adaptation Set corresponds. omaf:@proj_reg_top has the data type xs:unsignedInt and indicates the vertical coordinate of the region on the projected picture to which the picture referenced by Adaptation Set corresponds. omaf:@proj_reg_left has the data type xs:unsignedInt and indicates the region horizontal coordinate on the projected picture to which the picture referenced by Adaptation Set corresponds.

Each of the above-described attribute values may be indicated by the actual number of pixels or omaf:@proj_reg_width, omaf:@proj_reg_height, omaf:@proj_reg_top, and omaf:@proj_reg_left may be indicated by relative values with respect to omaf:@proj_picture_width and omaf:@proj_picture_height.

Attribute values 415 in FIG. 42 represent examples of attribute values of Region-wise packing descriptors extended on the basis of the signaling of the attribute values 412 in FIG. 39, that is, attribute values of Region-wise packing descriptors dealing with a case of inclusion of nonconsecutive regions. The data types are similar to the data types in FIG. 40.

As illustrated in the attribute values 415, omaf:@packing_type has the data type omaf:OptionallistofUnsignedByte and indicates the packing type of region-wise packing. This attribute value being 0 indicates packing of a rectangular region.

twoDCoverage is a container element having the data type omaf:twoDCoverageType. twoDCoverage@proj_picture_width has the data type xs:unsignedInt and indicates the width of the projected picture. twoDCoverage@proj_picture_height has the data type xs:unsignedInt and indicates the height of the projected picture. twoDCoverage.twoDCoverageInfo has the data type omaf:twoDCoverageInfoType and indicates an element indicating region information regarding the regions on the projected picture. A plurality of the attribute values can be signaled.

twoDCoverage.twoDCoverageInfo@proj_reg_width has the data type xs:unsignedInt and indicates the width of the region on the projected picture to which the picture referenced by Adaptation Set corresponds. twoDCoverage.twoDCoverageInfo@proj_reg_height has the data type xs:unsignedInt and indicates the height of the region on the projected picture to which the picture referenced by Adaptation Set corresponds.

twoDCoverage.twoDCoverageInfo@proj_reg_top has the data type xs:unsignedInt and indicates the vertical coordinate of the region on the projected picture to which the picture referenced by Adaptation Set corresponds. twoDCoverage.twoDCoverageInfo@proj_reg_left has the data type xs:unsignedInt and indicates the region horizontal coordinate on the projected picture to which the picture referenced by Adaptation Set corresponds.

<Extension of Content Coverage Descriptor>

Additionally, a Content coverage descriptor defined in OMAF and indicating the display region of Adaptation Set on a spherical surface may be extended to enable signaling of the display region on the projected picture.

In other words, the image encoded data for each sub-picture may be managed for each adaptation set, the arrangement information for each picture region may be Region-wise packing descriptor, and the display region information regarding the sub-picture (region-related information related to a region in the entire picture corresponding to the sub-picture referenced by the adaptation set) may be defined in the Coverage Information descriptor in the MPD file, indicating the display region of Adaptation Set on the spherical surface.

Attribute values 416 in FIG. 43 and attribute values 417 in FIG. 44 represent examples of attribute values of extended Content coverage descriptors. In a case where the Content coverage descriptors are extended, the 2D_coverage_flag attribute is used to switch between signaling of a spherical surface region and signaling of a display region on the projected picture similarly to the case of extending the Content coverage descriptors in the ISOBMFF file described above.

As illustrated in the attribute values 416, cc is a container element having an omaf:CCType. cc@2D_coverage_flag is flag information having a data type xs:boolean and indicating whether the display region is defined on the spherical surface or the projected picture. This attribute value being 0 indicates definition on the spherical surface, and this value being 1 indicates definition on the projected picture.

cc.sphericalCoverage is a container element for spherical-surface display region information having a data type omaf:sphericalCoverageType. This element is present only when cc@2D_coverage_flag=0. cc.sphericalCoverage @shape_type has a data type xs:unsignedByte and indicates the shape of a spherical surface region. This attribute value being 0 indicates that the region is enclosed by four great circles. Additionally, this attribute value being 1 indicates that the region is enclosed by two azimuth circles and two elevation angles.

cc.sphericalCoverage @view_idc_presence_flag is flag information having the data type xs:boolean and indicating whether or not a view_idc attribute is present. This attribute value being 0 indicates that the view_idc attribute is not present, and this value being 1 indicates that the view_idc attribute is present.

cc.sphericalCoverage @default_view_idc has a data type omaf:ViewType, and indicates a view common to all the regions. For example, this attribute value being 0 indicates that all the regions included in the sub-picture have a view type (view_idc) mono view. Additionally, this attribute value being 1 indicates that all the regions included in the sub-picture have a view type (view_idc) left view. In addition, this attribute value being 2 indicates that all the regions included in the sub-picture have a view type (view_idc) right view. Additionally, this attribute value being 3 indicates that all the regions included in the sub-picture have a view type (view_idc) stereo view. The attribute value is inevitably present when cc@view_idc_presence_flag=0. Additionally, this attribute is inhibited from being present when cc@view_idc_presence_flag=1.

cc.sphericalCoverage.coverageInfo is an element having a data type omaf:coverageInfoType and indicating the spherical-surface region information. A plurality of the elements can be signaled.

cc.sphericalCoverage.coverageInfo@view_idc has the data type omaf:ViewType, and indicates a view for each region. For example, this attribute value being 0 indicates that the region to which the attribute value corresponds has the view type (view_idc) mono view. Additionally, this attribute value being 1 indicates that the region to which the attribute value corresponds has the view type (view_idc) left view. In addition, this attribute value being 2 indicates that the region to which the attribute value corresponds has the view type (view_idc) right view. Additionally, this attribute value being 3 indicates that the region to which the attribute value corresponds has the view type (view_idc) stereo view. The attribute value is inhibited from being present when cc@view_idc_presence_flag=0. This attribute is inevitably present when cc@view_idc_presence_flag=1.

cc.sphericalCoverage.coverageInfo@center_azimuth has a data type omaf:Range1 and indicates the azimuth of a spherical-surface display region center. cc.SpericalCoverage.coverageInfo@center_elavation has a data type omaf:Range2 and indicates the elevation of the spherical-surface display region center. cc.SpericalCoverage.coverageInfo@center_tilt has the data type omaf:Range1 and indicates the tilt angle of the spherical-surface display region center. cc.SpericalCoverage.coverageInfo@azimuth_range has a data type omaf:HRange and indicates the azimuth range of the spherical-surface display region center. cc.SpericalCoverage.coverageInfo@elevation_range has a data type omaf:VRange and indicates the elevation range of the spherical-surface display region center.

cc.twoDCoverage is a container element for display region information regarding the display region on the projected picture, having a data type omaf:twoDCoverageType. The container element is present only when cc@2D_coverage_flag=1.

cc.twoDCoverage@proj_picture_width has the data type xs:unsignedInt and indicates the width of the projected picture. cc.twoDCoverage@proj_picture_height has the data type xs:unsignedInt and indicates the height of the projected picture. cc.twoDCoverage.twoDCoverageInfo is an element having a data type omaf:twoDCoverageInfoType and indicating region information regarding the regions on the projected picture. A plurality of the elements can be signaled.

cc.twoDCoverage.twoDCoverageInfo@proj_reg_width has the data type xs:unsignedInt and indicates the width of a region on the projected picture to which the picture referenced by Adaptation Set corresponds.

cc.twoDCoverage.twoDCoverageInfo@proj_reg_height has the data type xs:unsignedInt and indicates the height of a region on the projected picture to which the picture referenced by Adaptation Set corresponds.

cc.twoDCoverage.twoDCoverageInfo@proj_reg_top has the data type xs:unsignedInt and indicates the vertical coordinate of the region on the projected picture to which the picture referenced by Adaptation Set corresponds.

cc.twoDCoverage.twoDCoverageInfo@proj_reg_left has the data type xs:unsignedInt and indicates the region horizontal coordinate on the projected picture to which the picture referenced by Adaptation Set corresponds.

A data type 418 in FIG. 45, a data type 419 in FIG. 46, and a data type 420 in FIG. 47 are examples of definitions of the data types of the extended Content coverage descriptors.

<Signaling in Case where Sub-Picture Division Method Varies Dynamically>

Note that, in a case where the display region in the projected picture varies dynamically within the stream, in addition to the above-described signaling, an additional flag may be signaled at the 2D coverage information descriptors, the region-wise packing descriptors, and the Content coverage descriptors to indicate that, within the stream, the display region varies dynamically.

4. Third Embodiment

<Signaling of Stereo Information>

As described above in <Identification of Stereo Information> in <1. Signaling of Information regarding sub-picture>, in a case where the entire picture of a stereo omnidirectional video is divided into sub-pictures, the stereo information regarding the entire picture is signaled in Stereo Video Box signaled below Sub Picture Composition Box, and stereo information regarding the sub-pictures is signaled in Stereo Video Box below Scheme Information Box in Sample Entry.

In a case where the entire picture is a stereo image, for example, the following three patterns are variations of generatable sub-pictures.

Figure 48:
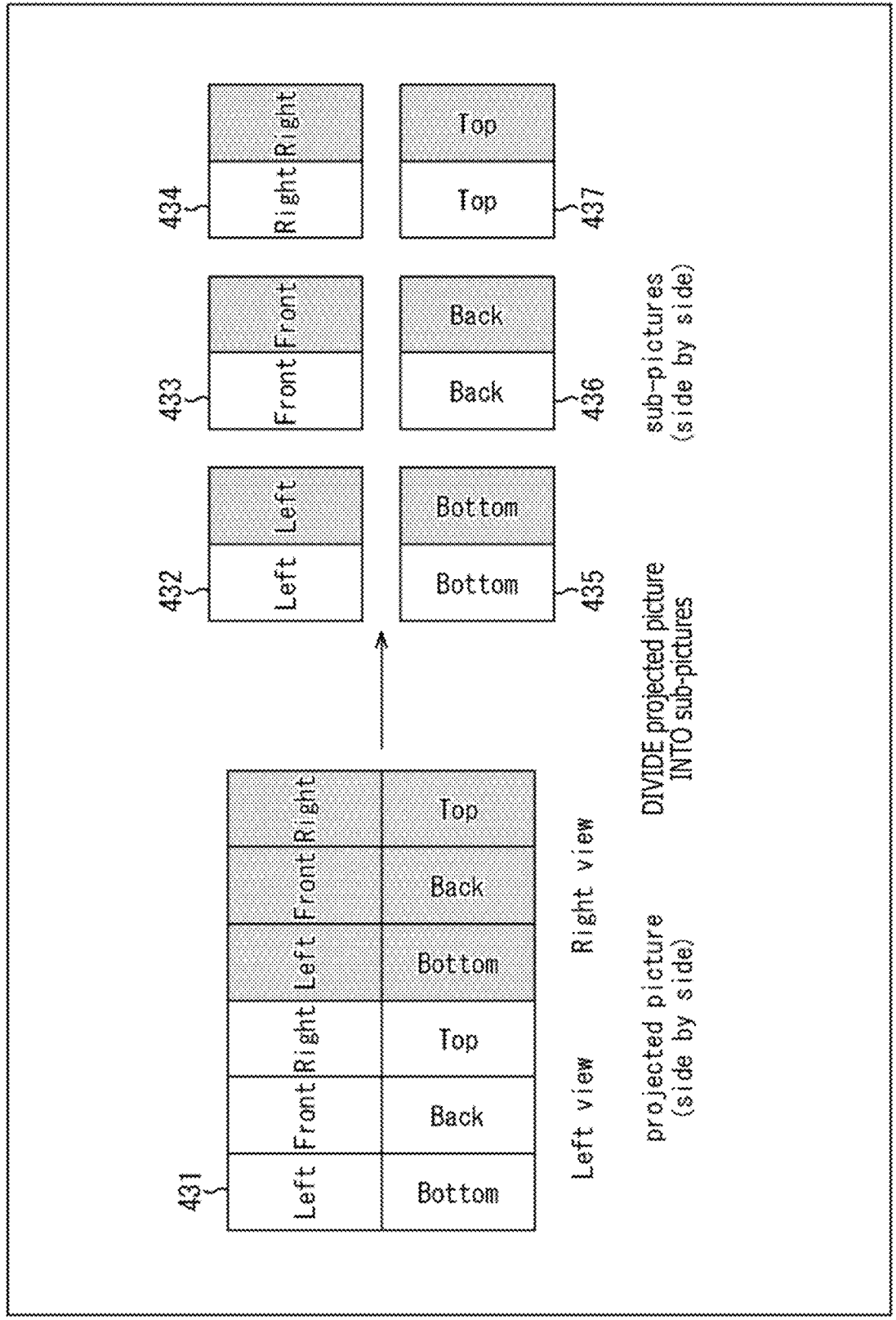
FIG. 48 is a diagram illustrating an example of division into sub-pictures.

FIG. 48 is a diagram illustrating an example of an aspect of a first pattern of division into sub-pictures. In this case, a projected picture (entire picture) 431 is divided into sub-pictures 432 to 437. The projected picture 431 includes a side-by-side stereo image. Each of the sub-pictures 432 to 437 includes a Left view and a Right view that are identical display regions on the projected picture 431 and corresponds to frame packing arrangement such as top & bottom or side by side which can be signaled in Stereo Video Box.

Figure 49:
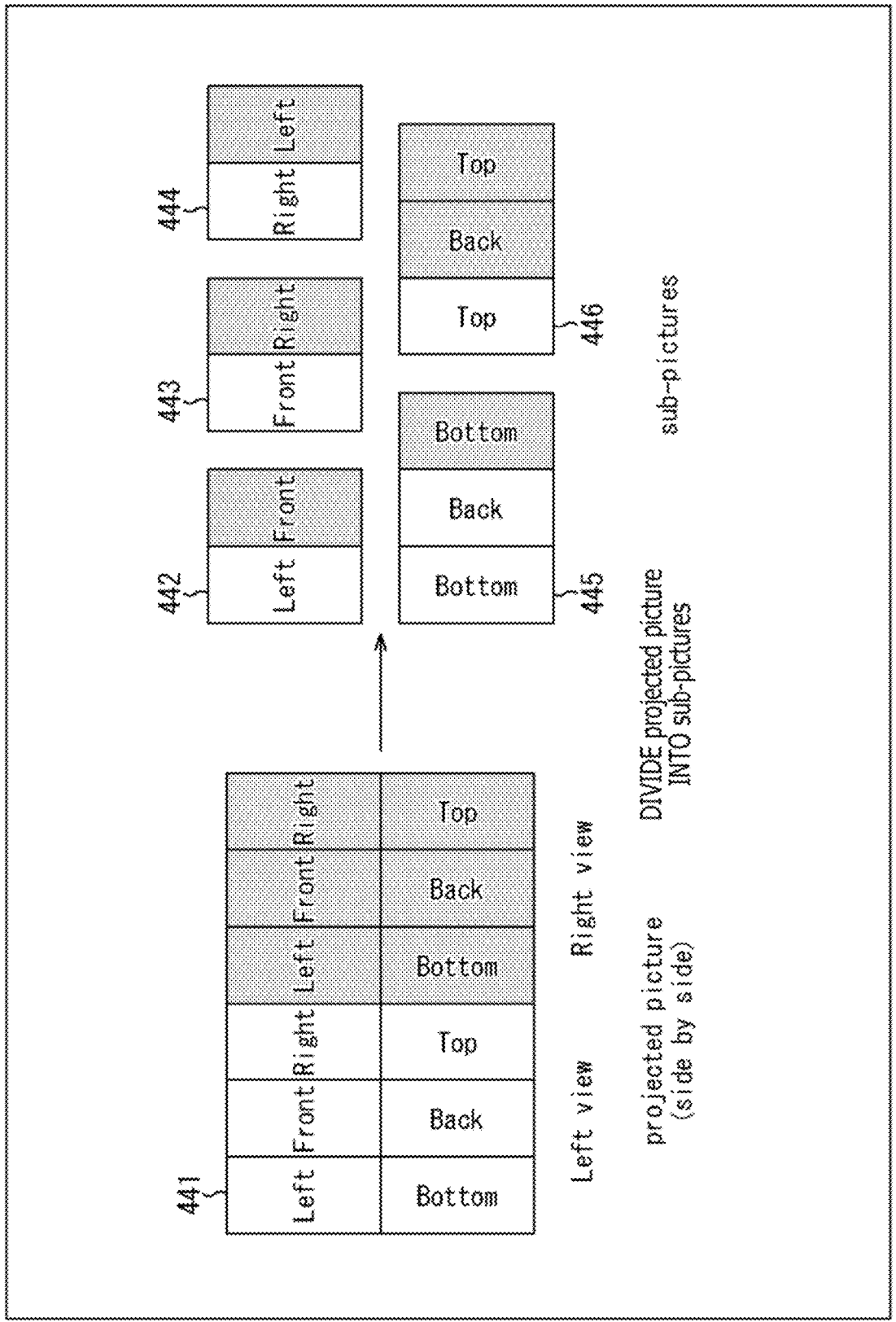
FIG. 49 is a diagram illustrating an example of division into sub-pictures.

FIG. 49 is a diagram illustrating an example of an aspect of a second pattern of division into sub-pictures. In this case, a projected picture (entire picture) 441 is divided into sub-pictures 442 to 446. The projected picture 441 includes a side-by-side stereo image. Each of the sub-pictures 442 to 446 includes a Left view and a Right view but the display regions of the views do not match the display regions on the projected picture 441. Each of the sub-pictures does not correspond to frame packing arrangement such as top & bottom or side by side which can be signaled in Stereo Video Box.

Figure 50:
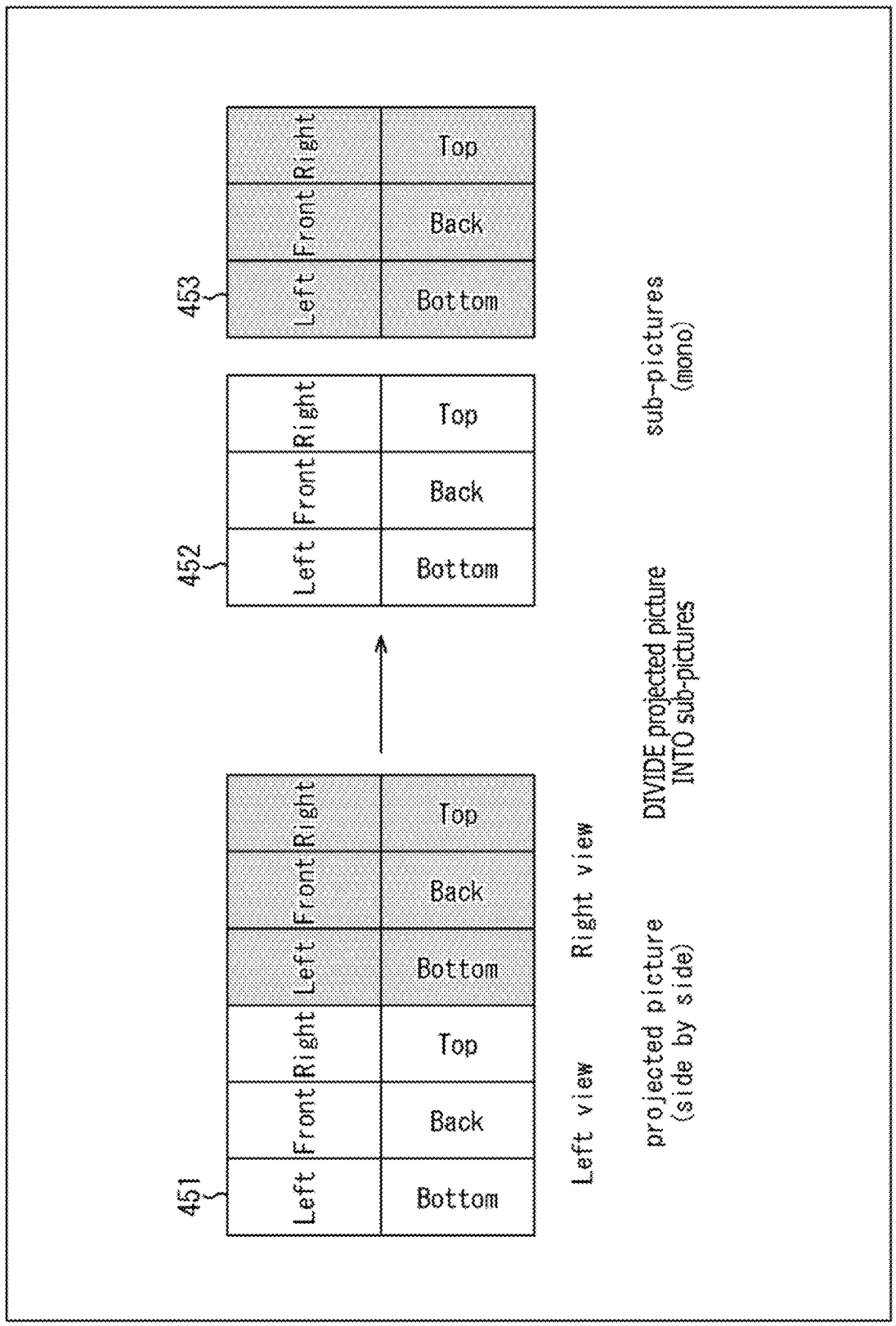
FIG. 50 is a diagram illustrating an example of division into sub-pictures.

FIG. 50 is a diagram illustrating an example of an aspect of a third pattern of division into sub-pictures. In this case, a projected picture (entire picture) 451 is divided into a sub-picture 452 and a sub-picture 453. The projected picture 451 includes a side-by-side stereo image. The sub-picture 452 is a mono picture including only a Left view. The sub-picture 453 is a mono picture including only a Right view.

In the first pattern, Stereo Video Box is signaled in Sample Entry/rinf/schi of the sub-picture track to signal appropriate frame packing arrangement information. For example, in FIG. 48, side by side is signaled. Note that, instead of the frame packing arrangement information regarding the sub-picture, the frame packing arrangement information regarding the entire picture may be signaled.

In the second pattern, Stereo Video Box is not signaled in Sample Entry/rinf/schi. Thus, the client may fail to identify whether the sub-picture is a mono picture or the sub-picture includes a Left view and a Right view but the frame packing arrangement information such as top & bottom or side by side is not applied to the sub-picture.

In the third pattern, Stereo Video Box is not signaled in Sample Entry/rinf/schi. Accordingly, the client may fail to identify whether the undivided entire picture is a mono picture or a stereo image. Whether or not upscaling is required during rendering varies depending on whether the undivided entire picture is a mono picture or a stereo image, and thus, the incapability of identification may preclude the client from performing appropriate rendering.

For example, as illustrated in FIG. 50, for a sub-picture for which the entire picture is a side-by-side stereo image and which includes only a Left view, rendering requires double upscaling in the horizontal direction. In contrast, in a case where the entire picture is a mono picture, this processing is unnecessary.

<Signaling, in ISOBMFF, of Stereo Information Regarding Entire Picture to be Divided into Sub-Pictures>

Thus, stereo information including information related to stereo display of the entire picture to be divided into sub-pictures may be performed in an ISOBMFF file corresponding to a segment file.

In other words, image data for each of a plurality of sub-pictures into which the entire picture is divided and which is then encoded is stored in one track, and a file may be generated that includes stereo information including information related to the stereo display of the entire picture.

For example, in the file generating apparatus 100 used as an information processing apparatus, the segment file generating section 123 may function as a file generating section storing, in each track, image data regarding one of the plurality of sub-pictures into which the entire picture is divided and which is then encoded, the file generating section generating a file including stereo information including information related to the stereo display of the entire picture. In other words, the information processing apparatus (for example, the file generating apparatus 100) may include a file generating section (for example, the segment file generating section 123).

This allows the client to more easily select a stream on the basis of the information as described above.

Additionally, the above-described picture (entire picture) may be all or a part of an omnidirectional video (projected plane image resulting from projection and mapping of an image extending over 360 degrees around in the horizontal direction and over 180 degrees around in the vertical direction). In other words, in a case where the file generating apparatus 100 uses all or a part of the projected plane image as an entire picture and divides the entire picture into sub-pictures, the present technique can be applied as described above.

This allows the client to more easily select a stream on the basis of the information as described above, even in a case where an omnidirectional video is distributed.

Note that the stereo information regarding the entire picture may be included in the ISOBMFF file as information for each sub-picture. This allows the client to easily learn the stereo information regarding the entire picture (for example, whether or not the image is an entire picture stereo image and of what type the stereo image is) simply by referencing information regarding the sub-picture track.

<Procedure of Upload Processing>

Figure 51:
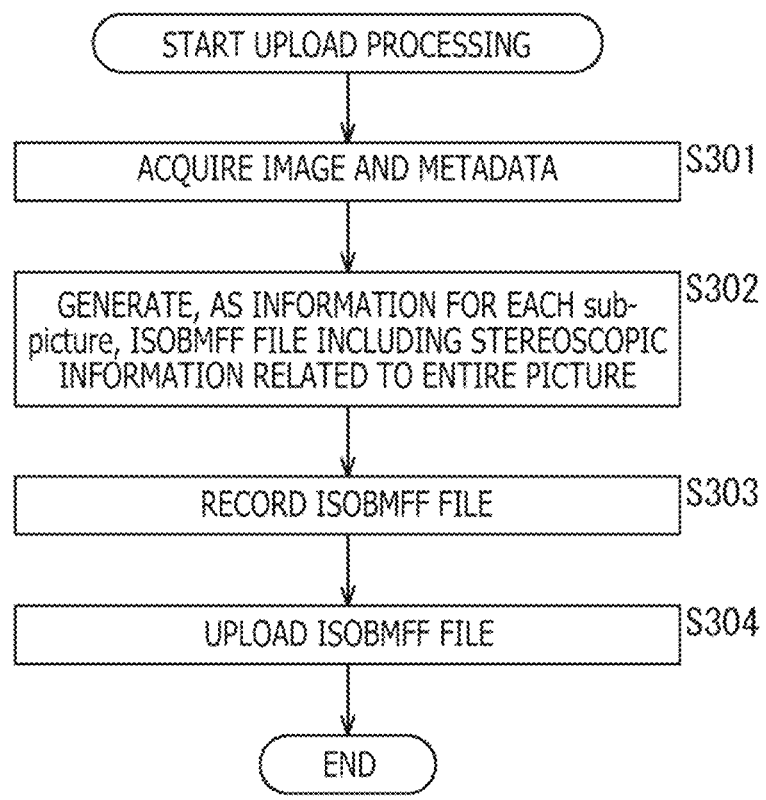
FIG. 51 is a flowchart illustrating an example of procedure of upload processing.

An example of procedure of upload processing executed by the file generating apparatus 100 in FIG. 11 in the above-described case will be described with reference to a flowchart in FIG. 51.

When upload processing is started, the data input section 111 of the file generating apparatus 100 acquires an image and metadata in step S301.

In step S302, the segment file generating section 123 generates an ISOBMFF file including stereo information regarding the entire picture (projected picture) as information for each sub-picture.

In step S303, the ISOBMFF file generated by the processing in step S302 is recorded in the recording section 114.

In step S304, the upload section 115 reads, from the recording section 114, the ISOBMFF file recorded in step S303, and uploads the ISOBMFF file to the server.

When the processing in step S304 ends, the upload processing ends.

By executing the upload processing as described above, the file generating apparatus 100 can generate an ISOBMFF file including, as information for each sub-picture, the stereo information regarding the projected picture.

Accordingly, on the basis of the information, the client can more easily select and reproduce an appropriate stream corresponding to the capability of the client.

<Utilization of Stereo Information regarding Entire Picture to Be Divided into sub-pictures which Information Is Signaled in ISOBMFF>

Additionally, a stream may be selected and reproduced utilizing the stereo information regarding the entire picture to be divided into sub-pictures, which information is signaled in the ISOBMFF file.

In other words, image data for each of a plurality of sub-pictures into which the entire picture is divided and which is then encoded may be stored in one track, a file may be acquired that includes stereo information including information related to the stereo display of the entire picture, and on the basis of the stereo information included in the file acquired, a stream of image encoded data may be selected.

For example, in the client apparatus 200 corresponding to the information processing apparatus, the segment file acquiring section 214 functions as a file acquiring section storing, in each track, image data for each of a plurality of sub-pictures into which the entire picture is divided and which is then encoded, the file acquiring section acquiring a file including stereo information including information related to the stereo display of the entire picture, and the data analysis and decoding section 216 may function as an image processing section selecting a stream of image encoded data on the basis of the stereo information included in the file acquired by the file acquiring section. In other words, the information processing apparatus (for example, the client apparatus 200) may include a file acquiring section (for example, the segment file acquiring section 214) and an image processing section (for example, the data analysis and decoding section 216).

This allows the client apparatus 200 to more easily select a stream.

Note that the above-described picture (entire picture) may be all or a part of an omnidirectional video (projected plane image resulting from projection and mapping of an image extending over 360 degrees around in the horizontal direction and over 180 degrees around in the vertical direction). In other words, in a case where the client apparatus 200 uses all or a part of the projected plane image as an entire picture, divides the entire picture into sub-pictures to acquire a stream of sub-pictures, and reproduces the stream, the present technique can be applied as described above.

Additionally, the stereo information regarding the entire picture may be included in the ISOBMFF file as information for each sub-picture. This allows the client apparatus 200 to easily learn the stereo information regarding the entire picture (for example, whether or not the image is an entire picture stereo image and of what type the stereo image is) simply by referencing information regarding the sub-picture track.

<Procedure of Content Reproduction Processing>

Figure 52:
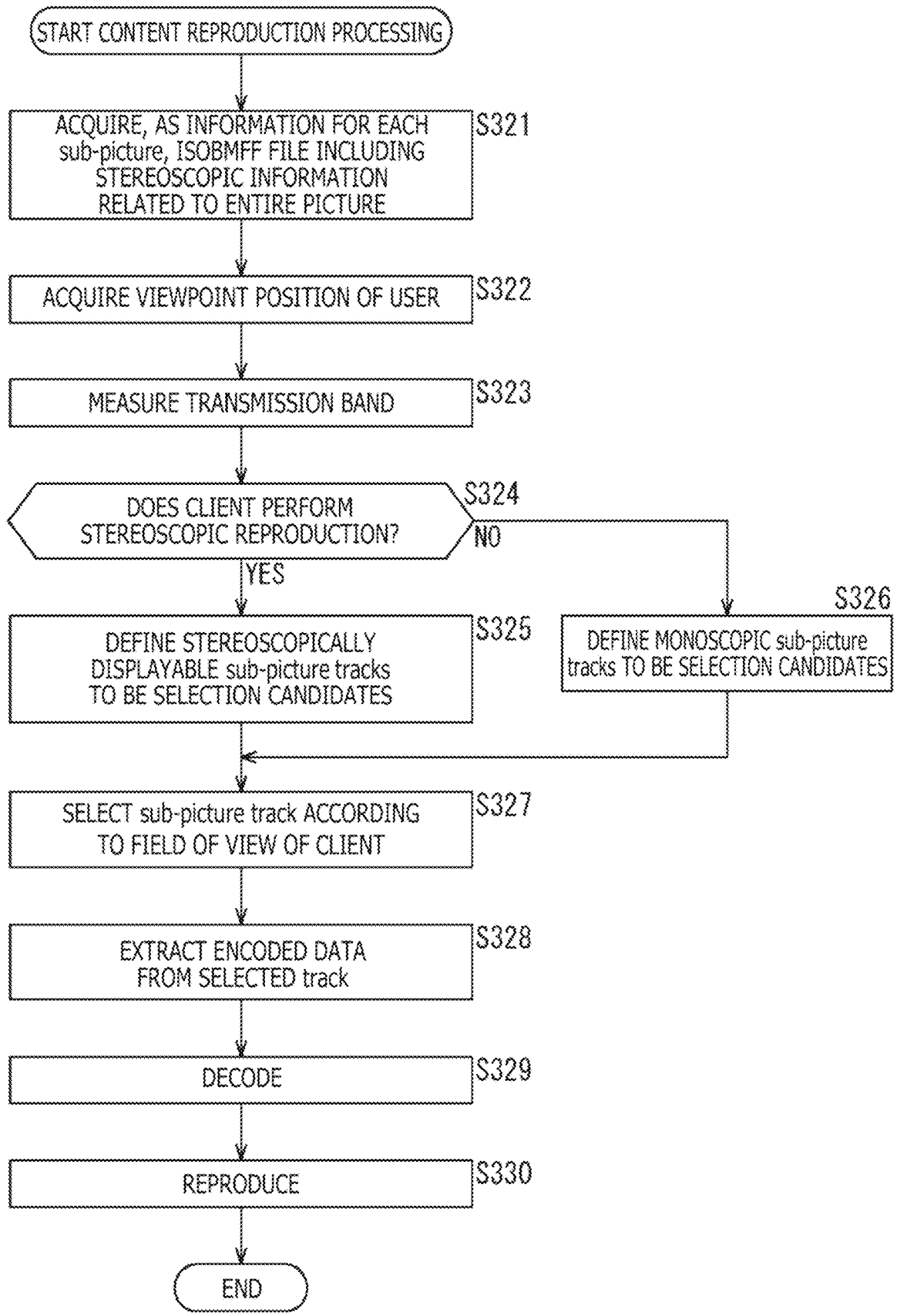
FIG. 52 is a flowchart illustrating an example of procedure of content reproduction processing.

An example of procedure of content reproduction processing executed by the client apparatus 200 in the above-described case will be described with reference to a flowchart in FIG. 52.

When content reproduction processing is started, the segment file acquiring section 214 of the client apparatus 200 acquires an ISOBMFF file including stereo information regarding the entire picture (projected picture) as information for each sub-picture in step S321.

In step S322, the display control section 215 acquires a measurement result for the viewpoint position (and line-of-sight direction) of the user.

In step S323, the measurement section 211 measures the transmission bandwidth of the network between the server and the client apparatus 200.

In step S324, the segment file processing section 221 determines whether or not the client apparatus 200 performs stereo reproduction (or whether or not the client apparatus 200 has the capability of performing stereo reproduction). In a case where the client apparatus 200 is determined to perform stereo reproduction (or to have the capability of performing stereo reproduction), the processing proceeds to step S325.

In step S325, the segment file processing section 221 sets stereo-displayable sub-picture tracks as selection candidates. At this time, by referencing the stereo information regarding the entire picture included in the ISOBMFF file acquired in step S321, the segment file processing section 221 can include, in the selection candidates, stereo-displayable sub-picture tracks to which the frame packing arrangement in the second pattern is not applied (for example, the sub-picture 445 and the sub-picture 446 in FIG. 49). When the processing in step S325 ends, the processing proceeds to step S327.

Additionally, in step S324, in a case where the client apparatus 200 is determined not to perform stereo reproduction (or determined not to have the capability of performing stereo reproduction), the processing proceeds to step S326.

In step S326, the segment file processing section 221 sets sub-picture tracks including mono pictures as selection candidates on the basis of, for example, the stereo information regarding the entire picture included in the ISOBMFF file acquired in step S321. At this time, by referencing the stereo information regarding the entire picture included in the ISOBMFF file acquired in step S321, the segment file processing section 221 can learn that the sub-picture track in the third pattern (for example, the sub-picture 452 or the sub-picture 453 in FIG. 50) requires double upscaling in the horizontal direction during rendering. When the processing in step S326 ends, the processing proceeds to step S327.

In step S327, the segment file processing section 221 selects a sub-picture track corresponding to the field of view of the user of the client apparatus 200 from the candidates set in step S325 or step S326.

In step S328, the segment file processing section 221 extracts the encoded data of the stream in the sub-picture tracks selected in step S327, from the ISOBMFF file acquired in step S321.

In step S329, the decode section 222 decodes encoded data of the stream extracted in step S328.

In step S330, the display information generating section 223 reproduces the stream (content) resulting from decoding in step S329. More specifically, the display information generating section 223 generates data of a displayed image from the stream and feeds the data to the display section 217 to cause the display section 217 to display the display image.

When the processing in step S330 ends, the content reproduction processing ends.

By executing the content reproduction processing as described above, the client apparatus 200 can more easily select a stream utilizing the stereo information regarding the entire picture to be divided into sub-pictures, the stereo information being included in the ISOBMFF file. For example, on the basis of the information, the client apparatus 200 can more easily select and reproduce the appropriate stream corresponding to, for example, the capability of the client apparatus 200.

<Signaling, in Sample Entry, of Stereo Information Regarding Entire Picture>

For example, in a case where the undivided entire picture is a stereo image, the segment file generating section 123 of the file generating apparatus 100 may signal the stereo information regarding the entire picture in Sample Entry in the sub-picture track.

For example, the stereo information regarding the entire picture may be stored in Scheme Information Box below the Sample Entry or in Box in a layer below the Scheme Information Box in the ISOBMFF file.

<Original Stereo Video Box>

For example, to signal the stereo information regarding the undivided entire picture, the segment file generating section 123 of the file generating apparatus 100 may newly define Original Stereo Video Box and signal the Box below Scheme Information Box (schi) of Sample Entry in the sub-picture track. In other words, the Original Stereo Video Box may store the stereo information regarding the undivided entire picture.

Note that the location of the Original Stereo Video Box is optional and is not limited to Scheme Information Box described above. Additionally, information signaled in Original Stereo Video Box is similar to the information signaled in Stereo Video Box.

Syntax 461 in FIG. 53 represents an example of syntax of the Original Stereo Video Box. As illustrated in syntax 461, fields such as single_view_allowed, stereo_scheme, length, and stereo_indication_type are defined in Original Stereo Video Box.

Semantics 462 in FIG. 54 represents an example of semantics of the fields defined in the Original Stereo Video Box. As illustrated in semantics 462, single_view_allowed is information indicating the type of a view allowed. For example, this field having a value of 0 indicates that the content is intended to be displayed only on a stereoscopic-enabled display. Additionally, this field having a value of 1 indicates that the content is allowed to display a right view on a monoscopic display. In addition, this field having a value of 2 indicates that the content is allowed to display a left view on the monoscopic display.

stereo_scheme is information related to the frame packing method. For example, this field having a value of 1 indicates that the frame packing method complies with Frame packing arrangement SEI in ISO/IEC 14496-10. Additionally, this field having a value of 2 indicates that the frame packing method complies with Annex. L of ISO/IEC 13818-2. In addition, this field having a value of 3 indicates that the frame packing method complies with frame/service compatible and 2D/3D Mixed service in ISO/IEC 23000-11.

length indicates the byte length of stereo_indication_type. Additionally, stereo_indication_type indicates a frame packing method complying with stereo_scheme.

By referencing Original Stereo Video Box and 2D Coverage Information Box, the segment file processing section 221 of the client apparatus 200 can acquire the stereo information regarding the entire picture. Then, on the basis of this information, the segment file processing section 221 can easily identify, in a case where Stereo Video Box is not signaled in Sample Entry in the sub-picture track, whether the sub-picture is mono or the sub-picture includes a Left view and a Right view but the frame packing arrangement signaled in Stereo Video Box is not applied to the sub-picture, without parsing Sub Picture Composition Box. In other words, as is the case with a track that is not a sub-picture track, the stereo information can be identified only from the information stored in Sample Entry.

In other words, the client apparatus 200 can independently select and reproduce a sub-picture track without parsing Sub Picture Composition Box.

<Signaling of Display Size>

Furthermore, a display size upscaled on the basis of the frame packing arrangement for the entire picture may be signaled at the width and height of Track Header of the sub-picture track storing a mono sub-picture (sub-picture that is a mono picture) resulting from division of the entire picture that is stereo.

In other words, the ISOBMFF file may include information related to the display size of the sub-picture.

An example of this aspect is illustrated in FIG. 55. As illustrated in FIG. 55, a sub-picture 471 and a sub-picture 472 generated from the entire picture of a stereo image include images in different regions downscaled in the horizontal direction. Accordingly, upscaling in the horizontal direction is required at the time of display (rendering). Thus, the display size of an image 473 for the time of display is signaled as the width and height of Track Header. This allows the client apparatus 200 to appropriately render the mono sub-picture.

Note that, instead of the signaling in the width and height of Track Header, signaling of Pixel Aspect Ratio Box (pasp) signaling pixel aspect ratio information for the time of display, defined in ISOBMFF, may be signaled in Visual Sample Entry. This also allows production of effects similar to the effects of the signaling at the width and height of Track Header described above.

Syntax 481 in FIG. 56 represents an example of syntax of Pixel Aspect Ratio Box. As illustrated in the syntax 481, fields, for example, hSpacing and vSpacing are defined in Pixel Aspect Ratio Box.

Figure 57:
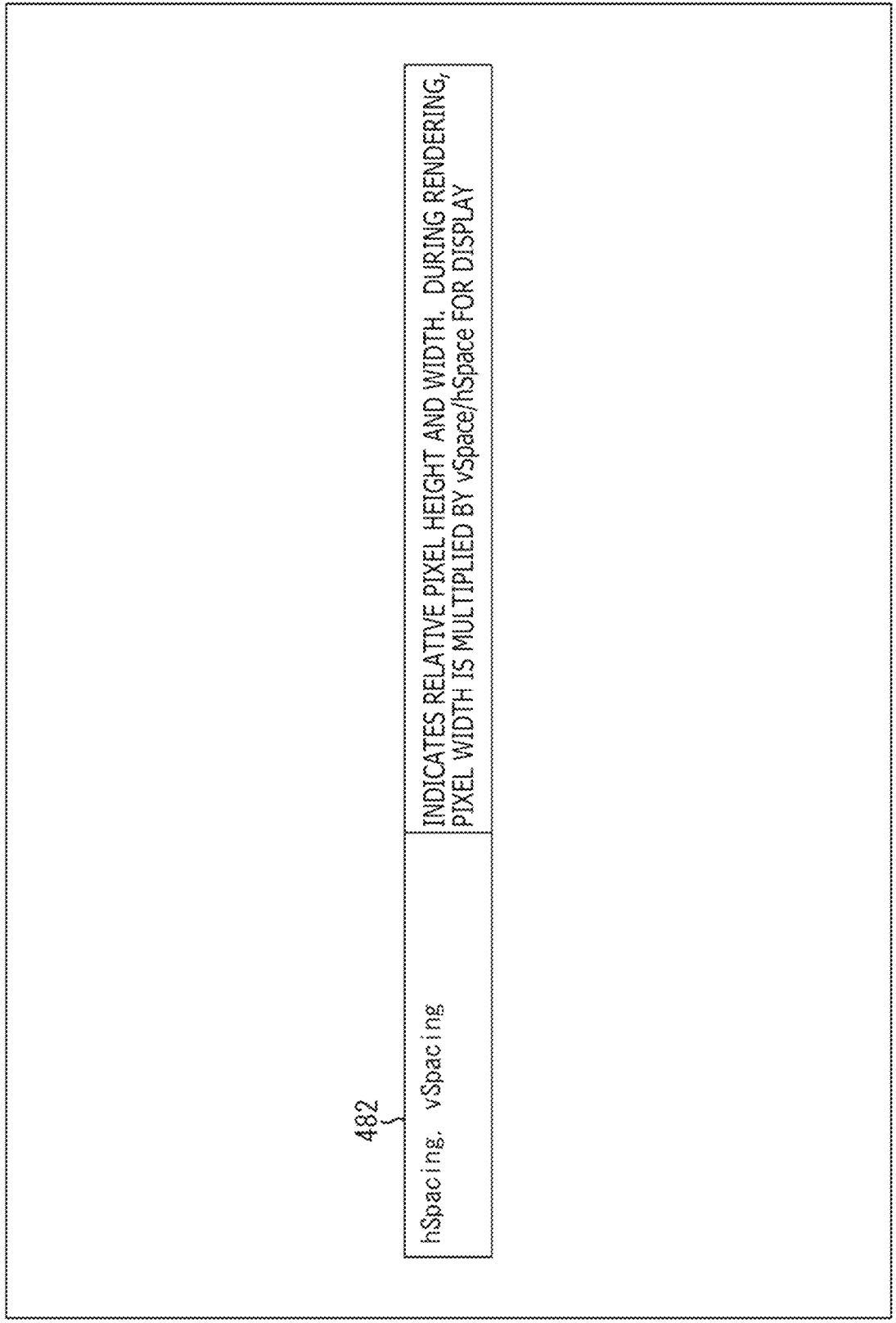
FIG. 57 is a diagram illustrating an example of semantics of fields defined in Pixel Aspect Ratio Box.

Semantics 482 in FIG. 57 represents an example of semantics of the fields defined in Pixel Aspect Ratio Box. As illustrated in the semantics 482, hSpacing and vSpacing are information indicating a relative pixel height and a relative pixel width. During rendering, on the basis of this information, the pixel width is multiplied by vSpace/hSpace for display.

Figure 58:
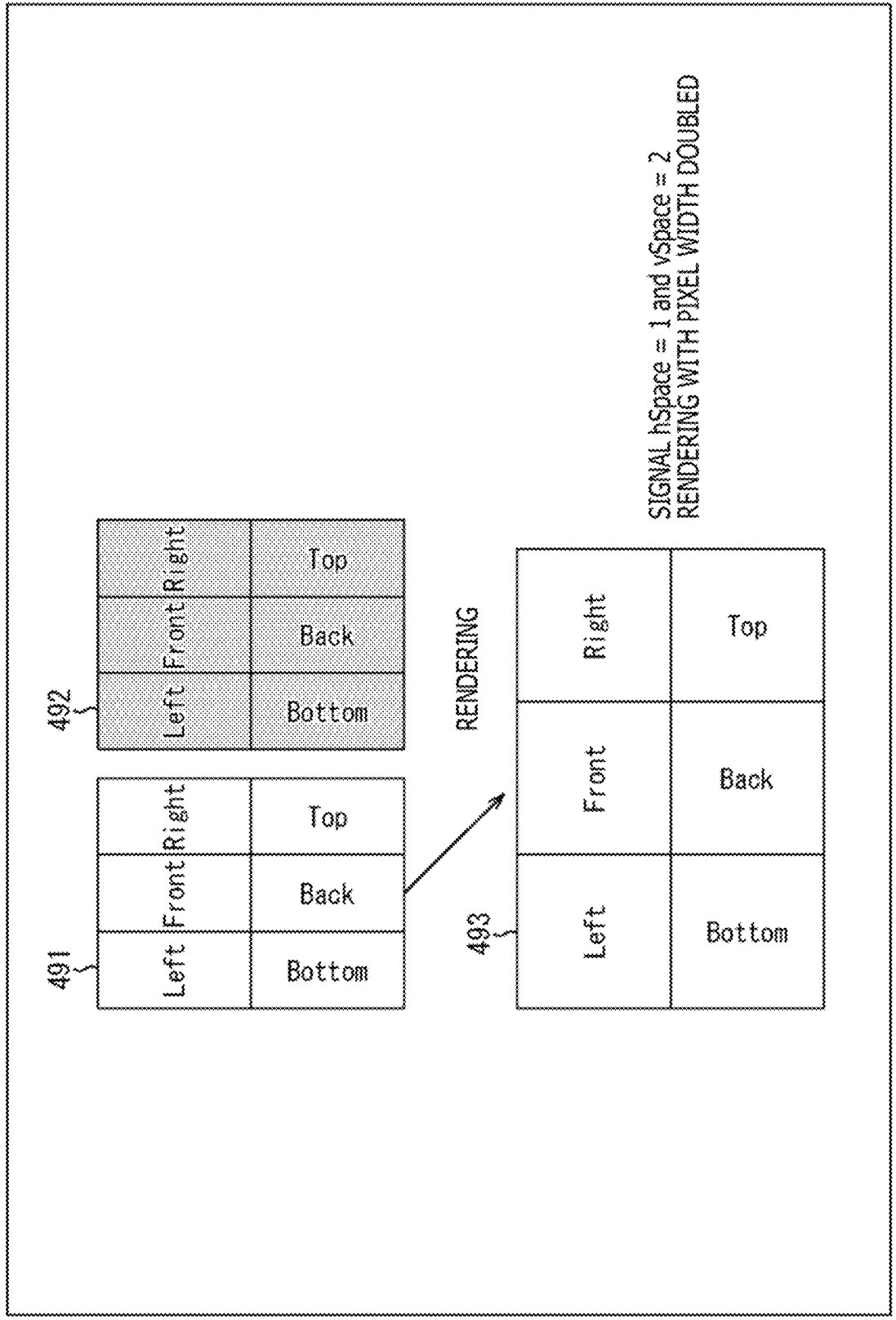
FIG. 58 is a diagram illustrating an example of signaling of a pixel aspect ratio for a time of display.

An example of this aspect is illustrated in FIG. 58. A sub-picture 491 and a sub-picture 492 illustrated in FIG. 58 are sub-pictures generated from the entire picture of a stereo image and each includes images in different regions downscaled in the horizontal direction. Thus, by signaling hSpace=1 and vSpace=2, the client apparatus 200 can perform, when, for example, displaying (rendering) the sub-picture 491, rendering with the pixel width doubled to display an image in the appropriate aspect ratio like the image 493. In other words, the client apparatus 200 can appropriately render the mono sub-picture (sub-picture including a mono image).

<Original Scheme Information Box>

Additionally, Original Scheme Information Box may be newly defined below Restricted Scheme Information Box (rinf) of Sample Entry in the sub-picture track, and the stereo information regarding the undivided entire picture may be signaled in the Box. Note that a location where Original Scheme Information Box is defined is optional and is not limited to rinf described above.

Syntax 501 in FIG. 59 represents an example of syntax of Original Scheme Information Box in the above-described case. As illustrated in the syntax 501, for example, scheme_specific_data is defined in Original Scheme Information Box.

The information regarding the entire picture not divided into sub-pictures yet is signaled in the scheme_specific_data. For example, in a case where the entire picture is stereo, Stereo Video Box including the stereo information regarding the entire picture may be signaled. This allows the client apparatus 200 to independently select and reproduce a sub-picture track without parsing Sub Picture Composition Box.

Note that not only Stereo Video Box but also post-processing information related to the entire picture may be signaled in the scheme_specific_data (for example, Region Wise Packing Box).

<Additional Information Facilitating Selection of Sub-Picture Track>

Furthermore, 2D Coverage Information Box may be extended to signal stereo related information facilitating track selection.

For example, stereo_presentation_suitable_flag may be added to 2D Coverage Information Box to signal whether or not the sub-picture track is stereo-displayable. By referencing this information, the client apparatus 200 can identify whether or not stereo display is enabled without executing processing of identifying whether or not stereo display is enabled on the basis of the stereo information regarding the entire picture described above in the third embodiment and the region information regarding the regions on the projected picture signaled in 2D Coverage Information Box defined in the first embodiment.

In other words, the ISOBMFF file may further include sub-stereo information including information related to the stereo display of each sub-picture.

Syntax 502 in FIG. 60 represents an example of 2D Coverage Information Box in the above-described case. As illustrated in syntax 502, in this case, stereo_presentation_suitable is further defined (stereo_presentation_suitable is added to the defined field).

Semantics 503 in FIG. 61 represents an example of semantics of the added field. As illustrated in the semantics 503, stereo_presentation_suitable is information related to the stereo display of the picture in the track. This field having a value of 0 indicates that the picture in the track is mono or the picture includes an L view and an R view but is not stereo-displayable. This field having a value of 1 indicates that some of the regions of the picture in the track are stereo-displayable. This field having a value of 2 indicates that all the regions of the picture in the track are stereo-displayable.

Figure 62:
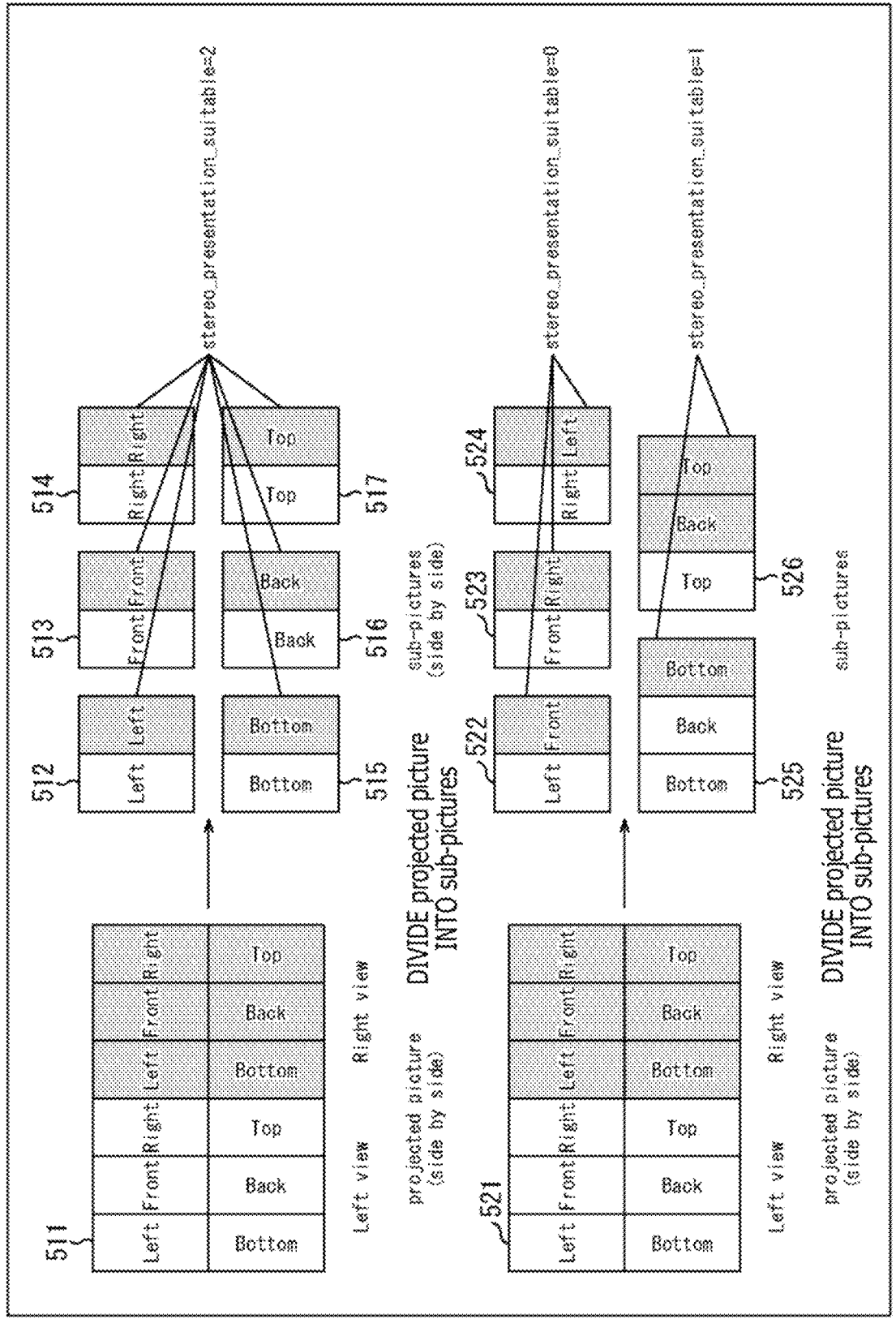
FIG. 62 is a diagram illustrating signaling of stereo_presentation_suitable.

FIG. 62 is a diagram illustrating an example of signaling of stereo_presentation_suitable. For example, as illustrated on the upper side of FIG. 62, sub-pictures 512 to 517 resulting from division of an entire picture (projected picture) 511 including a side-by-side stereo image each include a Left view and a Right view and are stereo-displayable. Accordingly, stereo_presentation_suitable=2 is set for the sub-pictures.

In contrast, as illustrated on the lower side of FIG. 62, sub-pictures 522 to 526 resulting from division of an entire picture (projected picture) 521 including a side-by-side stereo image each include a Left view and a Right view. However, the sub-pictures 522 to 524 are not stereo-displayable. Accordingly, stereo_presentation_suitable=0 is set for the sub-pictures.

Additionally, for a sub-picture 525 and a sub-picture 526, some of the regions of the sub-picture is stereo-displayable. Accordingly, stereo_presentation_suitable=1 is set for the sub-pictures.

Note that, with a separate BOX (dedicated Box storing information), the information indicating whether or not the picture is stereo-displayable, for example, Track Stereo Video Box newly defined, the information may be signaled below schi of the sub-picture track.

Syntax 531 in FIG. 63 represents an example of syntax of Track Stereo Video Box in the above-described case.

Additionally, Region Wise Packing Box signaled below Projected Omnidirectional Video Box of Sample Entry in the sub-picture track or the RectProjected Region structure described above in the first embodiment may be extended to signal stereo_presentation_suitable_flag. Additionally, stereo_presentation_suitable_flag may be signaled in any other Box.

Furthermore, in a case where stereo display is disabled, a track_not_intended_for_presentation_alone flag of Track Header Box may be used to signal that independent reproduction of the sub-picture is not desirable.

Note that the above-described various types of information are applicable in a case where the picture stored in the track is not a sub-picture.

<Signaling of View Information>

Additionally, 2D Coverage Information Box may be extended to additionally signal view information for the display region of the sub-picture on the projected picture. By referencing this information, the client apparatus 200 can easily identify whether the sub-picture is a mono image or the sub-picture includes an L view and an R view without executing processing of identifying view information for each region from the stereo information regarding the entire picture described above in the third embodiment and the region information regarding the regions on the projected picture signaled in 2D Coverage Information Box defined in the third embodiment.

In other words, the ISOBMFF file may further include view information indicating the view type of the sub-picture.

Syntax 532 in FIG. 64 is a diagram illustrating an example of syntax of 2D Coverage Information Box in the above-described case. As illustrated in the syntax 532, in this case, fields such as view_idc_presence_flag, default_view_idc, and view_idc are additionally defined in 2D Coverage Information Box.

A semantics 533 in FIG. 65 represents an example of semantics of fields additionally defined in the 2D Coverage Information Box. As illustrated in the semantics 533, view_idc_presence_flag indicates whether or not a separate view_idc is present in each region. For example, this field having a value of 0 indicates that no separate view_idc is present in each region. Additionally, this field having a value of 1 indicates that a separate view_idc is present in each region.

In other words, the ISOBMFF file may further include information indicating whether view information is present for each region.

default_view_idc indicates a view common to all the regions. For example, this field having a value of 0 indicates that all the regions in the sub-picture correspond to mono views. Additionally, this field having a value of 1 indicates that all the regions in the sub-picture correspond to left views. In addition, this field having a value of 2 indicates that all the regions in the sub-picture correspond to right views. Additionally, this field having a value of 3 indicates that all the regions in the sub-picture correspond to stereo views.

view_idc indicates a view for each region. For example, this field having a value of 0 indicates that the region corresponds to a mono view. Additionally, this field having a value of 1 indicates that the region corresponds to a left view. In addition, this field having a value of 2 indicates that the region corresponds to a right view. Additionally, this field having a value of 3 indicates that the region corresponds to a stereo view. In addition, in a case where the field is not present, default_view_idc indicates indication of view of each region.

In other words, the view information may be information for each region included in the sub-picture.

FIG. 66 is a diagram illustrating an example of an aspect in which the view_idc is signaled. As illustrated in FIG. 66, in a case where a side-by-side entire picture 541 is divided into sub-pictures such as a sub-picture 542 and a sub-picture 543, view_idc=3 is set for each of the sub-pictures.

In contrast, in a case where the entire picture 541 is divided into sub-pictures such as a sub-picture 544 and a sub-picture 545, view_idc=1 is set for the sub-picture 544, and view_idc=2 is set for the sub-picture 545.

Note that even in a case where the picture stored in the track is not a sub-picture, the above-described types of additional information can be applied.

Similarly, Region Wise Packing Box and the Rect Projected Region structure defined in the first embodiment may be extended to signal view information.

5. Fourth Embodiment

<Signaling, in MPD File, of Stereo Information Regarding Entire Picture to be Divided into Sub-Pictures>

The stereo information regarding the entire picture to be divided into sub-pictures as described above may be signaled in the MPD file. In other words, to enable the client to select and reproduce, according to the capability of the client, for example, Adaptation Set referencing the sub-picture, in the MPD file, the stereo information regarding the entire picture to be divided into sub-pictures may be newly defined and signaled in Adaptation Set.

In other words, a control file may be generated that manages, for each adaptation set, image encoded data for each of a plurality of sub-pictures into which the entire picture is divided and which is then encoded and that includes the stereo information including information related to stereo display of the adaptation set, the control file being used for controlling distribution of the image encoded data.

For example, in the file generating apparatus 100 used as an information processing apparatus, the MPD file generating section 113 may function as a file generating section generating a control file managing, for each adaptation set, the image encoded data for each of the plurality of sub-pictures into which the entire picture is divided and which is then encoded, and including the stereo information including information related to stereo display of the adaptation set, the control file being used for controlling distribution of the image encoded data. In other words, the information processing apparatus (for example, the file generating apparatus 100) may include a file generating section (for example, the MPD file generating section 113).

This allows the client to more easily select a stream on the basis of the information as described above.

Additionally, the above-described picture (entire picture) may be all or a part of an omnidirectional video (projected plane image resulting from projection and mapping of an image extending over 360 degrees around in the horizontal direction and over 180 degrees around in the vertical direction). In other words, in a case where the file generating apparatus 100 uses all or a part of the projected plane image as an entire picture and divides the entire picture into sub-pictures, the present technique can be applied as described above.

This allows the client to more easily select a stream on the basis of the information as described above, even in a case where an omnidirectional video is distributed.

Note that the region-related information (display region information) may be included in the MPD file as information for each sub-picture. This allows the client to easily learn which part of the entire picture corresponds to the sub-picture, simply by referencing information regarding the sub-picture referenced by Adaptation Set.

<Procedure of Upload Processing>

Figure 67:
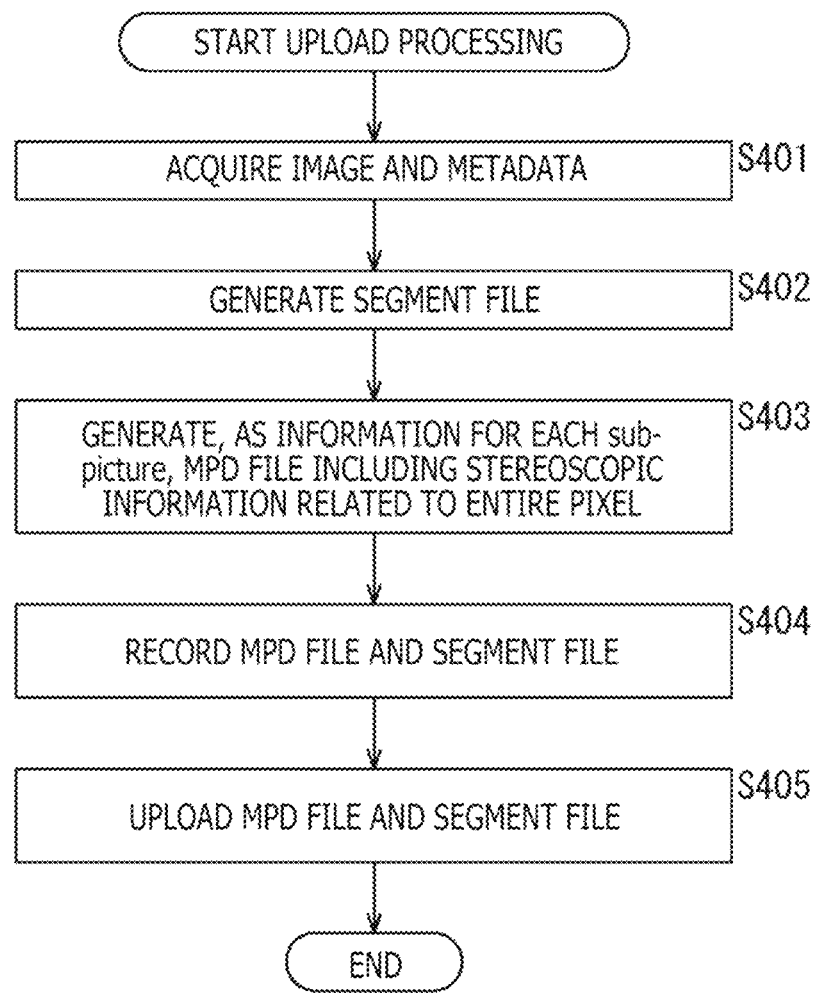
FIG. 67 is a flowchart illustrating an example of procedure of upload processing.

An example of procedure of upload processing executed by the file generating apparatus 100 in FIG. 11 in the above-described case will be described with reference to a flowchart in FIG. 67.

When upload processing is started, the data input section 111 of the file generating apparatus 100 acquires an image and metadata in step S401.

In step S402, the segment file generating section 123 generates a segment file for the image.

In step S403, the MPD file generating section 113 generates, as information for each sub-picture, an MPD file including stereo information regarding the entire picture (projected picture).

In step S404, the segment file generated by the processing in step S402 is recorded in the recording section 114. Additionally, the MPD file generated by the processing in step S403 is recorded in the recording section 114.

In step S405, the upload section 115 reads, from the recording section 114, the segment file recorded in step S404, and uploads the segment file to the server. Additionally, the upload section 115 reads, from the recording section 114, the MPD file recorded in step S404, and uploads the MPD file to the server.

When the processing in step S404 ends, the upload processing ends.

By executing the upload processing as described above, the file generating apparatus 100 can generate an MPD file including, as information for each sub-picture, the stereo information regarding the entire picture.

Accordingly, on the basis of the display region information, the client can more easily select and reproduce, for example, an appropriate stream corresponding to the capability of the client apparatus 200.

<Utilization of Stereo Information Regarding Entire Picture to be Divided into Sub-Pictures, Stereo Information being Signaled in MPD File>

Additionally, a stream may be selected utilizing stereo information regarding the entire picture to be divided into sub-pictures, the stereo information being signaled in the MPD file.

In other words, a control file may be acquired that manages, for each adaptation set, image encoded data for each of a plurality of sub-pictures into which the entire picture is divided and which is then encoded and that includes the stereo information including information related to stereo display of the adaptation set, the control file being used for controlling distribution of the image encoded data. Then, selecting a stream of the image encoded data may be performed on the basis of the stereo information included in the control file acquired.

For example, in the client apparatus 200 used as an information processing apparatus, the MPD file acquiring section 212 may function as a file acquiring section managing, for each adaptation set, the image encoded data for each of the plurality of sub-pictures into which the entire picture is divided and which is then encoded, and acquiring a control file used to control distribution of the image encoded data and including the stereo information including information related to stereo display of the adaptation set, and the MPD file processing section 213 may function as an image processing section selecting a stream of the image encoded data on the basis of the stereo information included in the control file acquired. In other words, the information processing apparatus (for example, the client apparatus 200) may include a file acquiring section (for example, the MPD file acquiring section 212) and an image processing section (for example, the MPD file processing section 213).

This allows the client apparatus 200 to more easily select a stream.

Note that the above-described picture (entire picture) may be all or a part of an omnidirectional video (projected plane image resulting from projection and mapping of an image extending over 360 degrees around in the horizontal direction and over 180 degrees around in the vertical direction). In other words, in a case where the client apparatus 200 uses all or a part of the projected plane image as an entire picture, divides the entire picture into sub-pictures to acquire a stream of the sub-pictures, and reproduces the stream, the present technique can be applied as described above.

Additionally, the region-related information (display region information) may be included in the MPD file as information for each sub-picture. This allows the client apparatus 200 to easily learn which part of the entire picture corresponds to the sub-picture, simply by referencing information regarding the sub-picture referenced by Adaptation Set.

<Procedure of Content Reproduction Processing>

Figure 68:
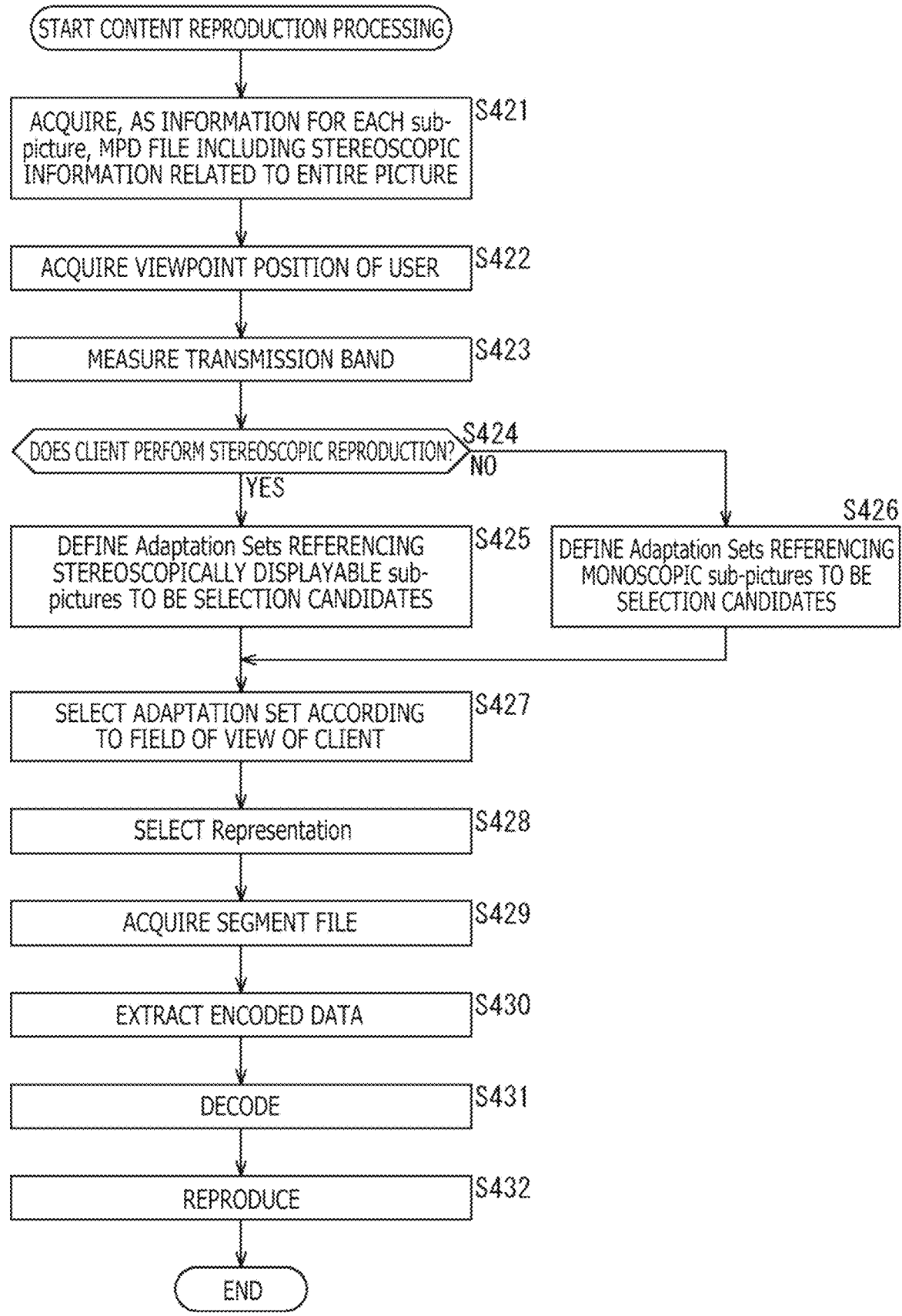
FIG. 68 is a flowchart illustrating an example of procedure of content reproduction processing.

An example of procedure of content reproduction processing executed by the client apparatus 200 in the above-described case will be described with reference to a flowchart in FIG. 68.

When content reproduction processing is started, the MPD file acquiring section 212 of the client apparatus 200 acquires an MPD file including stereo information regarding the entire picture (projected picture) as information for each sub-picture in step S421.

In step S422, the display control section 215 acquires a measurement result for the viewpoint position (and line-of-sight direction) of the user.

In step S423, the measurement section 211 measures the transmission bandwidth of the network between the server and the client apparatus 200.

In step S424, the MPD file processing section 213 determines whether or not the client apparatus 200 performs stereo reproduction (or whether or not the client apparatus 200 has the capability of performing stereo reproduction). In a case where the client apparatus 200 is determined to perform stereo reproduction (or to have the capability of performing stereo reproduction), the processing proceeds to step S425.

In step S425, the MPD file processing section 213 sets Adaptation Sets referencing stereo-displayable sub-pictures as selection candidates. At this time, by referencing the stereo information regarding the entire picture included in the MPD file acquired in step S421, the MPD file processing section 213 can include, in the selection candidates, Adaptation Sets stereo-displayable sub-pictures to which the frame packing arrangement in the second pattern is not applied (for example, the sub-picture 445 and the sub-picture 446 in FIG. 49). When the processing in step S425 ends, the processing proceeds to step S427.

Additionally, in step S424, in a case where the client apparatus 200 is determined not to perform stereo reproduction (or determined not to have the stereo reproduction function), the processing proceeds to step S426.

In step S426, the MPD file processing section 213 sets Adaptation Sets referencing sub-pictures including mono pictures as selection candidates on the basis of, for example, the stereo information regarding the entire picture included in the MPD file acquired in step S421. At this time, by referencing the stereo information regarding the entire picture included in the MPD file acquired in step S421, the MPD file processing section 213 can learn that the sub-picture in the third pattern (for example, the sub-picture 452 or the sub-picture 453 in FIG. 50) requires double upscaling in the horizontal direction during rendering. When the processing in step S426 ends, the processing proceeds to step S427.

In step S427, the MPD file processing section 213 selects Adaptation Set referencing the sub-picture corresponding to the field of view of the user of the client apparatus 200 from the candidates set in step S425 or step S426.

In step S428, the MPD file processing section 213 selects, from Adaptation Set selected in step S424, Representation corresponding to the viewpoint position and line-of-sight direction of the user, the transmission bandwidth of the network between the client and the server, or the like.

In step S429, the segment file acquiring section 214 acquires the segment file corresponding to Representation selected in step S428.

In step S430, the segment file processing section 221 extracts encoded data from the segment file acquired in step S429.

In step S431, the decode section 222 decodes the encoded data of the stream extracted in step S430.

In step S432, the display information generating section 223 reproduces the stream (content) resulting from the decoding in step S431. More specifically, the display information generating section 223 generates data of a display image from the stream and feeds the data of the display image to the display section 217 to cause the display section 217 to display the display image.

When the processing in step S432 ends, the content reproduction processing ends.

By executing the content reproduction processing as described above, the client apparatus 200 can more easily select a stream utilizing the information regarding the display regions of the sub-pictures included in the MPD file. For example, on the basis of the information, the client apparatus 200 can more easily select and reproduce the appropriate stream corresponding to, for example, the capability of the client apparatus 200.

<Details of Signaling of Stereo Information in MPD File>

For example, the 2D coverage information descriptor may be extended to signal the stereo_presentation_suitable field and the view information as described in the third embodiment.

In other words, the MPD file may further include view information indicating the view type of the sub-picture.

Additionally, the view information may be information for each of the regions included in the sub-picture.

Furthermore, the MPD file may further include information indicating whether the view information is present for each region.

An attribute value 551 in FIG. 69 and an attribute value 552 in FIG. 70 represent examples of the attribute value of the extended 2D coverage information descriptor. As illustrated in the attribute value 551 and the attribute value 552, twoDCoverage is a container element with a data type omaf:twoDCoverageType.

twoDCoverage@stereo_presentation_suitable has a data type omaf:StereoPresentationType and indicates whether Adaptation Set is stereo-displayable. For example, this attribute value being 0 indicates that the picture referenced by Adaptation Set is mono or is not stereo-displayable. Additionally, this attribute value being 1 indicates that some of the regions of the picture referenced by Adaptation Set are stereo-displayable. In addition, this attribute value being 2 indicates that all the regions of the picture are stereo-displayable.

twoDCoverage@view_idc_presence_flag has a data type xs:boolean and indicates whether or not a separate view_idc is present in each region. For example, this attribute value being 0 indicates that no separate view_idc is present in each region. Additionally, this attribute value being 1 indicates that a separate view_idc is present in each region. twoDCoverage@default_view_idc has a data type omaf:ViewType and indicates a view common to all the regions. For example, this attribute value being 0 indicates a mono view, this attribute value being 1 indicates a left view, this attribute value being 2 indicates a right view, and this attribute value being 3 indicates a stereo view. Note that this attribute is inevitably present when twoDCoverage@view_idc_presence_flag=0. Additionally, this attribute is inhibited from being present when twoDCoverage@view_idc_presence_flag=1.

twoDCoverage@proj_picture_width has a data type xs:unsignedInt and indicates the width of the projected picture. twoDCoverage@proj_picture_height has a data type xs:unsignedInt and indicates the height of the projected picture. twoDCoverage.twoDCoverageInfo is an element having a data type omaf:twoDCoverageInfoType and indicating region information regarding the regions on the projected picture. A plurality of the signals can be signaled.

twoDCoverage.twoDCoverageInfo@view_idc has a data type omaf:ViewType and indicates a view for each region. For example, this attribute value being 0 indicates a mono view, this attribute value being 1 indicates a left view, this attribute value being 2 indicates a right view, and this attribute value being 3 indicates a stereo view. Note that this attribute is inhibited from being present when twoDCoverage@view_idc_presence_flag=0. Additionally, this attribute is inevitably present when twoDCoverage@view_idc_presence_flag=1.

twoDCoverage.twoDCoverageInfo@proj_reg_width has a data type xs:unsignedInt and indicates the width of the region on the projected picture corresponding to the picture referenced by Adaptation Set. twoDCoverage.twoDCoverageInfo@proj_reg_height has a data type xs:unsignedInt and indicates the height of the region on the projected picture corresponding to the picture referenced by Adaptation Set.

twoDCoverage.twoDCoverageInfo@proj_reg_top has a data type xs:unsignedInt and indicates the vertical coordinate of the region on the projected picture corresponding to the picture referenced by Adaptation Set. twoDCoverage.twoDCoverageInfo@proj_reg_left has a data type xs:unsignedInt and indicates the region horizontal coordinate on the projected picture corresponding to the picture referenced by Adaptation Set.

Figure 71:
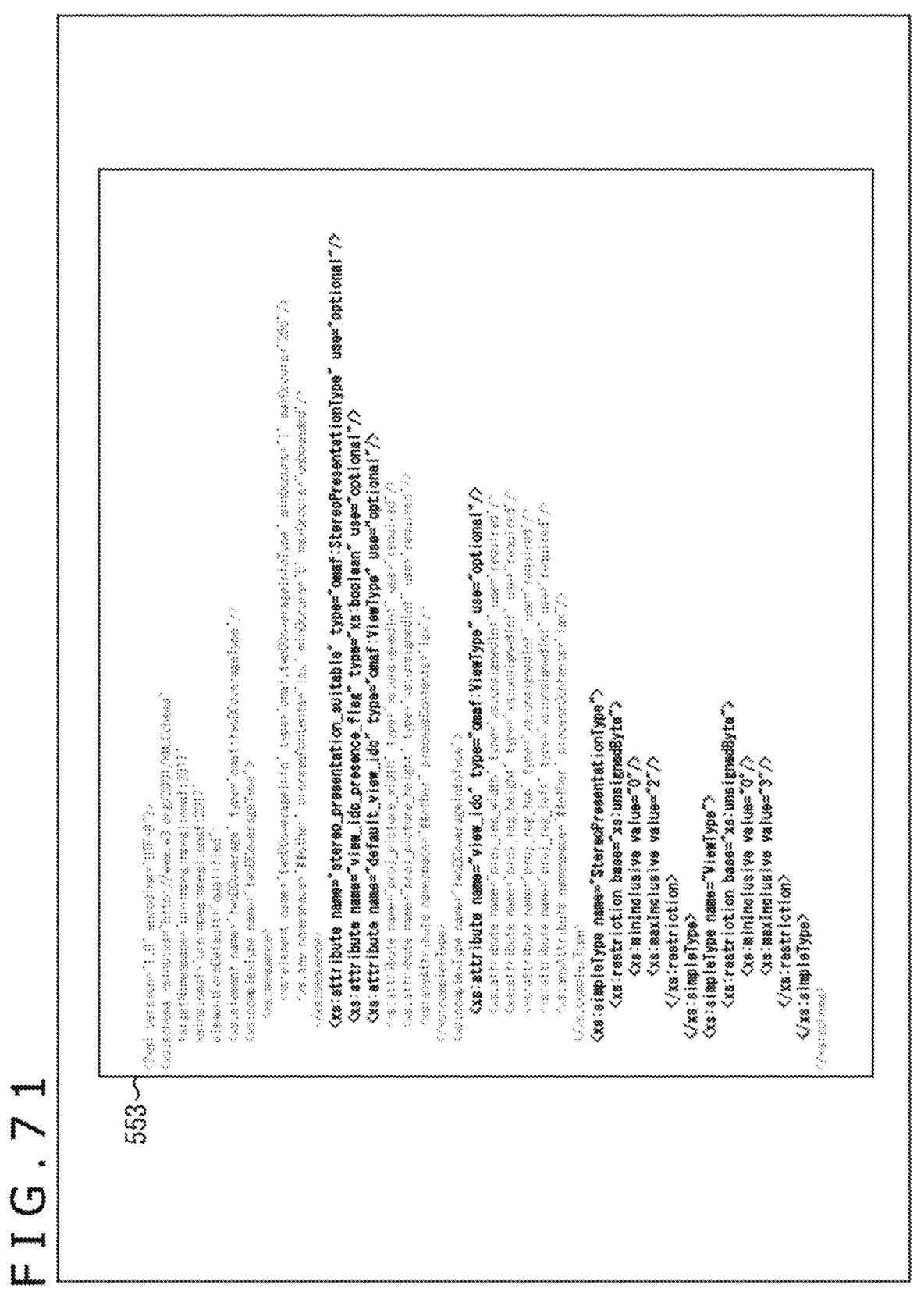

A data type 553 in FIG. 71 indicates examples of definitions of the data types in this case.

Note that the extended Region-wise packing descriptor and Content coverage descriptors described in the second embodiment may further be extended to signal stereo_presentation_suitable and view information. Additionally, any other descriptor may be used to signal these types of information.

6. Supplementary Feature

<Computer>

The above-described series of steps of processing can be caused to be executed by hardware or by software. In a case where the series of steps of processing is executed by software, a program included in the software is installed in a computer. Here, the computer includes a computer integrated in dedicated hardware or, for example, a general-purpose personal computer that can execute various functions by installing the various programs.

Figure 72:
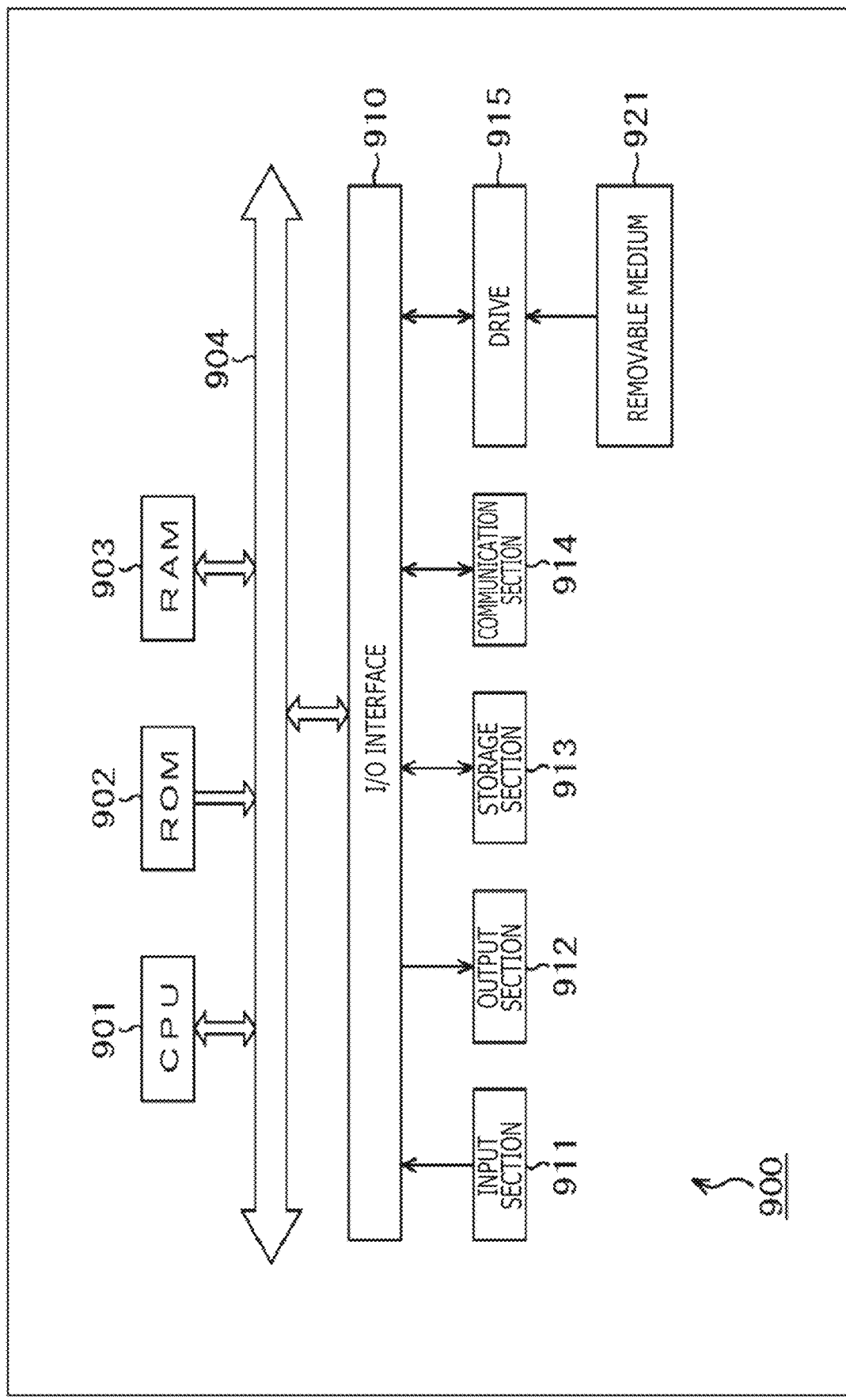
FIG. 72 is a block diagram illustrating a main configuration example of a computer.

FIG. 72 is a block diagram illustrating a configuration example of hardware of a computer executing the above-described series of steps of processing in accordance with a program.

In a computer 900 illustrated in FIG. 72, a CPU (Central Processing Unit) 901, a ROM (Read Only Memory) 902, a RAM (Random Access Memory) 903, and a bus 904 are connected together.

The bus 904 also connects to an I/O interface 910. The I/O interface 910 connects to an input section 911, an output section 912, a storage section 913, a communication section 914, and a drive 915.

The input section 911 includes, for example, a keyboard, a mouse, a microphone, a touch panel, and an input terminal. The output section 912 includes, for example, a display, a speaker, and an output terminal. The storage section 913 includes, for example, a hard disk, a RAM disk, and a nonvolatile memory. The communication section 914 includes, for example, a network interface. The drive 915 drives a removable medium 921 such as a magnetic disk, an optical disc, a magneto-optical disc, or a semiconductor memory.

In the computer configured as described above, the CPU 901, for example, loads a program stored in the storage section 913, into the RAM 903 via the I/O interface 910 and the bus 904, and executes the program to perform the above-described series of steps of processing. The RAM 903 also appropriately stores, for example, data required to execute various steps of processing which are executed by the CPU 901.

The program executed by the computer (CPU 901) can be, for example, recorded in the removable medium 921 used as a package medium for application. In that case, the removable medium 921 is mounted in the drive 915 to allow the program to be installed in the storage section 913 via the I/O interface 910.

Additionally, the program can be provided via a wired or wireless transmission medium such as a local area network, the Internet, or digital satellite broadcasting. In that case, the program can be received by the communication section 914 and installed in the storage section 913.

Otherwise the program can be stored in the ROM 902 or the storage section 913 in advance.

<Objects to which Present Technique is Applied>

The cases have been described in which the present technique is applied to the ISOBMFF file or the MPD file. However, the present technique is not limited to these examples and can be applied to a file complying with any standard and used to distribute a stream of projected plane images with three-dimensional structure images mapped to a single plane. In other words, specifications for various types of processing such as distribution control, file format, and an encoding and decoding scheme are optional unless the specifications are inconsistent with the present technique. Additionally, some of the above-described steps of processing and the above-described specifications may be omitted unless the omission is inconsistent with the present technique.

In addition, the file generating apparatus 100 and the client apparatus 200 have been described above as application examples of the present technique. However, the present technique can be applied to any configuration.

For example, the present technique may be applied to various types of electronic equipment such as transmitters and receivers (for example, television receivers and cellular phones) for satellite broadcasting, wired broadcasting such as cable TV, distribution on the Internet, and distribution to terminals by cellular communication, or apparatuses recording images in media such as an optical disc, a magnetic disk, and a flash memory and reproducing images from the storage media (for example, hard disk recorders and cameras).

Additionally, for example, the present technique can be implemented as a partial configuration of the apparatus such as processors used as system LSI (Large Scale Integration) (for example, video processors), a module using a plurality of processors or the like (for example, a video module), a unit using a plurality of modules or the like (for example, a video unit), or a set including the unit to which any other function is added (for example, a video set).

Additionally, for example, the present technique can be applied to a network system including a plurality of apparatuses. For example, the present technique may be implemented as cloud computing in which a plurality of apparatuses shares and jointly executes processing via a network. For example, the present technique may be implemented in a cloud service in which services related to images (moving images) are provided to any terminals, for example, computers, AV (Audio Visual) equipment, personal digital assistants, IoT (Internet of Things) devices.

Note that the system as used herein means a set of a plurality of components (apparatuses, modules (parts), and the like) regardless of whether or not all the components are present in the same housing. Accordingly, a plurality of apparatuses housed in separate housings and connected together via a network and one apparatus including a plurality of modules housed in one housing are each a system.

<Fields and Purposes to which Present Technique is Applicable>

A system, an apparatus, a processing section, and the like to which the present technique is applied can be utilized for any fields, for example, transportation, medical care, crime prevention, agriculture, livestock industry, mining, cosmetics, factories, home appliances, meteorology, and natural surveillance. Additionally, the system, apparatus, processing section, and the like can be used for any purposes.

For example, the present technique can be applied to systems and devices used to provide viewing and listening content and the like. Additionally, for example, the present technique can be applied to systems and devices used for the purposes of transportation such as monitoring of traffic conditions and automatic operation control. Furthermore, for example, the present technique can be applied to systems and devices used for the purposes of security. Additionally, for example, the present technique can be applied to systems and devices used for the purposes of automatic control of machines or the like. Furthermore, for example, the present technique can be applied to systems and devices used for the purposes of agriculture and livestock industry. Additionally, the present technique can be applied to systems and devices monitoring the state of nature such as volcanoes, forests, and marines, and wildlife and the like. Furthermore, for example, the present technique can be applied to systems and devices used for the purposes of sports.

<Other Features>

Note that the "flag" as used herein refers to information used to identify a plurality of states, and includes not only information used to identify two states of true (1) or false (0) but also information enabling three or more states to be identified. Accordingly, the "flag" can take, for example, two values of 1/0 or three or more values. In other words, the number of bits included in the "flag" is optional and may be one or more. Additionally, identification information (including the flag) is assumed to be not only in a form in which the identification information is included in a bit stream but also in a form in which difference information regarding a difference of the identification information from certain reference information is included in the bit stream. Thus, the "flag" and "identification information" as used herein include not only the information but also the difference information regarding the difference from the reference information.

Additionally, various types of information (metadata and the like) related to encoded data (bit stream) may be transmitted or recorded in any form as long as the information is associated with the encoded data. The term "associated" as used herein means that, for example, when one data is processed, the other data is made available (made linkable). In other words, the data associated with each other may be integrated into one data or used as separate data. For example, the information associated with the encoded data (image) may be transmitted on a transmission line different from the transmission line on which the encoded data (image) is transmitted. Additionally, the information associated with the encoded data (image) may be recorded in a recording medium different from the recording medium in which the encoded data (image) is recorded (or in a recording area of the same recording medium that is different from the recording area in which the encoded data (image) is recorded). Note that the "association" may correspond to a part of the data instead of the entire data. For example, an image may be associated with information corresponding to the image in any units such as a plurality of frames, one frame, or a part within the frame.

Note that the terms "synthesize," "multiplex," "add," "integrate," "include," "store," "put in," "plug in," and "insert" as used herein mean integration of a plurality of objects into one, for example, integration of encoded data and metadata into one data, and mean a method for the "association" described above.

Additionally, the embodiments of the present technique are not limited to the embodiments described above, and various changes may be made to the embodiments without departing from the spirits of the present technique.

For example, the configuration described as one apparatus (or one processing section) may be divided into a plurality of apparatuses (or a plurality of processing sections). In contrast, the configuration described as a plurality of apparatuses (a plurality of processing sections) may be integrated into one apparatus (or one processing section). Additionally, to the configuration of each apparatus (or each processing section), a configuration other than the above-described configurations may obviously be added. Furthermore, a part of the configuration of one apparatus (or one processing section) may be included in the configuration of another apparatus (or another processing section) as long as the configuration and operation of the system as a whole remain substantially the same.

Additionally, for example, the above-described program may be executed in any apparatus. In that case, it is sufficient that the apparatus includes required functions (functional blocks and the like) and can obtain required information.

Additionally, for example, each of the steps in one flowchart may be executed by one apparatus or shared by a plurality of apparatuses. Furthermore, in a case where one step includes a plurality of processes, the plurality of processes may be executed by one apparatus or shared by a plurality of apparatuses. In other words, a plurality of processes included in one step can be executed as a plurality of steps of processing. In contrast, the processing described as a plurality of steps can be integrated into one step for execution.

Additionally, for example, the program executed by the computer may be configured such that the steps of processing describing the program are chronologically executed along the order described herein or in parallel or individually at required timings such as timings when the processing is invoked. In other words, the steps of processing may be executed in an order different from the above-described order. Furthermore, the steps of processing describing the program may be executed in parallel with or in combination with processing of another program.

Additionally, for example, a plurality of techniques related to the present technique can be implemented independently and solely unless the implementation is inconsistent with the present technique. Any plurality of the present techniques can obviously be implemented together. For example, a part or all of the present technique described in any of the embodiments can be implemented in combination with a part or all of the present technique described in another embodiment. Additionally, a part or all of any of the present techniques described above can be implemented along with another technique not described above.

Note that the present technique can take the following configuration.

(1)

An information processing apparatus including:
a file generating section configured to generate a file including region-related information related to a region in an entire picture corresponding to a stored sub-picture, as information different from arrangement information for each of picture regions and further including image encoded data resulting from encoding of the sub-picture.

(2)

The information processing apparatus according to (1), in which
the picture includes an omnidirectional video.

(3)

The information processing apparatus according to (1) or (2), in which
the region-related information is included in the file as information for each of the sub-pictures.

(4)

The information processing apparatus according to (3), in which
the file includes an ISOBMFF (International Organization for Standardization Base Media File Format) file,
the arrangement information for each of the picture regions includes information signaled in Region Wise Packing Box, and
the region-related information is stored in Scheme Information Box in the ISOBMFF file that is different from Region Wise Packing Box or in Box that is different from Region Wise Packing Box and that is located in a layer below the Scheme Information Box.

(5)

The information processing apparatus according to (3), in which
the file includes an ISOBMFF (International Organization for Standardization Base Media File Format) file, and
the region-related information is stored in Coverage Information Box indicating a display region of a track on a spherical surface.

(6)

The information processing apparatus according to any one of (1) to (5), in which
the region-related information varies dynamically within a stream.

(7)

The information processing apparatus according to (6), in which
the file includes an ISOBMFF (International Organization for Standardization Base Media File Format) file, and
the region-related information is stored in a Supplemental Enhancement information message.

(8)

The information processing apparatus according to (6), in which
the file includes an ISOBMFF (International Organization for Standardization Base Media File Format) file, and
the region-related information is stored in timed metadata.

(9)

The information processing apparatus according to (6), in which
the file includes an ISOBMFF (International Organization for Standardization Base Media File Format) file, and
the region-related information is stored in Sample Group Entry.

(10)
An information processing method including:
generating a file including region-related information related to a region in an entire picture corresponding to a stored sub-picture, as information different from arrangement information for each of picture regions and further including image encoded data resulting from encoding of the sub-picture.

(11)
An information processing apparatus including:
a file acquiring section configured to acquire a file including region-related information related to a region in an entire picture corresponding to a stored sub-picture, as information different from arrangement information for each of picture regions and further including image encoded data resulting from encoding of the sub-picture; and
an image processing section configured to select a stream of the image encoded data on the basis of the region-related information included in the file acquired by the file acquiring section.

(12)
The information processing apparatus according to (11), in which
the picture includes an omnidirectional video.

(13)
The information processing apparatus according to (11) or (12), in which
the region-related information is included in the file as information for each of the sub-pictures.

(14)
The information processing apparatus according to (13), in which
the file includes an ISOBMFF (International Organization for Standardization Base Media File Format) file, and
the region-related information is stored in Scheme Information Box in the ISOBMFF file or in Box in a layer below the Scheme Information Box.

(15)
The information processing apparatus according to (13), in which
the file includes an ISOBMFF (International Organization for Standardization Base Media File Format) file, and
the region-related information is stored in Coverage Information Box indicating a display region of a track on a spherical surface.

(16)
The information processing apparatus according to any one of (11) to (15), in which
the region-related information varies dynamically within a stream.

(17)
The information processing apparatus according to (16), in which
the file includes an ISOBMFF (International Organization for Standardization Base Media File Format) file, and
the region-related information is stored in a Supplemental Enhancement information message.

(18)
The information processing apparatus according to (16), in which
the file includes an ISOBMFF (International Organization for Standardization Base Media File Format) file, and
the region-related information is stored in timed metadata.

(19)
The information processing apparatus according to (16), in which
the file includes an ISOBMFF (International Organization for Standardization Base Media File Format) file, and
the region-related information is stored in Sample Group Entry.

(20)
An information processing method including:
acquiring a file including region-related information related to a region in an entire picture corresponding to a stored sub-picture, as information different from arrangement information for each of picture regions and further including image encoded data resulting from encoding of the sub-picture; and
selecting a stream of the image encoded data on the basis of the region-related information included in the file acquired.

(21)
An information processing apparatus including:
a file generating section configured to generate a file storing, in each track, image data for each of a plurality of sub-pictures into which an entire picture is divided and which is then encoded and including stereo information including information related to stereo display of the entire picture.

(22)
The information processing apparatus according to (21), in which
the picture includes an omnidirectional video.

(23)
The information processing apparatus according to (21) or (22), in which
the stereo information is included in the file as information for each of the sub-pictures.

(24)
The information processing apparatus according to (23), in which
the file includes an ISOBMFF (International Organization for Standardization Base Media File Format) file, and
the stereo information is stored in Scheme Information Box in the ISOBMFF file or in Box in a layer below the Scheme Information Box.

(25)
The information processing apparatus according to any one of (21) to (24), in which
the file further includes information related to a display size of the sub-picture.

(26)
The information processing apparatus according to any one of (21) to (25), in which
the file further includes sub-stereo information including information related to stereo display of each of the sub-pictures.

(27)
The information processing apparatus according to any one of (21) to (26), in which
the file further includes view information indicating a view type of the sub-picture.

(28)
The information processing apparatus according to (27), in which
the view information includes information for each of regions included in the sub-picture.

(29)
The information processing apparatus according to (28), in which
the file further includes information indicating whether the view information is present in each of the regions.

(30)
An information processing method including:
generating a file storing, in each track, image data for each of a plurality of sub-pictures into which an entire picture is divided and which is then encoded and including stereo information including information related to stereo display of the entire picture.

(31)

An information processing apparatus including:
a file acquiring section configured to acquire a file storing, in each track, image data for each of a plurality of sub-pictures into which an entire picture is divided and which is then encoded and including stereo information including information related to stereo display of the entire picture; and
an image processing section configured to select a stream of the image encoded data on the basis of the stereo information included in the file acquired by the file acquiring section.

(32)

The information processing apparatus according to (31), in which
the picture includes an omnidirectional video.

(33)

The information processing apparatus according to (31) or (32), in which
the stereo information is included in the file as information for each of the sub-pictures.

(34)

The information processing apparatus according to (33), in which
the file includes an ISOBMFF (International Organization for Standardization Base Media File Format) file, and
the stereo information is stored in Scheme Information Box in the ISOBMFF file or in Box in a layer below the Scheme Information Box.

(35)

The information processing apparatus according to any one of (31) to (34), in which
the file further includes information related to a display size of the sub-picture.

(36)

The information processing apparatus according to any one of (31) to (35), in which
the file further includes sub-stereo information including information related to stereo display of each of the sub-pictures.

(37)

The information processing apparatus according to any one of (31) to (36), in which
the file further includes view information indicating a view type of the sub-picture.

(38)

The information processing apparatus according to (37), in which
the view information includes information for each of regions included in the sub-picture.

(39)

The information processing apparatus according to (38), in which
the file further includes information indicating whether the view information is present in each of the regions.

(40)

An information processing method including:
acquiring a file storing, in each track, image data for each of a plurality of sub-pictures into which an entire picture is divided and which is then encoded and including stereo information including information related to stereo display of the entire picture; and
selecting a stream of the image encoded data on the basis of the stereo information included in the file acquired.

(41)

An information processing apparatus including:
a file generating section configured to generate a control file managing image encoded data for each of a plurality of sub-pictures into which an entire picture is divided and which is then encoded and including region-related information related to a region in the entire picture corresponding to the sub-picture, as information different from arrangement information for each of picture regions, the control file being used for controlling distribution of the image encoded data.

(42)

The information processing apparatus according to (41), in which
the picture includes an omnidirectional video.

(43)

The information processing apparatus according to (41) or (42), in which
the region-related information is included in the control file as information for each of the sub-pictures.

(44)

The information processing apparatus according to (43), in which
the control file includes an MPD (Media Presentation Description) file,
the image encoded data for each of the sub-pictures is managed for each adaptation set,
the arrangement information for each of the picture regions is stored in a Region-wise packing descriptor, and
the region-related information is defined in Supplemental Property or Essential Property in the MPD file.

(45)

The information processing apparatus according to (43), in which
the control file includes an MPD (Media Presentation Description) file,
the image encoded data for each of the sub-pictures is managed for each adaptation set,
the arrangement information for each of the picture regions is stored in a Region-wise packing descriptor, and
the region-related information is defined in Content coverage description in the MPD file.

(46)

An information processing method including:
generating a control file managing image encoded data for each of a plurality of sub-pictures into which an entire picture is divided and which is then encoded and including region-related information related to a region in the entire picture corresponding to the sub-picture, as information different from arrangement information for each of picture regions, the control file being used for controlling distribution of the image encoded data.

(51)

An information processing apparatus including:
a file acquiring section configured to acquire a control file managing image encoded data for each of a plurality of sub-pictures into which an entire picture is divided and which is then encoded and including region-related information related to a region in the entire picture corresponding to the sub-picture, as information different from arrangement information for each of picture regions, the control file being used for controlling distribution of the image encoded data; and
an image processing section configured to select a stream of the image encoded data on the basis of the region-related information included in the control file acquired by the file acquiring section.

(52)

The information processing apparatus according to (51), in which the picture includes an omnidirectional video.

(53)

The information processing apparatus according to (51) or (52), in which the region-related information is included in the control file as information for each of the sub-pictures.

(54)

The information processing apparatus according to (53), in which the control file includes an MPD (Media Presentation Description) file, the image encoded data for each of the sub-pictures is managed for each adaptation set, the arrangement information for each of the picture regions is stored in a Region-wise packing descriptor, and the region-related information is defined in Supplemental Property or Essential Property in the MPD file.

(55)

The information processing apparatus according to (53), in which the control file includes an MPD (Media Presentation Description) file, the image encoded data for each of the sub-pictures is managed for each adaptation set, the arrangement information for each of the picture regions is stored in a Region-wise packing descriptor, and the region-related information is defined in Content coverage description in the MPD file.

(56)

An information processing method including:

acquiring a control file managing image encoded data for each of a plurality of sub-pictures into which an entire picture is divided and which is then encoded and including region-related information related to a region in the entire picture corresponding to the sub-picture, as information different from arrangement information for each of picture regions, the control file being used for controlling distribution of the image encoded data; and selecting a stream of the image encoded data on the basis of the region-related information included in the control file acquired.

(61)

An information processing apparatus including:

a file generating section configured to generate a control file managing, for each adaptation set, image encoded data for each of a plurality of sub-pictures into which an entire picture is divided and which is then encoded and including stereo information related to stereo display of the adaptation set, the control file being used for controlling distribution of the image encoded data.

(62)

The information processing apparatus according to (61), in which the picture includes an omnidirectional video.

(63)

The information processing apparatus according to (61) or (62), in which the control file further includes view information indicating a view type of the sub-picture.

(64)

The information processing apparatus according to (63), in which the view information includes information for each of regions included in the sub-picture.

(65)

The information processing apparatus according to (63) or (64), in which the control file further includes information indicating whether the view information is present in each of the regions.

(66)

The information processing apparatus according to any one of (63) to (65), in which the control file further includes information indicating whether the adaptation set is stereo-displayable.

(67)

An information processing method including:

generating a control file managing, for each adaptation set, image encoded data for each of a plurality of sub-pictures into which an entire picture is divided and which is then encoded and including stereo information related to stereo display of the adaptation set, the control file being used for controlling distribution of the image encoded data.

(71)

An information processing apparatus including:

a file acquiring section configured to acquire a control file managing, for each adaptation set, image encoded data for each of a plurality of sub-pictures into which an entire picture is divided and which is then encoded and including stereo information related to stereo display of the adaptation set, the control file being used for controlling distribution of the image encoded data; and an image processing section configured to select a stream of the image encoded data on the basis of the stereo information included in the control file acquired by the file acquiring section.

(72)

The information processing apparatus according to (71), in which the picture includes an omnidirectional video.

(73)

The information processing apparatus according to (71) or (72), in which the control file further includes view information indicating a view type of the sub-picture.

(74)

The information processing apparatus according to (73), in which the view information includes information for each of regions included in the sub-picture.

(75)

The information processing apparatus according to (73) or (74), in which the control file further includes information indicating whether the view information is present in each of the regions.

(76)

The information processing apparatus according to any one of (73) to (75), in which the control file further includes information indicating whether the adaptation set is stereo-displayable.

(77)

An information processing method including:

acquiring a control file managing, for each adaptation set, image encoded data for each of a plurality of sub-pictures into which an entire picture is divided and which is then encoded and including stereo information related to stereo display of the adaptation set, the control file being used for controlling distribution of the image encoded data; and selecting a stream of the image encoded data on the basis of the stereo information included in the control file acquired.

REFERENCE SIGNS LIST

100 File generating apparatus, 101 Control section, 102 Memory, 103 File generating section, 111 Data input section, 112 Data encoding and generating section, 113 MPD file generating section, 114 Storage section, 115 Upload section, 121 Preprocess section, 122 Encode section, 123 Segment file generating section, 200 Client apparatus, 201 Control section, 202 Memory, 203 Reproduction processing section, 211 Measurement section, 212 MPD file acquiring section, 213 MPD file processing section, 214 Segment file acquiring section, 215 Display control section, 216 Data analysis and decoding section, 217 Display section, 221 Segment file processing section, 222 Decode section, 223 Display information generating section, 900 Computer

The invention claimed is:

1. An information processing apparatus comprising:
circuitry configured to:
generate a content file including image encoded data in which an entire picture is encoded and a predetermined metadata Box,
wherein the predetermined metadata Box shows that a projected picture, which is a projected plane image that maps a three-dimensional structure image to a plane, and the entire picture constructed from a sub-picture are the same, and
wherein the predetermined metadata Box indicates that region-wise packing has not been applied to the entire picture.

2. The information processing apparatus of claim 1, wherein a number value indicates that the region-wise packing has not been applied to the entire picture.

3. The information processing apparatus of claim 1, wherein a flag field indicates that the region-wise packing has not been applied to the entire picture.

4. The information processing apparatus of claim 3, wherein the flag field having a value of 1 indicates that the region-wise packing has not been applied to the entire picture.

5. The information processing apparatus of claim 1, wherein a flag field having a value of 0 indicates that the entire picture is different from the projected picture.

6. The information processing apparatus of claim 1, wherein a flag field having a value of 1 indicates that the entire picture is identical to the projected picture.

7. The information processing apparatus of claim 6, wherein the flag field is in a Sub Picture Composition Box.

8. The information processing apparatus of claim 1, wherein presence or absence of another metadata Box indicates whether or not the entire picture is identical to the projected picture.

9. An information processing method comprising:
generating, by circuitry, a content file including image encoded data in which an entire picture is encoded and a predetermined metadata Box,
wherein the predetermined metadata Box shows that a projected picture, which is a projected plane image that maps a three-dimensional structure image to a plane, and the entire picture constructed from a sub-picture are the same, and
wherein the predetermined metadata Box indicates that region-wise packing has not been applied to the entire picture.

10. The information processing method of claim 9, wherein a number value indicates that the region-wise packing has not been applied to the entire picture.

11. The information processing method of claim 9, wherein a flag field indicates that the region-wise packing has not been applied to the entire picture.

12. The information processing method of claim 11, wherein the flag field having a value of 1 indicates that the region-wise packing has not been applied to the entire picture.

13. The information processing method of claim 9, wherein a flag field having a value of 0 indicates that the entire picture is different from the projected picture.

14. An information processing apparatus comprising:
circuitry configured to:
acquire a content file including image encoded data in which an entire picture is encoded and a predetermined metadata Box,
wherein the predetermined metadata Box shows that a projected picture, which is a projected plane image that maps a three-dimensional structure image to a plane, and the entire picture constructed from a sub-picture are the same, and
wherein the predetermined metadata Box indicates that region-wise packing has not been applied to the entire picture; and
process the content file.

15. The information processing apparatus of claim 14, wherein a number value indicates that the region-wise packing has not been applied to the entire picture.

16. The information processing apparatus of claim 14, wherein a flag field indicates that the region-wise packing has not been applied to the entire picture.

17. The information processing apparatus of claim 16, wherein the flag field having a value of 1 indicates that the region-wise packing has not been applied to the entire picture.

18. The information processing apparatus of claim 14, wherein a flag field having a value of 0 indicates that the entire picture is different from the projected picture.

* * * * *